US010958425B2

(12) United States Patent
Nix

(10) Patent No.: US 10,958,425 B2
(45) Date of Patent: Mar. 23, 2021

(54) HOSTED DYNAMIC PROVISIONING PROTOCOL WITH SERVERS AND A NETWORKED RESPONDER

(71) Applicant: IOT and M2M Technologies, LLC, Evanston, IL (US)

(72) Inventor: John A. Nix, Evanston, IL (US)

(73) Assignee: IOT AND M2M TECHNOLOGIES, LLC, Evanston, IL (US)

( * ) Notice: Subject to any disclaimer, the term of this patent is extended or adjusted under 35 U.S.C. 154(b) by 198 days.

(21) Appl. No.: 16/406,325

(22) Filed: May 8, 2019

(65) Prior Publication Data

US 2019/0356482 A1 Nov. 21, 2019

Related U.S. Application Data

(60) Provisional application No. 62/672,977, filed on May 17, 2018.

(51) Int. Cl.
*H04L 9/08* (2006.01)
*H04W 12/06* (2021.01)
(Continued)

(52) U.S. Cl.
CPC .......... *H04L 9/0841* (2013.01); *H04L 9/0861* (2013.01); *H04L 9/3013* (2013.01);
(Continued)

(58) Field of Classification Search
CPC ...................................................... H04L 9/0841
See application file for complete search history.

(56) References Cited

U.S. PATENT DOCUMENTS 10,169,587 B1 1/2019 Nix
2008/0165955 A1* 7/2008 Ibrahim ................ H04L 9/3066
380/30
(Continued)

FOREIGN PATENT DOCUMENTS

WO WO2014138430 A3 1/2015

OTHER PUBLICATIONS

WiFi Alliance, Device Provisioning Protocol Specification Version 1.0, Apr. 9, 2018, pp. 1-124.
(Continued)

*Primary Examiner* — Simon P Kanaan
(74) *Attorney, Agent, or Firm* — GrowIP Law Group LLC

(57) ABSTRACT

A network can operate a WiFi access point with credentials. An unconfigured device can support a Device Provisioning Protocol (DPP), and record bootstrap public keys and initiator private keys. The network can record bootstrap public and responder private keys and operate a DPP server. A responder proxy can establish a secure and mutually authenticated connection with the network. The network can (i) derive responder ephemeral public and private keys, (ii) record the initiator bootstrap public key, and (iii) select a responder mode for the responder. The network can derive an encryption key with at least the (i) recorded the initiator bootstrap public key and (ii) derived responder ephemeral
(Continued)

private key. The network can encrypt credentials using at least the derived encryption key and send the encrypted credentials through the responder proxy to the initiator, which can forward the encrypted credentials to the device, thereby supporting a device configuration.

20 Claims, 20 Drawing Sheets

(51) Int. Cl.
| | |
|---|---|
| H04L 29/06 | (2006.01) |
| H04L 9/30 | (2006.01) |
| H04L 9/32 | (2006.01) |
| H04L 12/24 | (2006.01) |
| H04W 12/041 | (2021.01) |
| H04W 84/12 | (2009.01) |
| H04L 9/06 | (2006.01) |

(52) U.S. Cl.
CPC .......... *H04L 9/3066* (2013.01); *H04L 9/3263* (2013.01); *H04L 41/0809* (2013.01); *H04L 63/0435* (2013.01); *H04W 12/041* (2021.01); *H04W 12/06* (2013.01); *H04L 9/0643* (2013.01); *H04L 2209/80* (2013.01); *H04W 84/12* (2013.01)

(56) References Cited

U.S. PATENT DOCUMENTS

| | | |
|---|---|---|
| 2015/0229475 A1 | 8/2015 | Benoit et al. |
| 2017/0257819 A1* | 9/2017 | McCann ............... H04W 48/14 |
| 2017/0295448 A1 | 10/2017 | Mccann et al. |
| 2018/0069695 A1* | 3/2018 | Bowman ............... H04L 9/0631 |
| 2018/0109381 A1 | 4/2018 | Cammarota et al. |
| 2018/0109418 A1 | 4/2018 | Cammarota et al. |

OTHER PUBLICATIONS

Wikipedia, Elliptic-curve Diffie-Hellman, Mar. 9, 2018, pp. 1-2.
IEEE, Std 802.11ac-2013, Part 11: Wireless LAN Medium Access Control (MAC) and Physical Layer (PHY) Specifications, Annex E, Dec. 11, 2013, pp. 406-412.
NIST Special Publication 800-56A Revision 3, Recommendation for Pair-Wise Key-Establishment Schemes Using Discrete Logarithm Cryptography, Apr. 2018, pp. 1-152.
D. Harkins, Public Key Exchange, IETF draft-harkins-pkex-05, Jan. 24, 2018, pp. 1-44.
Wikipedia, Elgamal Encryption, Apr. 18, 2018, pp. 1-4.
Wikipedia, ECC Point Multiplication, May 15, 2019, pp. 1-7.

* cited by examiner

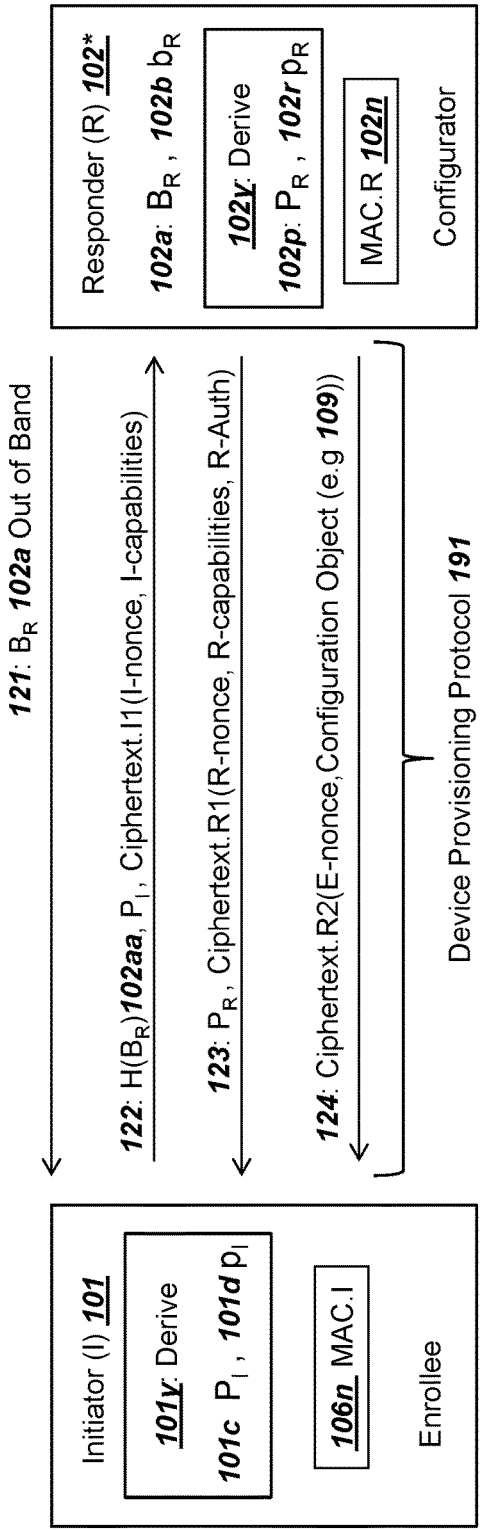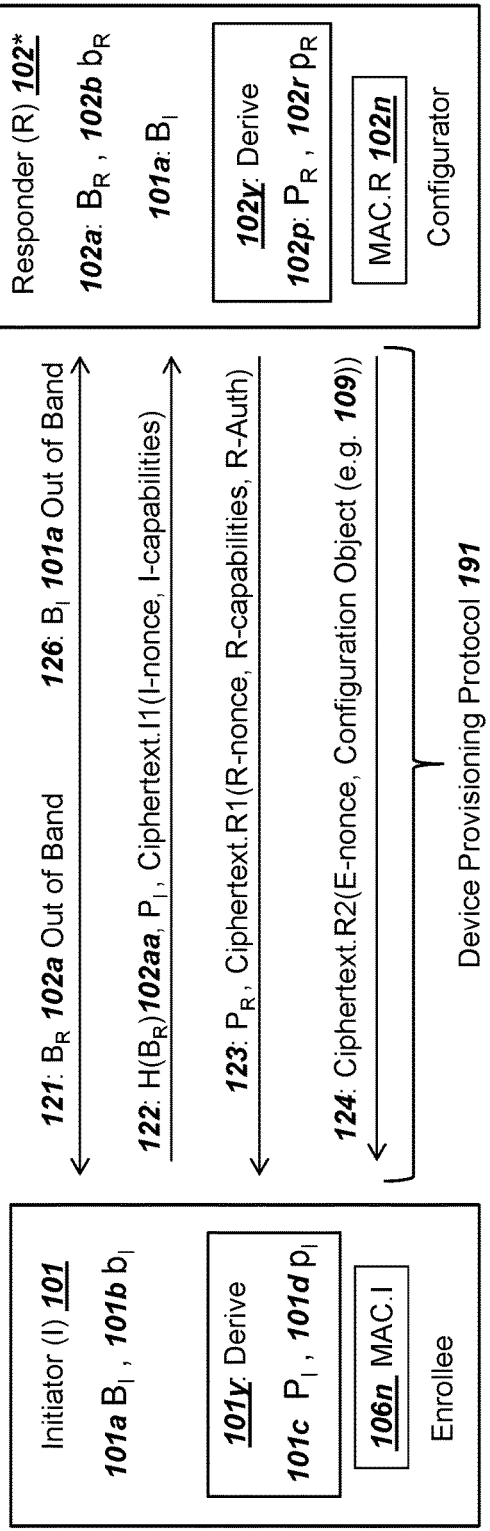

Figure 1d

Initiator Key Database 101t

Responder Public Key Table 101ta

| Br Key ID 101z | Responder Network 107a | Br 102a | H(Br) 102aa | Params 199 |
|---|---|---|---|---|
| 1 | Netgear | 102a-1 | H(102a-1) | A |
| 2 | Linksys | 102a-2 | H(102a-2) | A |
| 3 | Google | 102a-3 | H(102a-3) | A |
| 4 | Apple | 102a-4 | H(102a-4) | A |
| 5 | ATT | 102a-5 | H(102a-5) | A |
| 6 | Comcast | 102a-6 | H(102a-6) | C |
| 7 | Network 107 (Param A) | 102a-7 | H(102a-7) | A |
| 8 | Network 107 (Param B) | 102a-8 | H(102a-8) | B |
| ... | | | | |

Initiator Key Table 101tb

| Bi Key ID 101w | Params 199a | Bi 101a | H(Bi) 101aa | bi 101b |
|---|---|---|---|---|
| 1 | A | 101a-1 | H(101a-1) | 101b-1 |
| 2 | B | 101a-2 | H(101a-2) | 101b-2 |
| 3 | C | 101a-3 | H(101a-3) | 101b-3 |
| ... | | | | |

DPP Configuration 130

| Device Supported Config 130z | Global Operating Class 130a | Channel List 130b |
|---|---|---|
| 1 | 83 (2.4 Ghz) | 1 - 9 |
| 2 | 122 (5 Ghz) | 100, 108, 116 |
| 3 | 60 Ghz | 1, 2 |
| ... | | |

Figure 2a

Device Database 104

| Index | Device Identity 106i | MAC, Initiator 106n | Responder Identity 102i | Responder Mode 306a | Cryptog. Params 199 | PKEK Key 198 | Responder Bootstrap Public Key (Br) 102a | Responder Bootstrap Private Key (br) 102b | Initiator Bootstrap Public Key (Bi) 101a | 102aa | Key Table 104k 101aa |
|---|---|---|---|---|---|---|---|---|---|---|---|
| 1 | 20001 | 38607720A | 6cf049080 | Fig. 3 | A | NA | Br-1 (Shared Keys 102z) | br-1 | Bi-1 | H(Br) | H(Bi) |
| 2 | 20002 | 386077209 | 6cf049080 | Fig. 5a | A | NA | Br-1 | br-1 | Bi-1 | H(Br-1) | H(Bi-1) |
| 3a | 20003 | 386077400 | 6cf049080 | 102* | A | X3 | Br-1 | br-1 | NA | H(Br-1) | -- |
| 3b | 20003 | 386077400 | 6cf049080 | 102* | B | X3 | Br-3(B) | br-3(B) | NA | H(Br-3(B)) | -- |
| 4 | 20004 | 386077.3cc | 1c6f654d2 | Fig. 3 | C | X4 | Br-4(C) | br-4(C) | Bi-4(C) | H(Br-4(C)) | H(Bi-4(C)) |
| 5a | 20005 | 386077a09 | 1c6f654d2 | Fig. 5b | A | NA | Br-5(A) | br-5(A) | Bi-5(A) | H(Br-5(A)) | H(Bi-5(A)) |
| 5d | 20006 | 386077a09 | 1c6f654d2 | Fig. 5 | D | NA | Br-5(D) | br-5(D) | Bi-5(D) | H(Br-5(D)) | H(Bi-5(D)) |

Cryptographic Parameters 199

| Set 199a | Key Length 199b | Curve 199c | Hash 199e | AES-SIV Key Length 199f | Nonce Length 199g | Asymmetric Encryption Parameters 199h |
|---|---|---|---|---|---|---|
| A | 256 | p256 | SHA-256 | 256 | 128 | Elgamal, p, g |
| B | 384 | p384 | SHA-384 | 384 | 192 | Elgamal, p, g |
| C | 512 | secp521r1 | SHA-512 | 512 | 256 | RSA |
| D | 384 | Curve25519 | SHA-3 | 384 | 192 | Elgamal, p, g |

Server Database *103a*

| MAC.Initiator *106n* | Responder MAC *102n* | Responder Mode *306a* | Cryptog. Params *199a* | Responder Ephem. Public Key *102p* | Responder Ephem. Private Key *102r* | Initiator Ephem. Public Key *101c* | Bootstrap keys *399* | PKEX Key *198* | Shared Secret k1 *314a* | Shared Secret k2 *314c* | Shared Secret ke *327a* |
|---|---|---|---|---|---|---|---|---|---|---|---|
| 38607720A | 6cf049080 | Fig. 3 | A | Pr-1 | pr-1 | Pi-1 | Br-1, br-1, Bi-1 | X1 | k1-1 | k2-1 | ke-1 |
| 38607208 | 4a508b99 | Fig. 5a | A | - | - | Pi-2 | Br-1, br-1, Bi-2 | NA | - | - | - |
| 38607209 | 1c6f654d2 | Fig. 5b | A | - | pr-2 | Pi-2 | Br-1, br-1, Bi-3 | NA | - | - | - |
| 38607400 | 7071bce29 | 102" | B | - | - | - | {Br-4, br-4, Bi-4} B | | | | |
| 3860773cc | 7071bce29 | Fig. 3 | C | Pr-4 | pr-4 | Pi-4 | {Br-5, br-5, Bi-5} C | X4 | k1-4 | k2-4 | ke-4 |

• • •

Device Credentials Table *345*

| Device Identity *106i* | MAC. Initiator *106n* | Primary Network Credentials *350a* | Backup Network Credentials *350b* |
|---|---|---|---|
| 20001 | 38607720A | 109 - 1 | 109 - 3 |
| 20002 | 386077209 | 109 - 1 | 109 - 4 |
| 20003 | 386077400 | 109' - 1 | 109' - 3 |
| 20004 | 3860773cc | 109' - 2 | 109' - 4 |
| 20005 | 386077a09 | 109 - 2 | 109 - 5 |

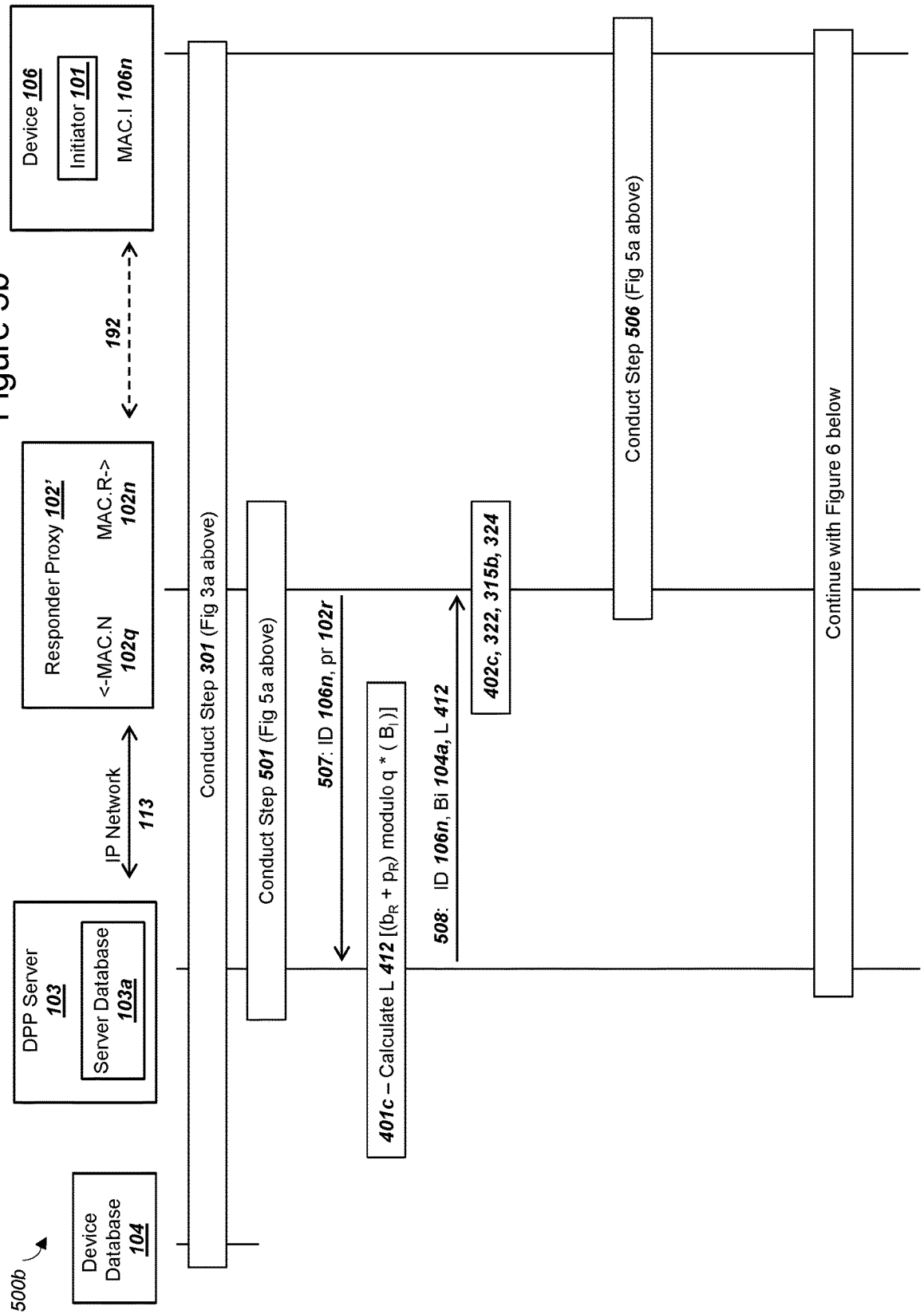

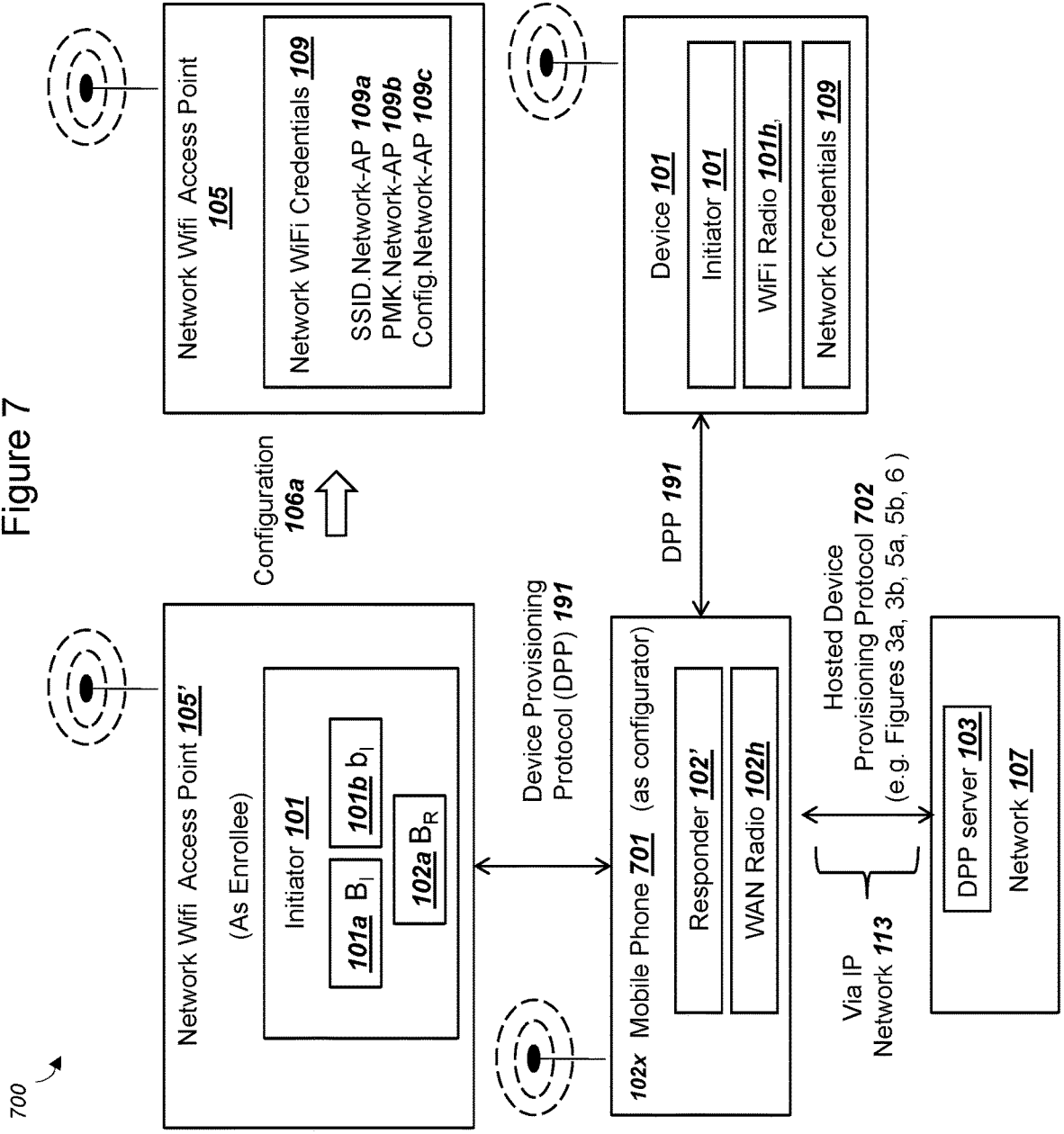

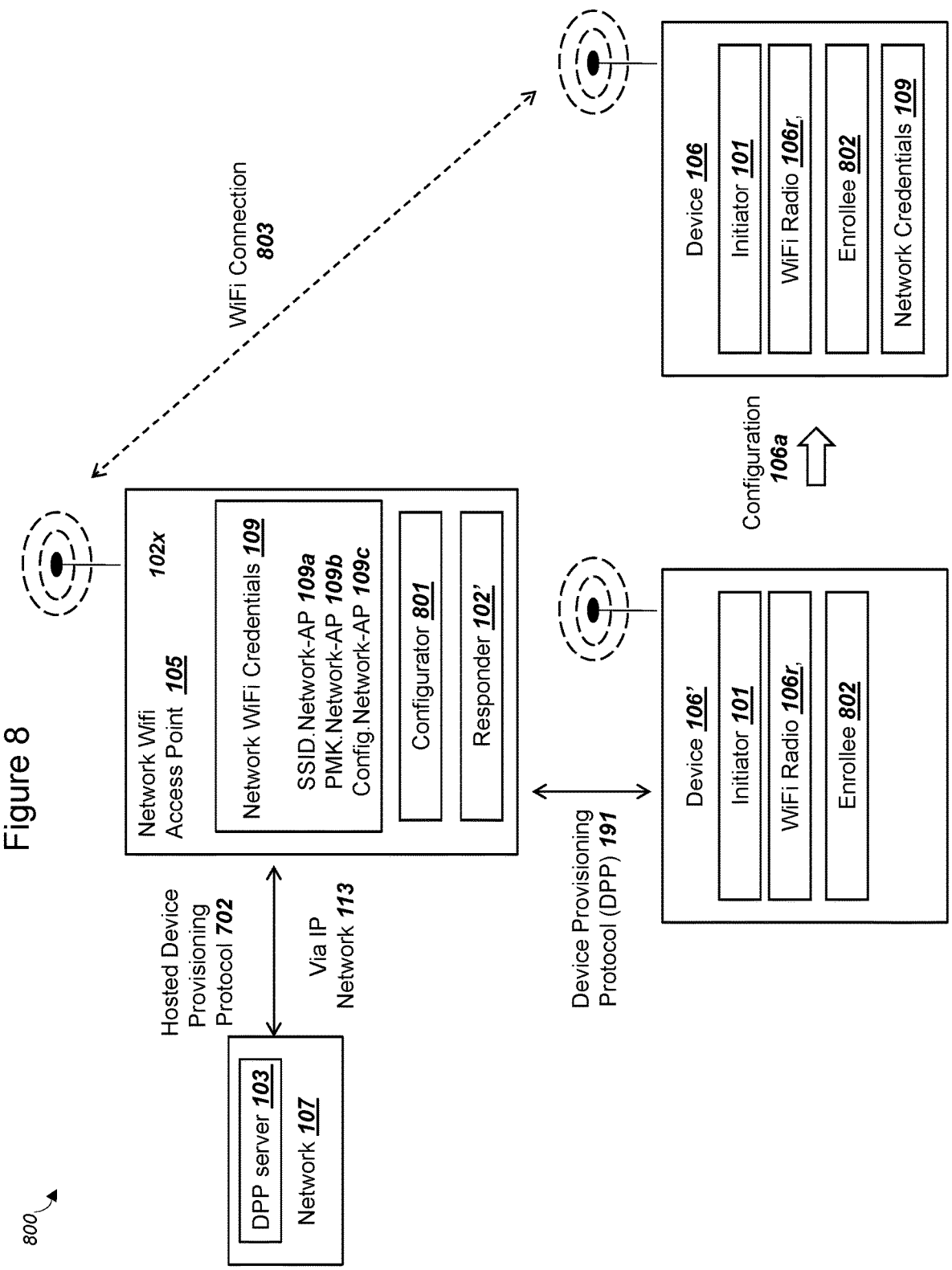

HOSTED DYNAMIC PROVISIONING PROTOCOL WITH SERVERS AND A NETWORKED RESPONDER

CROSS-REFERENCE TO RELATED APPLICATION

This U.S. non-provisional application claims the benefit of the filing date of U.S. Provisional Patent Application Ser. No. 62/672,977, filed May 17, 2018, which is hereby incorporated by reference in its entirety.

BACKGROUND

Technical Field

The present systems and methods relate to authentication and configuration of WiFi radios, and more particularly, to using a Device Provisioning Protocol with a networked responder and a set of servers that record PKI keys, in order securely transfer a set of credentials to a device.

Description of Related Art

The ability to connect transducers such as sensors and actuators with a wireless network is a growing field with many economical applications. As the costs for both electronic hardware and bandwidth continue to decrease, the use of networked transducers is expected to continue increasing over the coming decades. Connecting transducers to a network can be referred to as "machine-to-machine (M2M) communications" or "the Internet of Things (IoT)." Among many potential benefits, IoT technologies allow automated monitoring and/or control of assets, equipment, personnel, or a physical location where manual monitoring may not be economical. Many applications for the "Internet of Things" significantly reduce costs by using automated monitoring instead of manual techniques. Prominent examples of IoT applications today include monitoring and control for building heating/air-conditioning, automobiles, alarm systems, and tracking devices. Fast growing markets for IoT applications today include health applications such as the remote monitoring of a person's fitness activity, heartbeat, or glucose levels, monitoring of industrial equipment deployed remotely in the field, and also security systems.

Many IoT applications can leverage wireless networking technologies, in addition to wired technologies such as Ethernet. Wireless technologies such as wireless local area networks and wireless wide area networks have proliferated around the world over the past 30 years, and usage of these wireless networks is also expected to continue to grow. Wireless local area network (LAN) technologies include WiFi based on the series of 802.11 standards from the Institute of Electrical and Electronics Engineers (IEEE). The many options to connect a transducer device to a wireless network create opportunities for new products and services, but also create several classes of problems that need to be solved. Many of these problems or needs in the art pertain to securely and efficiently configuring the transducer devices. Without configuration including a set of network access credentials, a device cannot normally securely connect with a wireless network. A need exists in the art to allow a user or a network to securely and easily upload to the device a set of network access credentials for a wireless network.

Manually configuring devices to (i) use different security keys, (ii) apply new network access credentials to connect with the owner's selected wireless network can be time consuming and difficult for users. Entering network access credentials is also prone to errors and especially difficult for devices with limited user interfaces, where a limited user interface is common for many devices supporting applications for the "Internet of Things". Loading credentials and network configuration into a device in order to obtain connectivity to a network can also be known as device provisioning or device configuration. In an attempt to address these needs to simplify or automate device provisioning, the WiFi Alliance™ released a Device Provisioning Protocol (DPP) specification on Apr. 9, 2018 as version 1.0 (DPPv1.0), which is herein incorporated by reference in its entirety. Although the DPPv1.0 defines a series of messages between an initiator and a responder in order to support a device configuration, several unmet needs remain in the art in order to securely and easily deploy a Device Provisioning Protocol at wide scale with potentially billions of devices over many years.

To highlight one example unmet need by a DPPv1.0, WiFi capable devices currently being designed and deployed may have an expected life of more than a decade. During that timeframe, the device may need to undergo a configuration or device provisioning step more than one time. Reasons could include either (i) the device undergoes a "factory reset", or (ii) the device needs to be provisioned a second time, such as if the device owner changes or the device is moved to a different network, and other reasons exist as well. But, as stated in DPPv1.0, "threats against this bootstrapping method are possible if public keys and/or codes are reused." A need exists in the art to support a Device Provisioning Protocol in a manner where bootstrapping public keys can be securely reused. A need exists in the art for a responder bootstrap public key to be securely shared among a plurality of devices, while the responder bootstrap private key can remain secured.

In order to securely provision a device, a network may prefer to conduct mutual authentication with an initiator operating in the device that records and operates with initiator PKI keys. The device could be a high value piece of equipment, such as an automobile, health monitoring equipment in a hospital, or industrial equipment, etc. that could be targets for potential hackers seeking to "provision" the devices to a network under their control or a network providing the hackers access to the device. In these cases, an owner or user of a device may prefer that a device provisioning protocol use mutual authentication. The DPPv1.0 supports mutual authentication in order to securely authenticate a device and an initiator before transferring network access credentials to the device, but creates a new and shifted problem of both (i) securely providing a responder bootstrap public key to an initiator and (ii) keeping the responder bootstrap private key secure. In other words, recording a responder bootstrap public key for a responder that is located nearby the initiator can be difficult if there is no pre-existing relationship or communication between a device with an initiator and a responder before the start of a device provisioning protocol. In addition, an insecure responder may have no pre-existing or sufficiently secured relationship with a network, yet the network may need to securely transfer credentials for the network to the device through the insecure responder. A need exists in the art to securely and readily enable an initiator to have access to an responder bootstrap public key, while also enabling a responder to have access to the corresponding initiator bootstrap public key A need exists in the art for a network to securely transfer credentials to a device though an insecure responder.

With the widespread deployment of WiFi access points, a device may have access to potentially a plurality of different access points associated with potentially different networks. Although DPPv1.0 supports configuration of a device, DPPv1.0 does not suggest how a device could be pre-configured to support each of the potential plurality of different networks in order to support a device provisioning protocol. Also, DPPv1.0 does not suggest how a pre-configured device could attempt to communicate with the potential plurality of different access points in order to obtain at least one set of network credentials from the potential plurality of different networks. In other words, a need exists in the art for an initiator to use a pre-configuration in order to automatically and securely receive a set of credentials for the device without having to separately conduct an "out of band" receipt of a responder bootstrap public key when the device is taken to the vicinity of a supported network. A need exists in the art for (i) the credentials to be encrypted in a manner such that the responder cannot feasibly read the credentials, where (ii) the device can receive the encrypted credentials and convert the encrypted credentials into plaintext form in order for the device to load and use the plaintext credentials with a network.

A network can use DPPv1.0 in order to connect devices to the network using a responder. The security for conducting a device provisioning protocol according to DPPv1.0 can depend on the security of a responder, since as envisioned by DPPv1.0 the responder (i) records a responder bootstrap private key and (ii) conducts key exchanges with the responder bootstrap private key. However, a responder for conducting a DPP may be outside the control of a network and may also be an insecure device. A responder could be a "rooted" mobile phone operated by a hacker or also a "rouge" access point, as a couple of examples, and many other examples exist as well. Or, the responder could simply operated by a computing device that is insecure or operates with security policies that do not meet the standards of the network. A need exists in the art for an insecure responder to conduct a device provisioning protocol that is compatible with DPPv1.0, while simultaneously keeping (i) the responder bootstrap private key and (ii) cryptographic operations with the responder bootstrap private key under the control or within the security policies of a network providing credentials to the device.

Many other examples exist as well for needs in the art to support efficient yet secure device configuration or provisioning, and the above are examples are just a few and intended to be illustrative instead of limiting.

SUMMARY

Methods and systems are provided for a networked responder proxy to conduct a device provisioning protocol (DPP) with an initiator operating in a device. The device provisioning protocol can support the Device Provisioning Protocol specification version 1.0 and subsequent versions from the WiFi Alliance™. Conducting a DPP with a device can transfer a set of network credentials to the device, in order for the device to connect with a network using the network credentials. The set of network credentials can also include a network configuration, where the network configuration includes settings to use with a WiFi radio in the device, in order for the WiFi radio to communicate with other nodes with the credentials, including an access point which can provide connectivity to an IP network for the device.

A device can operate an initiator, which periodically automatically transmits DPP authentication request messages until receiving a DPP authentication response from a responder proxy. The initiator can record and operate an initiator configuration, specifying a frequency band to utilize, a wireless networking technology to implement (e.g. 802.11 ac, 802.11ah, 4G LTE, 5G, etc.) and a channel list. The wireless networking technology for an initiator and a responder proxy can support a wide-area network (WAN) as well, such as 4G and 5G networks associated with public land mobile networks. The initiator can record an initiator bootstrap public key, an initiator bootstrap private key, and, when supporting mutual authentication with a responder, a responder bootstrap public key. The PKI keys can be associated with a selected set of cryptographic parameters, where the parameters specify settings to use for cryptographic operations by the initiator. The initiator can also include a random number generator, a PKI key pair generation algorithm, a secure hash algorithm, an elliptic curve Diffie Hellman key exchange algorithm, a symmetric ciphering algorithm, a digital signature algorithm, and an asymmetric ciphering algorithm.

A network can operate an access point, where the access point operates with a set of credentials. The credentials can include an identifier for the network such an SSID, a pairwise master key (PMK) or a pre-shared key (PSK), a pairwise master key identifier (PMKID), and also a configuration. Credentials for other authentication schemes between a device and an access point could be supported as well, including EAP-TLS, EAP-PSK, EAP-AKA, EAP-AKA', etc. The access point can support wireless networking standards in the series of 802.11 standards. A network can also operate a plurality of access points. The network can operate or be associated with a Device Provisioning Protocol (DPP) server, and a device database. The network can be connected to an IP network, which can comprise the globally routable public Internet. Different servers within a network can be connected using an Intranet, a virtual private network (VPN), Internet Protocol Security (IPSEC), or similar techniques to secure communication between the servers. The access point for a network can also comprise a enodeb for 4G wireless technology or a gnodeb for 5G wireless networking technology. The credentials with 4G networking technology can include at least a key K and the credentials with 5G networking technology can include at least a key Kausf.

The network can operate or communicate with the device database. The DPP server in the network can also communicate with the device database. The device database can record information for a plurality of devices before initiators in the device conduct the device provisioning protocol with a responder proxy. The device database can record the device identity, an initiator identity, which could be in the form of an initiator media access control (MAC) address, and a key table. The key table in a device database can record for each device an initiator bootstrap public key, a responder bootstrap public key, and a responder bootstrap private key. Recorded data within a device database can be obtained by a network (i) upon manufacturing from a device manufacturer, or (ii) before distribution of a device to the location of the network's access point.

The DPP server for a network can operate a server database, where the server database records information for a plurality of devices connecting with the network. The server database can record the device identity, media access control (MAC) addresses for devices and initiators, a responder mode, a selected set of cryptographic parameters for each device, a responder bootstrap private key, the initiator bootstrap public key, the responder bootstrap public key, a responder ephemeral public key, and responder ephemeral private key, a public key exchange (PKEX) key, a first, second, and third derived shared secret keys for an initiator. Depending on the responder mode, not all PKI keys and secret shared keys from the previous sentence may be recorded in the server database. The DPP server can also include a set cryptographic algorithms, where the cryptographic algorithms can include a random number generator, a PKI key pair generation algorithm, a secure hash algorithm, an elliptic curve Diffie Hellman key exchange algorithm, a symmetric ciphering algorithm, a digital signature algorithm, and an asymmetric ciphering algorithm. The cryptographic algorithms within a DPP server can be compatible with the equivalent set of cryptographic algorithms in the responder and also the initiator.

A responder can be a computing device that includes a WiFi radio and can be associated with a network. The responder can operate the WiFi radio with a responder configuration in order for the responder to send and receive messages with the initiator. The responder can be located in sufficient proximity with the initiator so that the WiFi radio for the initiator and the WiFi radio for the responder can communicate using 802.11 standards. The responder can operate a DPP application, where the DPP application can also include the set of cryptographic algorithms, which are compatible with cryptographic algorithms in both the initiator and the DPP server. The responder can use an IP network in order to communicate with the network via the IP network.

In a first responder mode, the responder can establish a secure, mutually authenticated connection with a DPP server operating in a network. The DPP server can send configuration data to the responder in preparation for the responder operating as a responder proxy to receive incoming DPP authentication requests from at least one initiator. The responder can conduct a responder configuration step after receiving the responder configuration data from the DPP server. An initiator can receive and/or record a responder bootstrap public key and conduct a series of steps to transmit a DPP authentication request, potentially as a broadcast message on a WiFi channel on which the device operating the responder listens. The initiator can record an initiator key table and an initiator DPP configuration to create and transmit a series of DPP authentication request messages on different channels within the initiator DPP configuration. The responder can receive at least one DPP authentication request message transmitted by the initiator using a channel in a responder DPP configuration. The responder can forward data from the DPP authentication request received from the initiator to the DPP server through the secure session.

Continuing in the first responder mode, the DPP server can then conduct a series of steps in order to process data in the Device Provisioning Protocol (DPP) authorization request received by the responder operating as a responder proxy. The DPP server can derive a responder ephemeral PKI key pair. The DPP server can query a device database for data for the device using either the initiator media access control (MAC) address or the hash value of the initiator bootstrap public key from the DPP authentication request message. The DPP server can conduct a first responder elliptic curve Diffie-Hellman (ECDH) key exchange with the initiator bootstrap public key and the derived responder private key to derive a key k1. The DPP server can use the derived key k1 to decrypt ciphertext from the DPP authentication message and read a plaintext initiator authentication value.

Continuing in the first responder mode, the DPP server can conduct a second responder ECDH key exchange with the received initiator ephemeral public key and the derived responder private key to derive a key k2. The DPP server can conduct a third responder ECDH key exchange with the initiator bootstrap public key and a combination of the derived responder private key and the responder bootstrap private key in order to derive a key ke. The DPP server can derive a responder nonce and calculate a responder authentication value using the received and decrypted initiator authentication value. The DPP server can encrypt the responder authentication value into a first responder ciphertext using the derived key ke. The DPP server can (i) encrypt the first responder ciphertext and the responder nonce and the initiator nonce using the derived key k2 into (ii) a second responder ciphertext. The DPP server can send the responder a message with the second responder ciphertext and the derived responder ephemeral public key. The responder operating as a responder proxy can send the initiator a DPP authentication response message, which includes the second responder ciphertext and the responder ephemeral public key. Note that the responder operating as a responder proxy does not need to record the responder bootstrap private key.

Continuing in the first responder mode, the initiator can receive the DPP authentication response from the responder operating as a responder proxy and perform a series of steps to decrypt the received second responder ciphertext. The initiator can conduct an initiator ECDH key exchange using the responder ephemeral public key and the initiator ephemeral private key in order to derive the key k2. The initiator can conduct a second initiator key exchange using (i) a combination of the responder bootstrap public key and the responder ephemeral public key and (ii) the initiator bootstrap private key and in order to derive the key ke. The initiator can decrypt the second responder ciphertext using the derived key k2. The initiator can read the plaintext responder nonce and the first responder ciphertext. The initiator can decrypt the first responder ciphertext using the derived key ke. The initiator can read the plaintext responder authentication value from the first responder ciphertext. The initiator can calculate the responder authentication value, and if the received responder authentication value matches the calculated responder authentication value, then the responder is authenticated.

The initiator can calculate an initiator authentication value using at least the received and decrypted responder nonce. The initiator can encrypt the initiator authentication value using the key ke, thereby creating an initiator ciphertext. The initiator can send a DPP authentication confirm message to the responder with the initiator ciphertext. The responder operating as a responder proxy can forward the initiator ciphertext to the DPP server through the secure session. The DPP server can decrypt the initiator ciphertext using the derived key ke and read the plaintext initiator authentication value. The DPP server can calculate the same initiator authentication value, and if the received, decrypted initiator authentication value matches the calculated authentication value then the initiator is authenticated with the DPP server and the responder proxy.

After the mutual authentication, the responder can begin operating as a configurator and the initiator can begin operating as an enrollee. The initiator can generate an enrollee nonce and also a configuration attribute, where the configuration attribute describes WiFi capabilities for the device. The initiator can create a second initiator ciphertext by encrypting the enrollee nonce and the configuration attribute with the derived key ke. The initiator can send a DPP configuration request to the responder, where the DPP configuration request can include the second initiator ciphertext. The responder operating as a responder proxy can send the second initiator ciphertext to the DPP server.

The DPP server can receive the second initiator ciphertext from the responder operating as a responder proxy and decrypt the second initiator ciphertext using the derived key ke, in order to read the plaintext enrollee nonce and the configuration attribute. Using the configuration attribute, the DPP server can select a set of network credentials for the device operating the initiator. The DPP server can encrypt the received enrollee nonce and the network credentials using the derived key ke, creating a third responder ciphertext. The DPP server can send the third responder ciphertext to the responder operating as a responder proxy. The responder can forward the third responder ciphertext to the initiator in a DPP configuration response message.

The initiator can receive the DPP configuration response message and decrypt the third responder ciphertext using the derived key ke in order to read the plaintext network credentials. The initiator can pass the network credentials to the device, which can apply the credentials with the WiFi radio for the device. The device can subsequently connect with a network access point using the received network credentials. The network access point can provide connectivity to an IP network for the device. The DPP server and the device can record that the DPP session is successfully completed.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1b is a graphical illustration of a device provisioning protocol for authentication of a responder and configuration of an initiator, in accordance with conventional technology;

FIG. 1c is a graphical illustration of a device provisioning protocol for mutual authentication of an initiator and a responder, and configuration of an initiator, in accordance with conventional technology;

FIG. 1d is an illustration of an exemplary initiator DPP configuration and initiator key database, with tables recording exemplary data for a plurality of bootstrap responder public keys and bootstrap initiator private keys, in accordance with exemplary embodiments;

FIG. 2a is an illustration of an exemplary device database, with tables for a device database recording exemplary data, in accordance with exemplary embodiments;

FIG. 3c is an illustration of an exemplary server database, with tables for a server database recording exemplary data, in accordance with exemplary embodiments;

FIG. 5b is a simplified message flow diagram illustrating an exemplary system with exemplary data sent and received by a device database, a DPP server, a responder proxy, and an initiator, in accordance with exemplary embodiments;

FIG. 7 is a graphical illustration of an exemplary system, where an access point with an initiator communicates with a responder proxy using a hosted device provisioning protocol, in accordance with exemplary embodiments; and, FIG. 8 is a graphical illustration of an exemplary system, where an access point operates as a responder proxy for a device with an initiator, in order transfer a set of network credentials to the device, in accordance with exemplary embodiments.

DETAILED DESCRIPTION

FIG. 1a

Figure 1A:
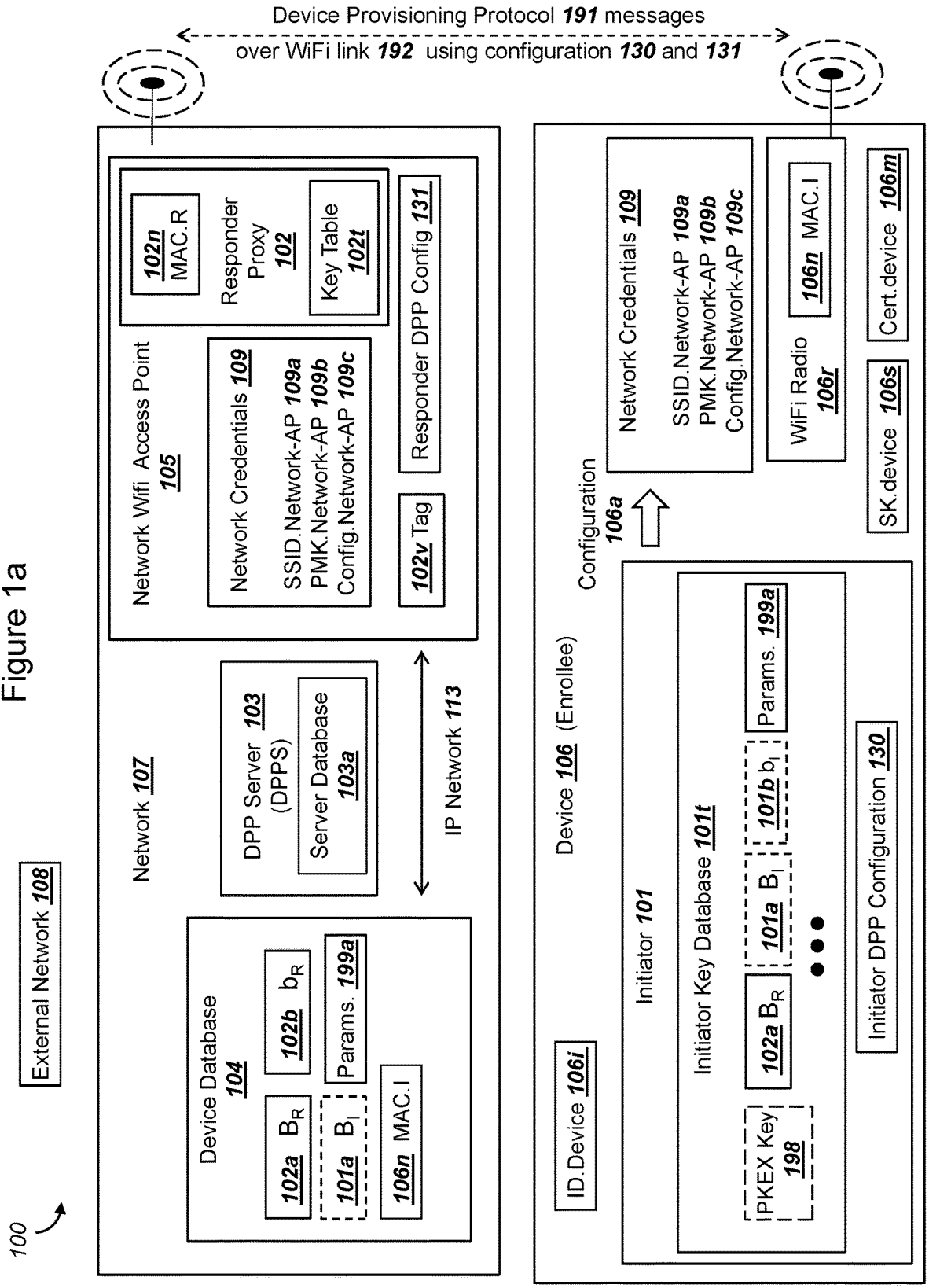
FIG. 1a is a graphical illustration of an exemplary system, where a network operates a responder and communicates with an initiator in a device, in order to conduct a device provisioning protocol, in accordance with exemplary embodiments.

FIG. 1a is a graphical illustration of an exemplary system, where a network operates a responder and communicates with an initiator in a device, in order to conduct a device provisioning protocol, in accordance with exemplary embodiments. The system 100 can include a network 107 and a device 106. Network 107 can operate a WiFi access point 105, a DPP server 103, and a device database 104. The nodes within network 107 can communicate via an IP network 113. Device 106 can be a computing device operating an initiator 101 and a WiFi radio 106r. Device 106 can include a device identity 106i for a network 107 to track or identify a device 106 across a plurality of different devices 106. Or, in exemplary embodiments a media access control (MAC) address MAC.I 106n for device 106 can be used as a device identity.

Responder proxy 102 can operate as a responder and send and receive messages with device 106 operating an initiator 101 according to a device provisioning protocol (DPP) 191 as specified in the "Device Provisioning Protocol Specification version 1.0" (DPPv1.0) from the WiFi Alliance™, which is hereby incorporated by reference in its entirety. Subsequent and related versions of a DPP 191 could be supported as well by initiator 101 in device 106 and a responder proxy 102. A summary of the message flows between responder proxy 102 and device 101 according to the DPP 191 are depicted and described in connection with FIG. 1b and FIG. 1c below, as well as subsequent figures herein. The message flows for a DPP 191 between responder proxy 102 and initiator 101 could be via a WiFi data link 192, where the WiFi data link 192 operated by (i) initiator 101 can use an initiator DPP configuration 130 and (ii) responder proxy 102 can use a responder DPP configuration 131. Responder proxy 102 can be associated with a tag 102v, where tag 102v can record a responder bootstrap public key Br 101a.

Tag 102v can be in the form of a QR code or NFC tag, which could be read by device 106 in order to obtain the responder bootstrap public key Br 102a "out of band". Or, in some embodiments tag 102v can be optionally omitted, where an initiator 101 can receive or record responder bootstrap public key Br 102a via other means, such as during manufacturing or distribution of device 106 where a device 106 could record a plurality of different responder bootstrap public keys Br 102a in a responder public key table 101ta depicted and described in connection with FIG. 1d below.

Responder proxy 102 could operate a WiFi radio as depicted, where the WiFi radio could record a media access control (MAC) address MAC.R 102n. MAC.R 102n for responder 102 could comprise a string of octets to identify responder 102 with any of a WiFi access point 105, device 106, network 107, and DPP server 103. In order to acquire the data to function as a responder according to a DPP 191 and DPPv1.0, responder 102 in FIG. 1a can communicate and transmit/receive data from network 107 via IP network 113. Additional details regarding the electrical components within a responder 102 or WiFi access point 105 operating a responder 102 are depicted and described in connection with FIG. 1f below. The responder proxy 102 can also include a set cryptographic algorithms, where the cryptographic algorithms can include a random number generator, a PKI key pair generation algorithm, a secure hash algorithm, an elliptic curve Diffie Hellman key exchange algorithm, a symmetric ciphering algorithm, a digital signature algorithm, and an asymmetric ciphering algorithm. The cryptographic algorithms within a responder proxy 102 can be compatible with the equivalent set of cryptographic algorithms in the initiator 101 and also the DPP server 103.

Embodiments of the present disclosure contemplate both (i) some of the functionality of a responder in the DPP specification version 1.0 operates within responder proxy 102 depicted in FIG. 1a, and (ii) other functionality of a responder according to the DPP protocol can be performed or conducted by DPP server 103. In other words, (x) from the perspective of device 106, responder proxy 102 can operate as a responder according to the DPP Specification, but (y) in the present disclosure some of the functionality and data for a responder as contemplated by the DPP Specification remains in the DPP server 103. Depictions and descriptions below in the present disclosure may utilize the term "responder 102" or configured "responder 102'", which can also comprise a "responder proxy 102" depicted in FIG. 1a. As contemplated herein, a "responder proxy 102'" can be equivalent to "responder 102'."

This configuration of operating a responder proxy 102 in a system 100 (along with proper operation of a network 107) can address and solve the needs in the art described above. A responder proxy 102 can communicate with DPP server 103 via IP network 113. Although a responder proxy 102 is depicted as operating in WiFi access point 105 in FIG. 1a, other embodiments of the present disclosure contemplate that different WiFi capable devices than access point 105 could operate a responder proxy 102, such as a mobile phone 701 depicted in FIG. 7 below. Other possibilities exist as well for a WiFi capable device to operate a responder proxy 102 without departing from the scope of the present disclosure. In addition, although the use of a WiFi radio is depicted in FIG. 1a and other figures herein, other wireless networking technologies and radios besides WiFi could be used with responder proxy 102 and device 106 with initiator 101. As one example, (i) a responder proxy could operate with a wireless wide area network (WAN) radio such as a "gnodeb" with a 5G network and (ii) device 106 with initiator 101 could operate a radio module supporting 5G networking standards.

IP network 113 could be either a Local Area Network (LAN) or a Wide Area Network (WAN), or potentially a combination of both. IP network 113 could comprise a packet switched network supporting either IEEE 802.11 (WiFi) standards and/or IETF standards for IP networking such as IPv4 or IPv6. Responder 102 within access point 105 and network 107 could also utilize a variety of WAN wireless technologies to communicate, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, proposed 5G networks, and other examples exist as well. A wired responder proxy 102 can connect to the IP network 113 via a wired connection such as, but not limited to, an Ethernet, a fiber optic, or a Universal Serial Bus (USB) connection (not shown). In some exemplary embodiments, access to an IP network 113 for responder proxy 102 can be provided by access point 105, where access point 105 may also record and operate with a set of network credentials 109.

IP network 113 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 113 could utilize globally routable IP addresses, and a private IP network 113 could utilize private IP addresses which could also be referred to as an Intranet. Other possibilities for IP Network 113 exist as well without departing from the scope of the disclosure. Although not depicted in FIG. 1a, elements within a system 100 could each operate or be associated with a firewall, such that packets from IP network 113 are filtered or restricted in order to secure the communication between the nodes.

Device 106 can comprise a computing device with a WiFi radio for transmitting and receiving data such as via WiFi data link 192. Device 106 can include a WiFi radio 106r. Radio 106r and radio 102i for responder proxy 102 can also support other wireless technologies besides WiFi, including 4G and 5G networks. WiFi radio 106r can operate with a media access control (MAC) address MAC.I 106n. Responder 102 can read the value MAC.I 106n from messages transmitted by device 106 over WiFi link 192. Device 106 can operate an initiator 101 and, after a configuration step 106a, also operate a set of network WiFi credentials 109 that are compatible with an access point 105. Device 106 could be powered via any of (i) traditional "wall power" potentially with an AD/DC adapter, (ii) a battery which may be periodically recharged or replaced, (iii) power over a wired LAN connection such as "power over Ethernet", and other possibilities exist as well. A device 106 can record a certificate cert.device 106m, which can record a device public key, which can be associated with a device private key SK.device 106s also recorded in device 106. For the system depicted in FIG. 1a, device 106 operating an initiator 101 can have a roll of an enrollee, and responder proxy 102 can operate with a roll of a configurator.

The initiator 101 in device 106 can record an initiator key database 101t, which could comprise a database such as SQLlite, or alternatively simply a text file of keys and identities, and other possibilities exist as well for the form and structure of keys recorded in an initiator 101. In exemplary embodiments, the initiator key database 101t can be stored in a secure processing environment or a secure enclave for a CPU operating in device 106. The initiator key database 101t can optionally include an initiator bootstrap public key Bi 101a, an initiator bootstrap private key bi 101b (for embodiments supporting a mutual authentication 142 depicted in FIG. 1c below), a responder bootstrap public key Br 102a, a set of cryptographic parameters 199a for the PKI keys, and optionally a public key exchange protocol (PKEX) shared secret key 198. The initiator 101 in device 106 can comprise a process or running software program operated by a processor and recorded in memory for device 106. Although not depicted in FIG. 1a, an initiator 101 can also include a random number generator, a PKI key pair generation algorithm, a secure hash algorithm, an elliptic curve Diffie Hellman key exchange algorithm, and a symmetric ciphering algorithm, a digital signature algorithm, and an asymmetric ciphering algorithm. The cryptographic algorithms within an initiator 101 can be compatible with the equivalent set of cryptographic algorithms in a responder proxy 102 and also DPP server 103.

A network 107 can operate an access point 105, where the access point operates with a set of credentials 109. The credentials 109 can include an identifier for the network such an SSID.network-AP 109a, at least one pairwise master key (PMK) PMK.network-AP 109b or a pre-shared key (PSK), a pairwise master key identifier (PMKID) (not shown), and also a configuration Config.network-AP 109c. The access point can support wireless networking standards in the series of 802.11 standards. Credentials 109 for other authentication schemes between a device and an access point could be supported as well, including EAP-TLS, EAP-PSK, EAP-AKA, EAP-AKA', etc. A network 107 can also operate a plurality of access points 105. In addition, access point 105 can comprise a plurality of different WiFi radios to collectively function as one access point 105, such as with "mesh" WiFi networks. Or, access point 105 can operate as a single WiFi router. The network 107 can include or be associated with a Device Provisioning Protocol (DPP) server 103, and a device database 104. Different servers within the network 107 can be connected using an Intranet, a virtual private network (VPN), Internet Protocol Security (IPSEC), or similar techniques to secure communication between the servers.

The network 107 can operate or communicate with the device database 104. The DPP server 103 in the network 107 can also communicate with the device database 104. The device database 104 can record information for a plurality of devices 106 before an initiator 101 for the device 106 conducts the device provisioning protocol 191 with the responder proxy 102. The device database 104 can record an identity for device 106, which could be in the form of either (i) an initiator media access control (MAC) address MAC.I 106n (depicted) or a hash value 101aa for the initiator bootstrap public key Bi 101a (where the hash value 101aa is not shown in FIG. 1a but is shown in FIG. 1b and other Figures below).

A device database 104 can record at least one responder bootstrap public key 102a with a corresponding responder bootstrap private key 102b, and optionally an initiator bootstrap public key 101a for embodiments supporting a mutual authentication depicted in FIG. 1c and other Figures below. Recorded data within a device database 104 can be obtained by a network 107 from either (i) upon manufacturing from a device manufacturer, or (ii) before distribution of a device to the location of the network's access point. Some data in a device database 104 could also be acquired by a responder 102 or a network 107 prior to the start of a DPP 191. For example, the derivation and recording of responder bootstrap private key br 102b can be independent of recording data in a database 104 for a device 106 (such as MAC.I 106n, key Bi 101a, etc.). Device database 104 can also record a set of cryptographic parameters 199a associated with the PKI keys for responder 102 and initiator 101. Additional exemplary data for a device database 104 is depicted and described in connection with FIG. 2a below.

The DPP server 103 for a network 107 can operate a server database 103a, where the server database 103a records information for a plurality of devices 106 and a plurality of responders proxies 102 connecting with the network 107. A server database 103a can also record data for initiators 101 in devices 106, as depicted and described in connection with FIG. 3c below. Depending on a responder mode 306a in FIGS. 2a and 3c below, only selected sets of PKI keys and secret shared keys for initiators 101 may be recorded in the server database 103a. The DPP server 103 can also include a set cryptographic algorithms, where the cryptographic algorithms can include a random number generator, a PKI key pair generation algorithm, a secure hash algorithm, an elliptic curve Diffie Hellman key exchange algorithm, a symmetric ciphering algorithm, a digital signature algorithm, and an asymmetric ciphering algorithm. The cryptographic algorithms within a DPP server 103 can be compatible with the equivalent set of cryptographic algorithms in the initiator 101 and also the responder proxy 102.

Note that the security of communications between a device 106 and an access point 105 using credentials 109 may generally depend on the security of a configuration step 106a, which in turn may rely on a device provisioning protocol 191. Further, a manufactured device 106 may not have the credentials 109 or configuration in order to communicate with an access point 105 without successfully completing a DPP 191 and a configuration step 106a (or other manual or cumbersome means) in order for device 106 to securely receive and use network credentials 109. After a DPP 191 and a configuration step 106a described in the present disclosure and in multiple Figures below, device 106 can communicate with access point 105 using credentials 109.

Network 107 can also be associated with an external network 108, which can comprise a network similar to network 107. External network 108 could operate a plurality of access points 105, and in exemplary embodiments although the device provisioning protocol 191 is conducted with network 107, the credentials 109 transferred to device 106 in a configuration step 106a may belong to the external network 108, and the device 106 could connect with an access point operated by the external network 108 using the credentials 109 instead of connecting with access point 105 operated by network 107. For these embodiments, network 107 could receive the credentials 109 for device 106 as asymmetrically encrypted credentials 109' (described in FIG. 3b below) from the external network 108.

FIG. 1b

FIG. 1b is a graphical illustration of a device provisioning protocol for authentication of a responder and configuration of an initiator, in accordance with conventional technology. FIG. 1b depicts a summary of the WiFi Device Provisioning Protocol (DPP) specification, version 1.0 which was published on Apr. 9, 2018. The summary depicted in FIG. 1b highlights recorded bootstrap PKI keys, derived ephemeral PKI keys, and messages transmitted and received between an initiator 101 and a responder 102*. The use of keys and messages for a DPP 191 can accomplish both (i) authenticating the responder 102* and (ii) transfer a configuration object to initiator 101 where the configuration object could comprise a set of network access credentials 109 from FIG. 1a. Responder 102* is depicted with a "*" and has several differences than a responder proxy 102 depicted in FIG. 1a and subsequent Figures below, although some functionality is shared between a responder 102* in FIG. 1b and responder proxy 102 herein. Both responder 102* and responder proxy 102 (from FIG. 1a and other Figures below) can send and receive the full and complete set of a DPP messages for a Device Provisioning Protocol 191. As contemplated herein, a responder 102* can comprise a responder operating according to the conventional technology depicted in FIG. 1b and FIG. 1c, while a responder 102 or responder 102' or responder proxy 102' can (i) operate as a proxy for DPP 191, and (ii) record and operate on different PKI keys than those depicted for responder 102* in FIG. 1b.

In other words, responder 102* and a responder proxy 102 can send equivalent messages such that a initiator 101 (i) would process the messages in the same manner and (ii) would not normally be able to detect to discern whether a responder proxy 102 or an responder 102* was transmitting and receiving messages for the Device Provisioning Protocol 191. In the present disclosure, responder proxy 102 (not depicted in FIG. 1b, but depicted in FIG. 1a, FIG. 1f, FIG. 3a, etc.) can send and receive DPP messages 122, 123, etc. with initiator 101 as an responder according to the DPP Specification 1.0. Responder 102* or a responder proxy 102 can be a process, program, firmware, or software application operating in a computing device with a WiFi compatible radio, in order to communicate with an initiator 101 in a device 106 via a WiFi data link 192 (in FIG. 1a). Exemplary additional configurations for an initiator 101 and a responder proxy 102 within computing devices is depicted and described in connection with FIGS. 7 and 8 below, and other possibilities exist as well without departing from the scope of the present disclosure.

Other differences between a responder 102* and a responder proxy 102 can exist in the present disclosure. For a system 100 with a responder proxy 102 in FIG. 1a and Figures below, the recordation of PKI keys, PKI key derivation, and cryptographic processes such as symmetric encryption and decryption can be distributed between a responder proxy 102 and a DPP server 103. However, a responder 102* can internally record the keys necessary for symmetric key exchange, key derivation, and symmetric encryption and decryption, as contemplated by DPP specification version 1.0. The distributed storage and operation with PKI keys for a system that includes a responder proxy 102 is depicted and described in more detail in connection with FIG. 3a, FIG. 3b, FIG. 3c, FIG. 5a, FIG. 5b, and FIG. 6 below. Additional details for internal components, memory structures, values, and operation of a responder proxy 102 in order to provide equivalent functionality as responder 102* for an initiator 101 are described in Figures below.

Initiator 101 can record ephemeral keys and derive symmetric encryption keys in order to authenticate the responder 102* and receive the network access credentials 109 according to a Device Provisioning Protocol 191. For a system with responder authentication 141, an initiator 101 can record a media access control (MAC) address MAC.I 106n. MAC.I 106n can (i) be associated with a WiFi radio operating in device 106 that also operates initiator 101 and (ii) comprise a string of octets in order to uniquely identify initiator 101 and/or device 106 within a wireless network. MAC.I 106n can also comprise an identity for device 106 with network 107 in FIG. 1a. With current, convention technology, MAC.I 106n can comprise a string of 6 octets, although other possibilities exist as well for a MAC.I 106n. Initiator 101 can also operate a key pair generation function 101y in order to derive ephemeral PKI keys such as an initiator ephemeral public key Pi 101c and an initiator ephemeral private key pi 101d. As contemplated herein, an ephemeral PKI key can also be referred to as a "protocol" key. In other words, key Pi 101c can be referred to as either (i) an initiator protocol public key Pi 101c or (ii) an initiator ephemeral public key Pi 101c, which can both represent the same numeric value, number, or sequence of digits.

A key pair generation function 101y or 102y could use (i) a random number generator in order to derive the PKI private key and (ii) a selected set of cryptographic parameters 199a (depicted in FIG. 1a above and FIG. 2a below and other Figures herein) in order to specify an elliptic curve cryptography (ECC) curve name, key length, key formatting, etc. As contemplated herein, the algorithms used with ECC PKI keys in the present disclosure can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards.

With a random number generated by responder 102* or a responder proxy 102, a key pair generation function 102y, a derived ephemeral responder private key pr 102r can be used to derive a corresponding ephemeral initiator public key Pr 102p. The two derived PKI keys can be used in conjunction for subsequent operations such as an Elliptic Curve Diffie Hellman key exchange and also other cryptographic algorithms such as a key derivation function and a digital signature algorithm. As contemplated in the present disclosure, the use of a capital letter as the first character for a PKI key can represent a public key, the use of a lower case letter as the first character for a PKI key can represent a private key. As contemplated in the present disclosure, the second letter for a PKI key can represent the entity the key is associated with or belongs to (e.g. "r" for responder 102 and "i" for initiator 101). Further, the letter "B" or "b" as the first character for a PKI key can represent a recorded bootstrap key, which could be static or relatively static over the lifetime of a responder or initiator, and the letter "P" or "p" the first character for a PKI key can represent an ephemeral key, which can also be referred to as a protocol key.

Responder 102* in FIG. 1b and FIG. 1c can include functionality to operate as a responder according to the DPP Specification version 1.0 for the purpose or transmitting and receiving messages according to the DPP protocol 191. For a DPP 191, a responder 102* can record a responder bootstrap public key Br 102a, a responder bootstrap private key 102b, a MAC address MAC.R 102n, and also operate a key pair generation algorithm 102y. A responder bootstrap public key Br 102a and responder bootstrap private key br 102b recorded in responder 102* could comprise an ECC key pair selected and formatted to be compatible with the set of parameters 199a for initiator 101 (in FIG. 1a above). Ephemeral bootstrap PKI keys for responder 102* could also be formatted and selected with a compatible set of cryptographic parameters 199a for Pi 102p and pi 102r. Bootstrap PKI keys for responder 102* could be recorded in responder 102* or nonvolatile memory for a WiFi enabled computing device operating a responder 102*. With the conventional technology depicted in FIG. 1b, the bootstrap PKI keys could be recorded in responder 102* during manufacturing or a configuration of responder 102* before receiving the DPP authentication request message 122. MAC address MAC.R 102n can comprise an identity of responder 102* or the computing device operating responder 102* on a WiFi network, and can be similar to MAC.I 106n for an initiator 101 as described above.

An initiator 101 and a responder 102* can conduct a Device Provisioning Protocol (DPP) 191. Again, as contemplated herein, an exemplary Device Provisioning Protocol 191 according to conventional technology could comprise the "Device Provisioning Protocol Specification" version 1.0 as published by the WiFi Alliance™. In message 121, an initiator 101 can receive the responder bootstrap public key Br 102a for responder 102*. The "out of band" transfer of Br 102a in message 121 could comprise several different possible methods for initiator 101 to receive Br 102a, which are also described in the DPP specification 1.0, such as via reading a QR code on the device operating responder 102*, reading a near-field communications tag, using a Bluetooth wireless connection to read Br 102a from responder 102*, and other possibilities exist as well. The data could be read via a tag 102v for responder 102 depicted and described in connection with FIG. 1a. A DPP 191 also contemplates that associated information for responder 102* could be transferred in message 121, such as an identity for the WiFi enabled computing device operating responder 102*, MAC.R 102n, in addition to Br 102a and parameters 199a in message 121, as well as a responder DPP configuration 131 as depicted in FIG. 1a.

Initiator 101 can receive Br 102a from message 121 and derive PKI keys Pi 101c and pi 101d. Initiator 101 can conduct an Elliptic Curve Diffie Hellman key exchange algorithm 401a as depicted and described below in key exchange 314 step for FIG. 4a in order to derive a first shared secret key with responder 102*. Initiator 101 can derive a random number comprising an initiator nonce and also determine a set of capabilities for the initiator, such as a configurator or enrollee as specified in DPP specification version 1.0. Initiator 101 can encrypt the initiator nonce and the initiator capabilities using the derived shared secret key as depicted and described in connection with an encryption step 315 in FIG. 4a below. Initiator 101 can send the derived public key Pi 101c and a ciphertext with the encrypted data in a message 122. Although not depicted in FIG. 1b, initiator 101 can also send a hashed value of responder bootstrap public key Br 102a in message 122.

As specified in DPP specification version 1.0, message 122 could also include a hashed value for initiator bootstrap public key Bi 101a. But, for a responder authentication 141 depicted in FIG. 1b, the hashed value of Bi 101a may optionally not be calculated or sent in message 122 (since responder 102* may not record the corresponding initiator bootstrap public key Bi 101a for a responder authentication 141 as depicted in FIG. 1b). The hash algorithm on a bootstrap public key could comprise the SHA-256 hash algorithm according to IETF RFC 5754 titled "Using SHA2 Algorithms with Cryptographic Message Syntax". Other hash algorithms could be used as well and specified in a selected set of cryptographic parameters 199 as depicted and described in connection with FIG. 2b below, such as SHA-3, SHA-384, etc. Message 122 can comprise a Device Provisioning Protocol Authentication Request according to DPP specification version 1.0. Additional details for a message 122 are provided in section 6.2.2 of DPP specification version 1.0.

Responder 102* can receive message 122 and follow the steps for a responder according to the section 6.2.3 of DPP specification version 1.0, in order to generate a Device Provisioning Protocol Authentication Response, which could comprise message 123. Responder 102* can conduct an Elliptic Curve Diffie Hellman key exchange algorithm 401a as depicted and described below in key exchange 319 step for FIG. 4a in order to mutually derive a first shared secret key with initiator 101. Responder 102* can decrypt the initiator nonce and the initiator capabilities using the derived first shared secret key as depicted and described in connection with an decryption step 320 in FIG. 4a below. Responder 102* can use the key pair generation algorithm 102y in order to derive an ephemeral responder public key Pr 102p and a corresponding ephemeral private key 102r. Responder 102* can use the derived responder ephemeral private key pr 102r and the received initiator ephemeral public key Pi 101c in order to conduct a key exchange algorithm 314b as depicted below in FIG. 4b and derive a second shared secret key. The first mutually derived symmetric key can comprise k1 and the second mutually derived symmetric key can comprise k2 according to the DPP specification version 1.0. Responder 102* can derive a random number comprising a responder nonce and also determine a set of capabilities for the responder, such as a configurator as specified in DPP specification version 1.0.

Responder 102* could also generate a responder authentication value, which could comprise a hash value over at least the initiator nonce received in message 122 and the generated responder nonce. Responder 102* could use the first shared secret key and the second shared secret key in order to derive a third shared secret key. Responder 102* could encrypt the responder authentication value with the third shared secret key and also then include the encrypted responder authentication value with the responder nonce and responder capabilities in a ciphertext. The ciphertext could be encrypted with the second shared key, as depicted and described in connection with an encryption step 315b in FIG. 4b below. Responder 102* could send the derived ephemeral responder public key Pr 102p and the ciphertext in a message 123.

Initiator 101 can receive message 123 and record or store the received ephemeral responder public key Pr 102p. Initiator 101 can follow the steps in section 6.2.4 of DPP specification version 1.0 in order to process message 123 and confirm the authentication response from responder 102* in message 123. Initiator 101 can mutually derive the second shared secret key using the received ephemeral responder public key 102p and the derived initiator ephemeral private key 101d, using a key exchange algorithm 319a as depicted in FIG. 4b. Initiator 101 can decrypt the ciphertext in message 123 using the second mutually derived secret shared key and a decryption step 320b in FIG. 4b. Initiator 101 can derive the third secret shared key using at least the first mutually derived secret shared key and the second mutually derived secret shared key. Initiator 101 can use the third mutually derived secret shared key to decrypt the encrypted responder authentication value using a decryption step 328 in FIG. 4c. Initiator 101 can calculate a value for the responder authentication, and if the calculated value for the responder authentication matches the received value for the responder authentication, then responder 102* can be considered authenticated.

Although not depicted in FIG. 1b, after authenticating responder 102*, initiator 101 can send an authentication confirm message, which could comprise a DPP authentication confirm message according to section 6.2.4 of the DPP specification version 1.0. The authentication confirm message can also include an initiator authentication value, which could be encrypted with the third secret shared key. The responder 102* can receive the encrypted authentication confirm value and decrypt the value and also internally calculate the initiator authentication value. If the received initiator authentication value and the calculated authentication confirm values are equal, then the initiator is authenticated with the responder 102*. Note that for a responder authentication 141 in FIG. 1b, the authentication of initiator 101 by responder 102* is weak and only comprises verifying that initiator 101 records the bootstrap public key Br 102a for responder 102*. Also, although not depicted in FIG. 1b, responder 102* could have the capabilities of a configurator and receive a DPP configuration request message from initiator 101, which could take the role of an enrollee. The DPP configuration request message can be according to section 6.3.2 of the DPP specification version 1.0, and can include an enrollee nonce, which could be a random number generated by the enrollee/initiator.

As depicted in FIG. 1b, responder 102* can then send a configuration object in a ciphertext in message 124. Message 124 could comprise a DPP configuration response message according to section 6.3.3 of the DPP specification version 1.0. Responder 102* can record the configuration object before sending message 124. In the present disclosure, the configuration object comprises the network credentials 109 depicted in FIG. 1a above. In other words, a configuration object can be configuration information for a device 106 with initiator 101 to use in order to connect with other devices via a wireless network. Configuration object could contain a list of network identifiers, device identifiers, RF band and channel information, configuration parameters, shared keys, PKI keys, names, passwords, group temporal keys, a shared secret 198 for a PKEX key exchange, a pairwise master key (PMK) and PMK identity, etc. An exemplary list of possible values for a configuration object is depicted in table 14 of DPP specification version 1.0. In message 124, the network credentials 109 as a configuration object can be sent in a ciphertext using the third mutually derived secret shared key. As depicted in FIG. 1b, the ciphertext can include both the enrollee nonce and the network credentials 109. Initiator 101 can receive message 124, decrypt the ciphertext using the third mutually derived secret shared key, and record the network credentials 109. Device 101 can then apply the network credentials 109 and communicate with access point 105 using the received network credentials 109.

FIG. 1c

FIG. 1c is a graphical illustration of a device provisioning protocol for mutual authentication of an initiator and a responder, and configuration of an initiator, in accordance with conventional technology. FIG. 1c depicts a summary of the WiFi Device Provisioning Protocol (DPP) specification, version 1.0 which was published on Apr. 9, 2018, supporting a mutual authentication 142 by both initiator 101 and responder 102*. The summary depicted in FIG. 1c highlights recorded bootstrap PKI keys, derived ephemeral PKI keys, and messages transmitted and received between an initiator 101 and a responder 102*. Many of (i) the PKI keys for initiator 101 and responder 102*, and (ii) the messages transmitted between the nodes are equivalent to those depicted and described in connection with FIG. 1b. This description of FIG. 1c will focus upon the differences in order for initiator 101 and responder 102* to mutually authenticate.

In order to support a mutual authentication between initiator 101 and responder 102*, initiator 101 can record an initiator bootstrap public key Bi 101a and an initiator bootstrap private key bi 101b. Although initiator bootstrap public key Bi 101a is depicted within initiator 101, another entity besides initiator 101 could record the public key and make it available to other nodes such as a responder 102*. As contemplated by the DPP Specification, the initiator bootstrap keys can be recorded with initiator 101 before conducting a DPP 191 authentication and configuration with responder 102*. For example, the bootstrap PKI keys for the initiator could be recorded during manufacturing or distribution of the initiator, or loaded by an initiator user before conducting the depicted communications with responder 102*. Bootstrap public keys for the initiator can support a selected set of cryptographic parameters 199a, where the selected set of cryptographic parameters 199a can match the parameters used by keys in responder 102*. The DPP specification version 1.0 identifies the minimal set of cryptographic parameters in order to ensure compatibility, which can comprise the "set A" for a set of cryptographic parameters 199 depicted in FIG. 2a below.

In order to conduct a mutual authentication 142 in addition to the responder authentication 141 depicted in FIG. 1c, a responder 102* should have access to the initiator bootstrap public key Bi 101a. In message 126, a responder 102* can receive the initiator bootstrap public key Bi 101a for initiator 101. The "out of band" transfer of Bi 101a in message 126 could comprise several different possible methods for responder 102* to receive Bi 101a, which are also described in the DPP specification 1.0, such as via reading a QR code, reading a near-field communications tag, using a Bluetooth wireless connection to read Bi 101a from initiator 101, and other possibilities exist as well, including using WiFi direct to first establish a "peer-to-peer" WiFi connection. A DPP 191 also contemplates that associated information for initiator 101 could be transferred in message 126, such as a device identity for initiator 101, MAC.I 106n or hash value 101aa, in addition to Bi 101a. As depicted in FIG. 1c, the responder 102* can also record the initiator bootstrap public key Bi 101a, which can be used to authenticate the initiator 101 as described below.

For a mutual authentication 142 between device 101 and responder 102*, the two nodes can exchange the same or equivalent messages as message 122 and message 123, which were also described above in connection with FIG. 1b. For mutual authentication, the third shared encryption key ke in DPP specification version 1.0 can be derived by a responder 102* using a key exchange step 321 and the received initiator bootstrap public key Bi 101a as depicted and described in connection with FIG. 4c below. The use of initiator bootstrap public key Bi 101a for the key exchange step 321 is described in section 6.2.3 of the DPP Specification version 1.0. The difference between the third mutually derived secret shared key ke for a mutual authentication 142 and a responder authentication 141 is the inclusion of initiator bootstrap public key Bi 101a in the key exchange algorithm 401c and key derivation function 402c in FIG. 4c. The first mutually derived secret shared key can comprise k1 and the second mutually derived secret shared key can comprise k2. The third mutually derived secret shared key ke is used by the responder 102* to encrypt the responder authentication value as depicted in an encryption step 322 in FIG. 4c. The responder authentication value can include a random number "initiator nonce" or I-nonce from the initiator 101 in message 122. The responder authentication value can comprise the value "R-auth" in step 3 of section 6.2.3 of DPP specification version 1.0.

Initiator 101 can also mutually derive the third secret shared encryption key ke using the initiator bootstrap private key bi 101b and key exchange step 327 depicted and described below in connection with FIG. 4c. Initiator 101 can subsequently decrypt the responder authentication value using the mutually derived third secret shared encryption key ke and a decryption step 328 as depicted and described in connection with FIG. 4c below. Initiator 101 can calculate the same value for the responder authentication value as described in section 6.2.4 of DPP specification version 1.0. If the received, decrypted responder authentication value matches the calculated responder authentication value, then the responder 102* is authenticated.

The initiator 101 can calculate an initiator authentication value using at least the received responder nonce in message 123 and encrypt the initiator authentication value using the mutually derived third secret shared key ke (from a key exchange step 327) and send the initiator authentication value in a message (not shown in FIG. 1c). The responder 102* can (i) decrypt the encrypted initiator authentication value using the third mutually derived secret shared key ke (from a key exchange step 327) and (ii) also calculate the initiator authentication value. If the calculated initiator authentication value by the responder 102* matches the received, decrypted initiator authentication value then the initiator 101 is authenticated with the responder 102* for a mutual authentication. The initiator 101 as enrollee can then receive a configuration object in a message 124. Message 124 can include network credentials 109 encrypted with the third mutually derived secret shared key ke. The initiator 101 can receive message 124 and pass the decrypted network credentials 109 to device 106, which can then apply the network credentials 109 in order to communicate with network access point 105.

FIG. 1d

FIG. 1d is an illustration of an exemplary initiator DPP configuration and initiator key database, with tables recording exemplary data for a plurality of bootstrap responder public keys and bootstrap initiator private keys, in accordance with exemplary embodiments. Although FIG. 1b and FIG. 1c above depicted and described conventional technology for an initiator 101, data for an initiator 101 depicted in FIG. 1d and used by initiator 101 with a responder proxy 102 is not contemplated by conventional technology. An initiator 101 communicating with a responder proxy 102 can record and operate an initiator key database 101t, where an initiator key database 101t was also depicted and described above in connection with FIG. 1a. An initiator key database 101t can include a responder public key table 101ta and an initiator key table 101tb.

Responder public key table 101ta can record a plurality of bootstrap responder public keys Br 102a for a plurality of different networks 107. The present disclosure with the use of a responder proxy 102' supports the recording and operation of the corresponding a bootstrap responder private key br 102b solely within a DPP server 103 and/or a device database 104 as depicted in FIG. 1a. This represents a significant difference from the conventional technology depicted in FIG. 1b and FIG. 1c, which contemplates that a responder 102* would operate and record bootstrap responder private key br 102b. By recording responder bootstrap private key br 102b in secure servers within network 107, the corresponding responder bootstrap public key Br 102a can be "reused" or distributed among a plurality of devices 106 during a pre-configuration step or during manufacturing or distribution, before an end user receives the device 106. The reuse of responder bootstrap public key Br 102a can comprise shared keys 102z as depicted in FIG. 2a. In other words, the responder bootstrap public key Br 102a recorded in a device 106 before the device 106 conducts a DPP 191 can comprise a pre-shared bootstrap responder public key.

In addition, a manufacturer or distributor of device 101 may not know which network 107 among a plurality of possible different networks 107 that an end user for device 106 may wish to connect device 106. Since the responder bootstrap public key Br 102a comprises a public key and can be shared, a network 107 could send the responder bootstrap public key Br 102a to the manufacturer or distributor of device 106, where the responder bootstrap public key Br 102a could be recorded in a plurality of devices 106 in nonvolatile memory. Network 107 could securely record the corresponding responder bootstrap private key br 102b in a server database 103a or a device database 104. A manufacturer or distributor of device 106 could collect the publicly shared responder bootstrap public keys Br 102a from a plurality of different networks 107 and record the resulting plurality of different responder bootstrap public keys Br 102*a* in a responder public key table 101*ta*. The responder public key table 101*ta* could also be recorded in a plurality of devices. In this manner, an (a) exemplary device 106 depicted in FIG. 1*a* could record the appropriate responder bootstrap public key Br 102*a* for a network 107 depicted in FIG. 1*a* before (b) the device 106 is received by an end user.

The use of a responder public key table 101*ta* simplifies conducting a DPP 191 between responder 102' and initiator 101, since a separate "out of band" transfer of responder bootstrap public key Br 102*a* in a step 121 of FIG. 1*b* and FIG. 1*c* could be omitted or is not required by device 106 recording key Br 102*a* for a responder proxy 102'. A responder proxy 102' can operate with potentially many different keys Br 102*a* recorded by initiator 101, since responder 102' can forward messages such as DPP 122 to DPP server 103 for processing by DPP server 103 (and DPP server 103 could record and operate on the corresponding private key br 102*b*).

As depicted in FIG. 1*d*, responder public key table 101*ta* for an initiator 101 can include data or values for a responder bootstrap public key Br identity 101*z*, a responder network 107*a* name or identity, a responder bootstrap public key Br 102*a*, a secure hash value 102*aa* over the key Br 102*a*, and a set of parameters 199 for the public key Br 102*a*. A responder public key table 101*ta* could record a plurality of data for a plurality of network 107*a* names with corresponding key Br 102*a*. In exemplary embodiments, at least one responder bootstrap public key Br 102*a* is recorded in a table 101*ta* for initiator 101. In exemplary embodiments data for an initiator key database 101*t* can be recorded in protected nonvolatile memory within device 106 and accessible only to initiator 101 or root or privileged processes operating in a device 105.

In exemplary embodiments, an initiator 101 for a device 106 could record a plurality of responder bootstrap public keys Br 102*a* in a responder public key table 101*ta*. Reasons could include the use of different keys Br 102*a* for different purposes, such as a first key Br 102*a* for a responder authentication 141 and a second key Br 102*a* for a mutual authentication 142. Or, a third key Br 102*a* could be recorded or mapped in a tag 102*v* from responder 102' and received in a message 121. Responder 101*x* can designate the use of select keys Br 102*a* with a higher level of trust, with the following exemplary results (A) and (B). For (A), device 106 could provide additional privileges for a configuration step 106*a* for an initiator 102' or initiator 102\* that uses the second key Br 102*a* (e.g. a mutual authentication 142 with the second key Br 102*a* could require responder 102' to have key Bi 101*a*, and release of key Bi 101*a* could be under the control of device 106 or recorded only in a device database 104 in a network 107). As one example of additional privileges, a set of credentials 109 delivered to device 106 using the second key Br 102*a* with mutual authentication 142 using key Bi 101*a* could allow the installation of a new certificate authority root certificate for device 106. As one example of normal or other privileges, a set of credentials 109 delivered to device 106 using the first key Br 101*a* could deny the installation of a new certificate authority root certificate for device 106.

As depicted in FIG. 1*d*, initiator key table 101*tb* in an initiator key database 101*t* can record values for an initiator bootstrap key identity 101*w*, a set of parameters 199 for the initiator bootstrap private key bi 101*b*, the initiator bootstrap public key Bi 101*a*, a secure hash value 101*aa* over the key Bi 101*a*, and the initiator bootstrap private key bi 101*b*. In exemplary embodiments, an initiator key database 101*t* can include at least one initiator bootstrap public key Bi 101*a* in order to support a mutual authentication 142 depicted in FIG. 1*c*. One use of an initiator key table 101*tb* is also depicted and described in connection with FIG. 2*b* below.

As depicted in FIG. 1*d*, initiator key table 101*tb* can record data for a plurality of different initiator bootstrap PKI keys. The initiator bootstrap PKI keys could be different according to the set of parameters 199. In other words, a first key bi 101*b* could be for parameters 199 of "A" with a key length of 256 bits, and a second key bi 101*b* could be for parameters 199 of "B" with an exemplary length of 384 bits. Different elliptic curves could be specified by parameters 199 for different keys in an initiator key database 101*t*. In exemplary embodiments where initiator 101 can provide bootstrap public key Bi 101*a* "in band" to responder 102', such as, but not limited to, initiator 101 using a PKEX key exchange, then table 101*tb* could record a plurality of different key bi 101*b* and Bi 101*a* for the same parameters 199, and initiator 101 could select and deprecate different keys bi 101*b* and Bi 101*a* over time. One use of an initiator key table 101*tb* is also depicted and described on connection with FIG. 2*b* below.

As depicted in FIG. 1*a*, an initiator DPP configuration 130 for initiator 101 is depicted in FIG. 1*d*. An initiator DPP configuration 130 can comprise a collection of data and values recorded in nonvolatile memory for WiFi radio 106*r*. Initiator DPP configuration 130 can be similar or compatible with a responder DPP configuration 131 as depicted and described in connection with FIG. 1*f* below. Initiator DPP configuration 130 can record values for a device supported configuration 130*z*, a global operating class 130*a* and a channel list 130*b*. Global operating class 130*a* can specify a WiFi technology and frequency band for operating WiFi radio 106*r*, and can represent the capabilities of the radio in a manufactured device 106. Global operating class 130*a* can support exemplary class values and numbers in Appendix E of the 802.11ac specification, and other possibilities exist as well without departing from the scope of the present disclosure. Channel list 130*b* can comprise a list of channels for initiator 101 to transmit DPP authentication request messages 122. An initiator 101 in an unconfigured device 106' can rotate through a list of Global operating classes and channel numbers in an channel list 130*b* and transmit a series of DPP authentication request messages 122 on each combination of global operating class 130*a* and channel number from a channel list 130*b* in order to send message 122 to a responder 102' operating with a responder configuration 131.

FIG. 1*e*

Figure 1E:
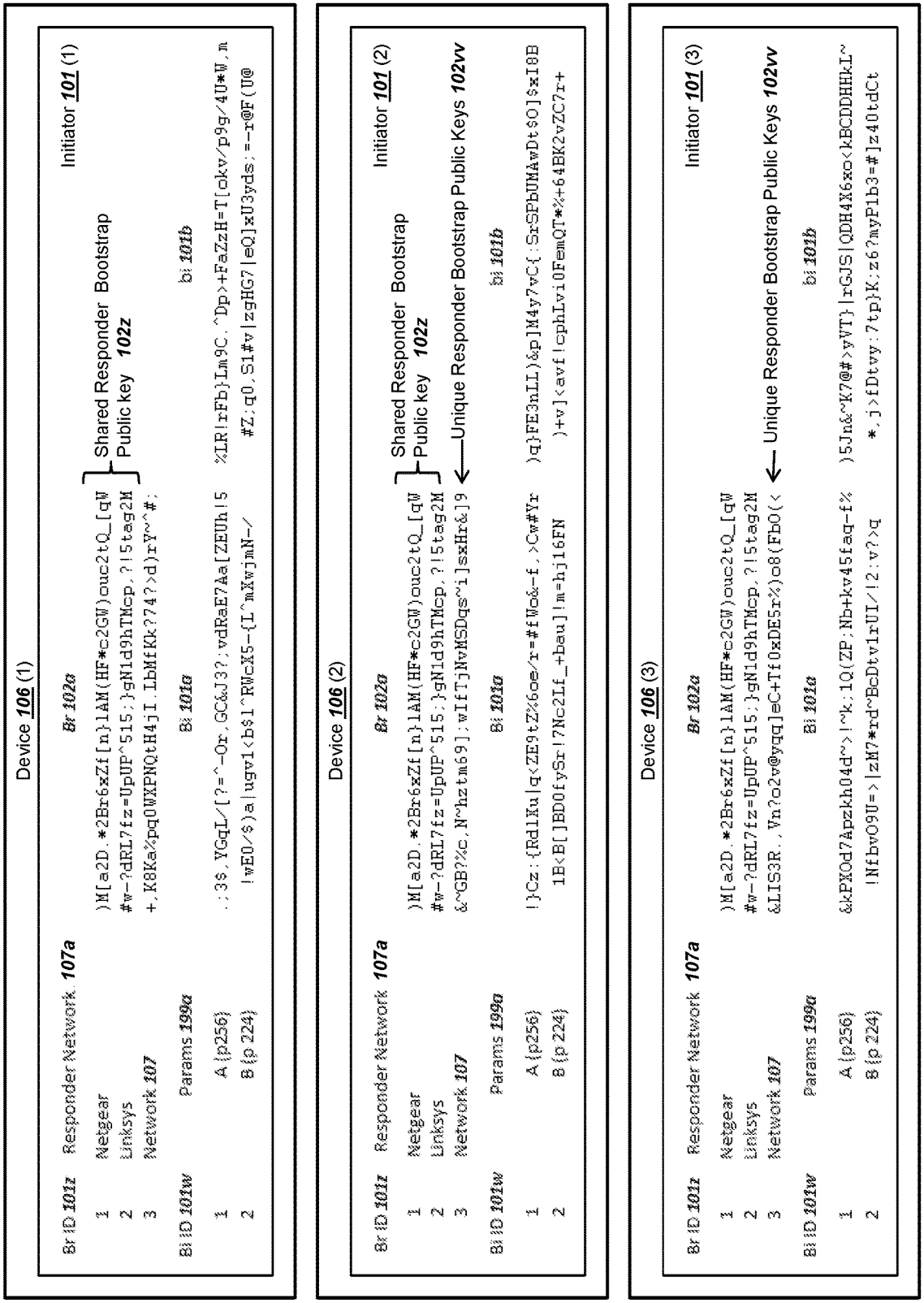
FIG. 1e is an illustration of an exemplary responder bootstrap public keys and initiator bootstrap PKI keys recorded by a plurality of devices, in accordance with exemplary embodiments.

FIG. 1*e* is an illustration of an exemplary responder bootstrap public keys and initiator bootstrap PKI keys recorded by a plurality of devices, in accordance with exemplary embodiments. FIG. 1*e* depicts PKI keys recorded for an exemplary three different devices 106, although a system 100 and other systems herein could operate with potentially millions or more devices 106. The data depicted for each device in FIG. 1*e* can comprise exemplary data for a responder public key table 101*ta* and an initiator key table 101*tb* within an initiator key database 101*t*, which were depicted and described in connection with FIG. 1*d* above.

The first two entries for responder bootstrap public keys Br 102*a* for device 106(1) and device 106(2) in FIG. 1*e* depicts the same alphanumeric values for base85 binary to text encoding for an exemplary responder bootstrap public keys Br 102*a* in a first device 106(1) and a second device 106(1). Likewise, the second two entries for responder bootstrap public key Br 102*a* for device 106(1) and device 106(2) in FIG. 1*e* depicts the same alphanumeric values for base85 binary to text encoding for an exemplary second responder bootstrap public keys Br 102a in first device 106(1) and a second device 106(1). The depiction of these keys Br 102a illustrates the use of shared keys 102z for a plurality of different devices 106. Although only two devices are depicted with shared keys 102z, many more devices could also record the same shared keys for Br 102a. Each of the shared keys 102z is associated with a different network 107, identified with an exemplary network name 107a. In this manner, a plurality of different devices 106 can record and use the same value for a responder bootstrap public key Br 102a.

The same values for shared keys 102z across different devices 106 could be recorded in device 106 during manufacturing or before distribution to end users of device 106. In this manner, devices 106 could be received by end users in a "partially configured" yet secure state, such that a device 106 could use the recorded keys Br 102a with a responder proxy 102', where a responder proxy 102' does not operate or record the corresponding responder bootstrap private key br 102b. As depicted and described in connection with FIGS. 3a, 3b, 5a, and 5b below, a DPP server 103 could store and operate with the corresponding responder bootstrap private key br 102b and thus the key br 102b can remain secured and not distributed out or sent to a responder proxy 102'. In this manner, a DPP 191 can be conducted between initiator 101 and a responder proxy 102' securely, where responder proxy 102' could operate on a device with a lower level of security or trust than DPP server 103. In some exemplary embodiments, responder proxy 102' could operate within an insecure device. Although not depicted in FIG. 1e or FIG. 1d, an entry for a key Br 102a could also record a "trust level" or "privilege level", such that a configuration object received from a DPP 191 using the key Br 102a with the corresponding privilege level could be authorized by device 106 to perform tasks or operations or record data with a higher level of privilege or trust.

In addition, the use of the same values for shared keys 102z across different devices 106 supports simplified yet secure automatic configuration of devices using a DPP 191, where WiFi access points 105 could operate as responder proxies 102'. As depicted and described in connection with FIG. 1f below, a WiFi router operating as a responder proxy 102' could potentially connect with at least one network 107 and DPP server 103 (or perhaps a plurality of DPP servers 103 for different networks 107). Responder proxy 102' could use the hash value 102aa for the responder bootstrap public key Br 102a to determine a network 107 identified by the hash value 102aa (see responder network tables 102t below in FIG. 1f). In this manner, responder proxy 102' could route data from a DPP authentication request message 122 to the correct DPP server 103 which operates and records (or can obtain from a device database 104 for network 107) the corresponding responder bootstrap private key br 102b in order to conduct the full series of messages for a device provisioning protocol 191.

In exemplary embodiments, responder bootstrap public keys Br 102a can also comprise a unique key such as a unique key 102vv recorded in a tag 102v for responder 102. Thus exemplary embodiment also support the use of a responder bootstrap public key Br 102a that is not shared across multiple initiators 101. In exemplary embodiments, and as depicted in FIG. 1e, the initiator bootstrap private key bi 101b and corresponding initiator bootstrap public key Bi 101a can be different for different devices 106. In this manner, a device 106 can also be identified by the hash value 101aa (depicted in FIG. 1d) over the initiator bootstrap public key Bi 101a by responder 102' or network 107. As depicted in FIG. 1e, an initiator 101 can record a different initiator bootstrap private key bi 101b and corresponding initiator bootstrap public key Bi 101a for each set of supported parameters 199a. In exemplary embodiments, the initiator bootstrap private key bi 101b and corresponding initiator bootstrap public key Bi 101a can be recorded in a secure nonvolatile memory within device 106 for initiator 101 upon device manufacturing or during device distribution.

FIG. 1f

Figure 1F:
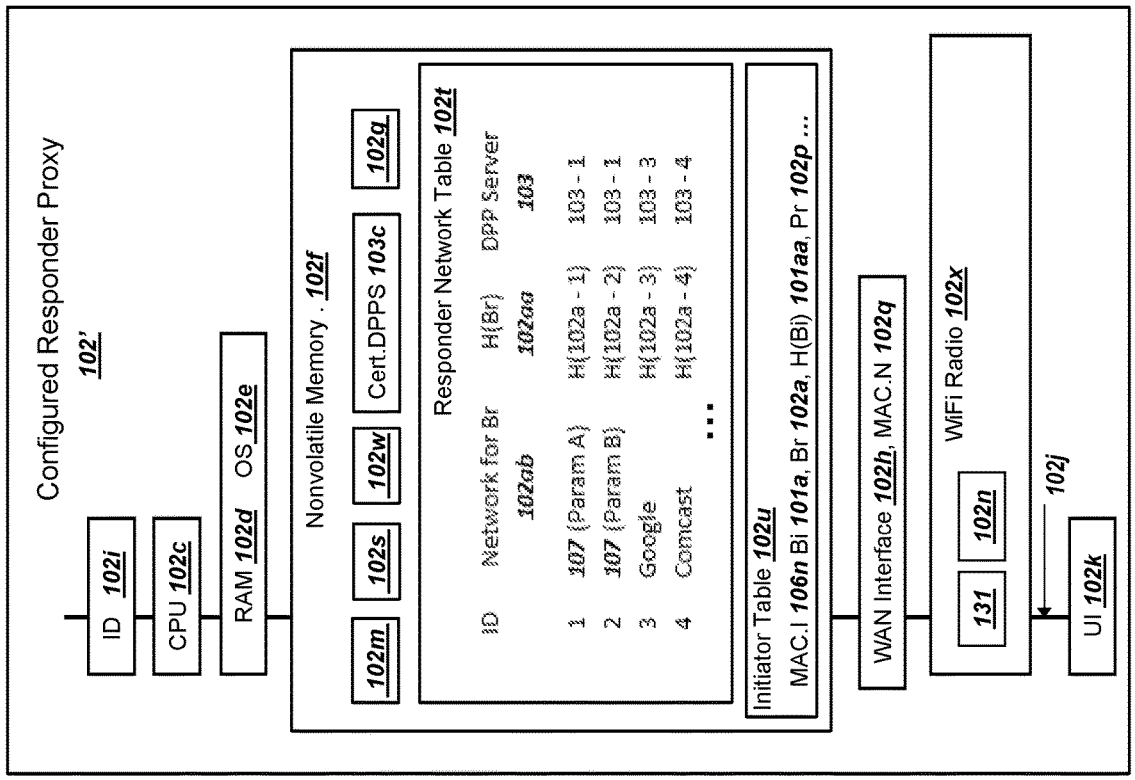
FIG. 1f is a graphical illustration of hardware, firmware, and software components for a responder, including a responder configuration step, in accordance with exemplary embodiments.
Figure 1F:
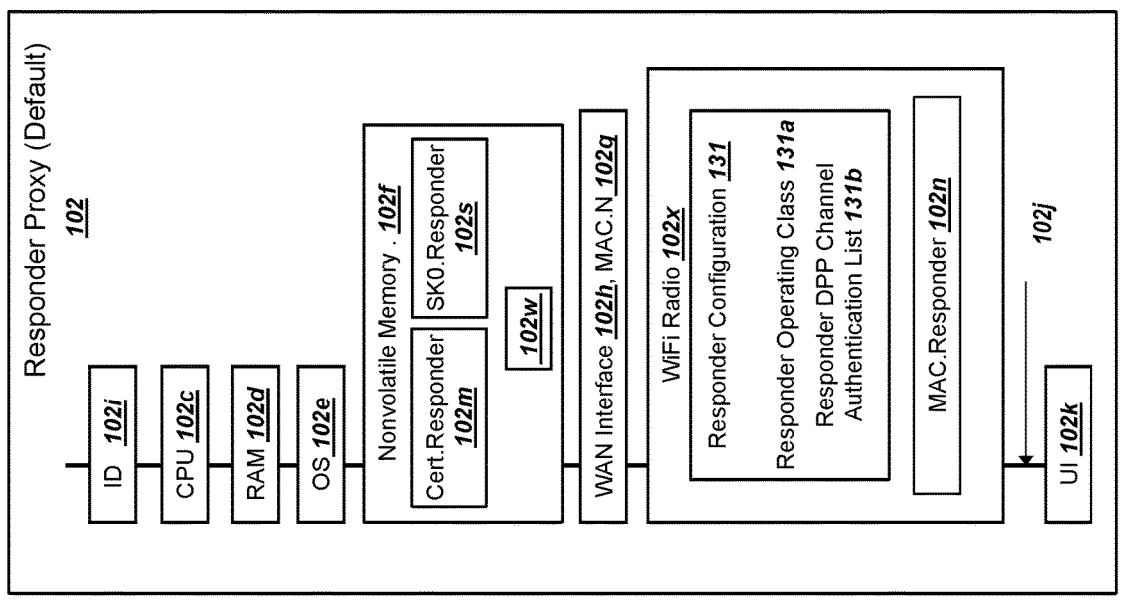

FIG. 1f is a graphical illustration of hardware, firmware, and software components for a responder, including a responder configuration step, in accordance with exemplary embodiments. FIG. 1f is illustrated to include several components that can be common within a responder 102. Responder 102 may consist of multiple electrical components in order to both (i) communicate with a network 107 and (ii) transmit and receive messages with an initiator 101 according to a device provisioning protocol 191. Responder 102 can undergo a responder configuration step 127 in order to configure the components in a responder 102 to function as the enhanced responder or responder proxy as contemplated in the present disclosure, such that a responder bootstrap private key br 102b can remain recorded with a network 107 as depicted in FIG. 1a above. In addition, although a responder 102 in FIG. 1a is depicted as a separate component in a network access point 105, a network access point 105 could function and operate with the components of a responder 102 or responder 102' in FIG. 1f. In other words, a network access point 105 or another wireless computing device with a WiFi radio 102x could comprise a responder 102 or responder 102' as contemplated herein. Responder 102 and configured responder 102' could also operate with a radio 102x that supports wireless networking technology other than WiFi, such as radio 102x comprising a radio for 4G LTE or 5G networks, and other possibilities exist as well.

In exemplary embodiments and as depicted in FIG. 1f, responder 102 can include a responder identity 102i, a processor 102c (depicted as "CPU 102c"), random access memory (RAM) 102d, an operating system (OS) 102e, storage memory 102f (depicted as "nonvolatile memory 102f"), a WiFi radio 102x, a system bus 102j, and a wireless wide area network (WAN) interface 102h. FIG. 1d depicts responder 102 as both a default responder 102 and a configured responder 102'. The default responder 102 can comprise the state of responder 102 before a configuration step 127 and responder 102' can comprise the state of responder 102' after the configuration step 127. As depicted, both a default responder 102 and a configured responder 102' can contain the same hardware components such as CPU 102c, RAM 102d, etc., where a difference between responder 102 and 102' can be in both (i) data recorded in storage memory 102f and a change in the operation of WiFi radio 102x to listen for incoming DPP messages 122.

Responder identity 102i could comprise a preferably unique alpha-numeric or hexadecimal identifier for responder 102, such as an Ethernet or WiFi MAC address, an International Mobile Equipment Identity (IMEI), an owner interface identifier in an IPv6 network, a serial number, or other sequence of digits to uniquely identify each of the many different possible units for responder 102 for a network 107. A system 100 depicted in FIG. 1a could operate with a plurality of different responders 102. Responder identity 102i can preferably be recorded in a non-volatile memory or written directly to hardware in responder 102 by (i) a responder manufacturer upon device manufacturing, or (ii) a pre-configuration step for responder 102 before starting the sequence of steps and message flows depicted in FIG. 3a below.

The CPU 102c can comprise a general purpose processor appropriate for typically low power consumption requirements for a responder 102, and may also function as a microcontroller. CPU 102c can comprise a processor for responder 102 such as an ARM® based processor or an Intel® based processor such as belonging to the Atom or MIPS family of processors, and other possibilities exist as well. CPU 102c can utilize bus 102j to fetch instructions from RAM 102d and operate on the instruction. CPU 102c can include components such as registers, accumulators, and logic elements to add, subtract, multiply, and divide numerical values and record the results in RAM 102d or storage memory 102f, and also write the values to an external interface such as WiFi radio 102x or WAN interface 102h.

RAM 102d may comprise a random access memory for responder 102. RAM 102d can be a volatile memory providing rapid read/write memory access to CPU 102c. RAM 102d could be located on a separate integrated circuit in responder 102 or located within CPU 102c. The RAM 102d can include data recorded in responder 102 for the operation when collecting and communicating DPP messages 122 through 124 with initiator 101 depicted in FIGS. 1b, 1c, 3a, etc. The system bus 102j may be any of several types of bus structures including a memory bus or memory controller, a peripheral bus, and a local bus using any of a variety of bus architectures including a data bus. System bus 102j connects components within responder 102 as illustrated in FIG. 1f, such as transferring electrical signals between the components illustrated. Responder 102 can include multiple different versions of bus 102j to connect different components, including a first memory bus 102j between CPU 102c and RAM 102d, and a second system bus 102j between CPU 102c and WiFi radio 102x, which could be an I2C bus, an SPI bus, PCIe bus, or similar data busses.

The operating system (OS) 102e can include Internet protocol stacks such as a User Datagram Protocol (UDP) stack, Transmission Control Protocol (TCP) stack, a domain name system (DNS) stack, a TLS stack, a datagram transport layer security (DTLS) stack, etc. The operating system 101e may include timers and schedulers for managing the access of software/firmware to hardware resources within responder 102, including CPU 102c and WiFi radio 102x. The operating system shown of 102e can be appropriate for a low-power device with more limited memory and CPU resources (compared to a server such as DPP server 103, device database 104, etc.). Example operating systems 102e for a responder 102 includes Linux, Android® from Google®, IOS from Apple®, Windows® 10 IoT Core, or Open AT® from Sierra Wireless®. Additional example operating systems 102e for a responder 102 include eCos, uC/OS, LiteOs, Contiki, OpenWRT, Raspbian, and other possibilities exist as well without departing from the scope of the present disclosure. Although depicted as a separate element within responder 102 in FIG. 1f, OS 102e may reside in RAM 102d and/or storage memory 102f during operation of responder 102.

Storage memory 102f (or "nonvolatile memory 102f") within responder 102 can comprise a nonvolatile memory for storage of data when responder 102 is powered off. Memory 102f may be a NAND flash memory or a NOR flash memory, and other possibilities exist as well without departing from the scope of the present disclosure. Memory 102f can record firmware and/or software for responder 102. Memory 102f can record long-term and non-volatile storage of data or files for responder 102. In an exemplary embodiment, OS 102e is recorded in memory 102f when responder 102 is powered off, and portions of memory 102f are moved by CPU 102c into RAM 102d when responder 102 powers on. Memory 102f (i) can be integrated with CPU 102b into a single integrated circuit (potentially as a "system on a chip"), or (ii) operate as a separate integrated circuit or a removable card or device, such as a removable SD card. Memory 102f may also be referred to as "device storage" and can include exemplary file systems of FAT16, FAT 32, NTFS, ext3, ext4, UDF, or similar file systems.

As depicted in FIG. 1f, nonvolatile memory 102f for a default responder 102 may also contain a secret key SK0.responder 102s, a certificate cert.responder 102m, and a certificate cert.CA.root 102w. A secret key SK0.responder 102s in a nonvolatile memory 102f could comprise the private key for a PKI key pair, where the corresponding public key could be recorded in a certificate cert.responder 102m. A secret key SK0.responder 102s and the corresponding public key in a certificate 102m could comprise values to use with asymmetric public key infrastructure (PKI) cryptography, and could utilize exemplary algorithms based on either Rivest Shamir Adleman (RSA) or elliptic curve cryptography (ECC). For use of ECC algorithms, parameters within certificate 102m (and other certificates herein) can specify elliptic curve names (e.g. NIST P-256, sect283k1, sect283r1, sect409k1, sect409r1, etc.). The same ECC parameters can be used with bootstrap PKI keys in the form of parameters 199a. Further, elliptic curves that do not depend on parameters specified by NIST could be utilized as well, such as Curve22519 or FourQ. For use of RSA algorithms, parameters within certificate 102m can specify a modulus and other associated values for using an RSA PKI key pair. For either asymmetric algorithms RSA or ECC for a PKI key pair herein, parameters in a certificate such as cert.responder 102m can specify key lengths, a duration for key validity, uses of the PKI key pair such as for key derivation or signatures, encoding rules, message digest algorithms, etc. Parameters in certificate 102m (and other certificates herein) may also include identifying information associated with the PKI key pair such as a sequence number, a serial number, a certificate revocation list or URL, and a domain name of the server associated with the PKI key pair.

Certificate cert.CA.root 102w can comprise a root certificate for responder 102 to authenticate a server certificate received from DPP server 103 or other servers or nodes in a network 107, where these other nodes for network 107 are depicted and described in connection with FIG. 1a, FIG. 3a, and other Figures below. After authenticating a server certificate received by responder 102 or 102' with cert.CA.root 102w, responder 102 can conduct additional authentication steps contemplated by secure protocol standards such as Transport Layer Security (TLS), Datagram Transport Layer Security (DTLS), IPSec, etc. Root certificate cert.CA root 102w can comprise the list or a subset of the list of included root certificates from the Mozilla Foundation with Mozilla projects, where the aggregate list of community approved root certificates and associated parameters is in the widely distributed file certdata.txt from the Mozilla web site.

Nonvolatile memory 102f in a configured responder proxy 102' can include a responder network table 102t. Responder network table 102t could be received from a network 107 for a configuration step 127 in a message 305 depicted below in FIG. 3a. Or, table 102t could be loaded by a user of responder 102' or potentially recorded during a pre-configuration of responder 102 or responder 102' before the sequence of message flows and steps in FIG. 3a below.

Responder network table 102*t* can record and map a DPP server 103 that is associated with a responder bootstrap public key hash value 102*aa*. The responder bootstrap public key hash value 102*aa* can be associated with a network 102*ab* for responder bootstrap public key Br 102*a* (e.g. the network equivalent to network 107 that records the responder bootstrap private key br 102*b* to process an incoming DPP authentication request message 122). The configured responder proxy 102' can use the responder network table 102*t* to route data from incoming DPP messages 122 with the responder bootstrap public key hash value 102*aa* to a selected DPP server 103. Different DPP servers 103 could be associated with different networks 107, where a network 107 can comprise a network for H(Br) 102*aa*, as depicted for a responder network table 102*t* in FIG. 1*f*.

In other words, a plurality of different devices 106 with initiators 101 may use different responder bootstrap public keys Br 102*a*, where the hash value 102*aa* would be received in an incoming DPP message 122. The devices 106 could be manufactured or pre-configured with at least one key Br 102*a*, and the manufacturer could operate or be associated with a DPP server 103 in order to support and conduct a DPP 191 with device 106 and send a configuration object in a DPP configuration response message 124 from FIG. 1*c*. Note that a configuration object in a message 124 could include data other than credentials 109 (and may optionally omit credentials 109), where the configuration object could include configuration parameters for device 106. Responder 102' can use the received hash value 102*aa* to select a DPP server 103 in order to further process the message and support a DPP 191, where the network 102*ab* could be different than a network 107 operating a network access point 105. In exemplary embodiments a network 102*ab* operating a DPP server with responder bootstrap private key br 102*b* can be selected using the hash value 102*aa* over key responder bootstrap public key Br 102*a*.

A device 106 with initiator 101 could use (i) a first DPP 191 with a first Br 102*a* to obtain network credentials 109 with network 107 for AP 105, and (ii) a second DPP 191 with a second Br 102*a* (with the same responder proxy 102') to obtain configuration parameters with network 102*ab* for device 106. The first DPP 191 could be with a first DPP server 103 and first network 102*ab*, and the second DPP 191 with a second DPP server 103 and a second network 102*ab*. The use of responder network table 102*t* by responder 102' can determine which incoming DPP message 122 is associated with which network 102*ab* and DPP server 103. In other words, a responder 102' can conduct multiple sessions of DPP 191 with different keys Br 102*a*, and use a responder network table 102*t* to determine which DPP messages 122 are associated with which DPP server 103 (via hash value 102*aa*). Other possibilities exist as well for a responder 102' to use a responder network table 102*t* in order to process different incoming DPP authentication request messages 122 without departing from the scope of the present disclosure. In exemplary embodiments, a selected DPP server 103 from a responder network table 102*t* can provide credentials 109 for a DPP configuration response 124, using the steps below such as those depicted in FIG. 3*a*, 3*b*, FIG. 6, etc.

Responder 102 and 102' can include a WiFi radio 102*x* to communicate wirelessly with networks such as device 101 depicted and described in FIG. 1*a* above, including via WiFi data link 192. WiFi radio 102*x* could connect with an antenna in order to transmit and receive radio frequency signals. Responder 102 and 102' can operate a WAN interface 102*h* in order to communicate with network 107, and WAN interface can include a WAN MAC address 102*q*. WAN interface 102*h* can comprise either a wireless connection, such as with a 4G LTE network, a 5G network, or can comprise a wired connection such as digital subscriber line (DSL), coaxial cable connection, or Ethernet connections, and other possibilities exist as well without departing from the scope of the present disclosure.

As depicted in FIG. 1*f*, a WiFi radio 102*x* in a configured responder 102' can record or operate with a responder configuration 131. The values for responder DPP configuration 131 could also specify a version of the 802.11 standards to utilize, such as, but not limited to, 802.11n, 802.11ac, 802.11ah, 802.11ax, or related and subsequent versions of these standards. The responder DPP configuration 131 can be compatible with the initiator DPP configuration 130 of a target WiFi device 101 with responder 102'. The responder configuration 131 could be obtained during an authentication step for responder 102, such as depicted below in FIG. 3*a* (in a message 305), although responder configuration 131 could be obtained at other times as well, such as possibly being recorded in a WiFi radio 102*x* before responder 102 begins sending and receiving data through a WiFi link 192.

The responder DPP configuration 131 can include a responder operating class 131*a* which can be selected from the plurality of potential global WiFi operating classes in table E-4 of IEEE standard specification 802.11ac, which is incorporated by reference herein. The present disclosure contemplates that a responder 102' communicates with multiple initiators 101 either concurrently, or over time. The responder configuration 131 can also include Responder DPP Channel Authentication List 131*b*, which can comprise a list of channels for responder 102' to receive DPP authentication request 122 messages in order to establish initial connectivity with device 106 and initiator 101. In exemplary embodiments, responder configuration 131 for responder 102' provides data for a responder 102 to receive data such as message 122 from initiator 101, where initiator 101 may operate with different possible values for operating classes or transmitting channels.

A responder configuration 131 can include other data for responder 102' to receive a DPP message from an initiator 101 as well, such as specifying the use of broadcast or unicast for receiving DPP messages, timer values for retry of sending DPP 191 messages, timer values for timeouts for sending and receiving messages, as well as counters for a maximum number of retries on sending messages. In other words, without responder configuration 131, a responder 102 may not normally be able to (i) select the proper WiFi operating channel, and (ii) receive broadcast data from initiator 101. For embodiments where a Device DPP Channel Authentication List 131*b* is unknown or not available, then responder 102' can periodically listen for incoming DPP 122 messages over time as broadcast messages on all available channels for a radio 102*x*.

WiFi radio 102*x* can include standard radio components such as RF filters, RF amplifiers, a clock, and phased loop logic (PLL). WiFi radio 102*x* can support protocols and specifications according to the IEEE 802.11 family of standards. For example, if WiFi radio 102*x* operates according to 802.11n standards, WiFi radio 102*i* could operate at a radio frequency of 2.4 or 5 GHz. In other embodiments where WiFi radio 102*i* supports 802.11ac standards, then WiFi radio 102*x* could also support radio frequencies of 0.054 through 0.79 GHz in order to operate in "white space" spectrum. Other possibilities exist as well for WiFi radio to support wireless LAN standards or 802.11 standards and radio frequencies, without departing from the scope of the present disclosure. WiFi radio 102x can access a nonvolatile memory 102f in order to record the depicted configuration values of responder configuration 131 where the nonvolatile memory could be within WiFi radio 102x, or WiFi radio 102x could access memory 102f via bus 102j in order to record and read the values. Device 106 can operate a WiFi radio 106r that is compatible with WiFi radio 102x.

As depicted in FIG. 1f, a WiFi configured responder 102' can include configuration data resulting from a configuration step 127, in order for responder 102' to conduct a device provisioning protocol 191 with a device 101. A nonvolatile memory 102f for a WiFi configured responder 102' can include data recorded for a default responder 102, with the addition of recording a DPP application program 102g. DPP application program 102g (or "DPP application 102g") could comprise a software package for OS 102e in order for responder 102' to conduct the series of steps and messages with DPP server 103 and initiator 101 depicted below in FIG. 3a, FIG. 3b, FIG. 4a, etc. DPP application 102g can include cryptographic algorithms in order to support key exchanges, symmetric encryption and decryption, as well as signature verification and asymmetric encryption and decryption. As one example, a DPP application 102g could perform the function of a key derivation 102y from FIG. 1b, and other possibilities exist as well.

Responder 102 may also optionally include user interface 102k which may include one or more devices for receiving inputs and/or one or more devices for conveying outputs. User interfaces are known in the art and may be simple for many devices such as a few LED lights or and LCD display, and thus user interfaces are not described in detail here. User interface 102k could comprise a touch screen if responder 102 has sophisticated interaction with user 102a. Responder 102 can optionally omit a user interface 102k, if no user input or display is required for conducting a device provisioning protocol 191 between responder 102 and device 106 with initiator 101. Although not depicted in FIG. 1f, responder 102 can include other components to support operation, such as a clock, power source or connection, antennas, etc. User interface 102k could also comprise a web server operating in responder 102 and responder 102', such that a user could access the user interface 102k with a web browser and view or control depicted data stored in memory for a responder 102 or configured responder 102'. Other possibilities exist as well for hardware and electrical components operating in responder 102 or responder 102' without departing from the scope of the present disclosure.

Although not depicted in FIG. 1f, the various servers shown above in FIG. 1a such as DPP server 103 and device database 104 can include equivalent internal electrical components depicted for a responder 102 in order to operate as servers. The servers in FIG. 1a could include a processor similar to CPU 102c, with primary differences for the processor in a server being increased speed, increased memory cache, an increased number and size of registers, with the use of a 64 bits for datapath widths, integer sizes, and memory address widths, etc., In contrast, an exemplary 32 bit datapaths could be used for CPU 102c in responder 102 (although CPU 102c could also use 64 bit wide datapath widths if responder 102 comprises a mobile phone such as a smart phone). For embodiments where responder 102 comprises a home WiFi router, then a CPU 102c in responder 102 could comprise an exemplary 32 bit processor, although other possibilities exist as well.

Similarly, RAM in a server could be a RAM similar to RAM 102d in responder 102, except the RAM in a server could have more memory cells such as supporting exemplary values greater than an exemplary 8 gigabytes, while RAM 102d in responder 102 could support fewer memory cells such as less than an exemplary 4 gigabytes. Nonvolatile memory for storage in a server in FIG. 1a could comprise disks, "solid state drives" (SSDs) or "storage area networks" (SAN) for a server. For a WAN interface in a server equivalent to WAN interface 102h for responder 102', in exemplary embodiments, a server in FIG. 1a could use a physical, wired LAN interface such as a high-speed Ethernet or fiber optic connection. In exemplary embodiments, a device 106 with an initiator 101 can include and operate with hardware and electrical components similar or equivalent to the components for a responder 102' depicted in FIG. 1f.

FIG. 2a

FIG. 2a is an illustration of an exemplary device database, with tables for a device database recording exemplary data, in accordance with exemplary embodiments. A device database 104 depicted and described above in connection with FIG. 1a can record data for (i) an unconfigured responder 102 or (ii) a configured responder 102' and a DPP server 103 to conduct a device provisioning protocol 191 with a device 106 operating an initiator 101. A database 104 could record a plurality of tables for a plurality of devices 106 and/or responders 102', such as the depicted values for a key table 104k, and a set of cryptographic parameters 199. Other possibilities exist as well for the organization, tables, and recorded data within a device database 104 without departing from the scope of the present disclosure. Data within device database 104 could be encrypted using a symmetric key. As depicted in FIG. 1a, a network 107 could operate and record a device database 104, although another entity besides network 107 could also operate and record the device database 104, such as a device manufacturer or a device owner. For embodiments where a plurality of different networks 107 may communicate with a device 106 through responder 102' over time, each of the different networks 107 can operate a device database 104.

Device database 104 can record sets of ID.device 106i, MAC.I 106n for the WiFi MAC address of the device 106 operating the initiator 101, responder identity 102i, a responder mode 306a, cryptographic parameters 199, and a secret shared key 198 for a public key exchange protocol (PKEX). These values within a device database could be recorded in a device 106 and/or initiator 101 upon or after manufacturing of a device 106 or distribution of device 106 and before device 106 conducts a DPP 191 with responder 102'. The exemplary data in device database 104 could be obtained from the manufacturer or device distributor. For embodiments where some data is not previously recorded in a device database 104 before an initiator 101 sends a message 122 as depicted below in FIG. 3a, then a network 107 operating device database 104 could query the device 106 manufacturer or a device 106 distributor in order to receive and record values for a device database 104, and other possibilities exist as well for the source of device 106 data within a device database 104. Note that key 198 for PKEX can be optionally omitted for some devices, with the depiction of "NA".

ID.device 106i can comprise an identity for device 106i, and could be a serial number or identification number or string for device 106. The two identity values shown for a device 101 in a device database 104 allows a DPP server 103 or network 107 to map or convert between ID.device 106i and MAC.I 106n, and also convert one value into another. MAC.I 106n can comprise the MAC address used by an initiator 101 for conducting a device provisioning protocol 191. In other words, MAC.I 106n can be used by a responder 102' or network 107 in order to identify that an incoming DPP authentication request message 122 is from device 106 (and not a fraudulent or imposter device 106). For embodiments where key Br 102a comprises a shared key 102z, MAC.I 106n can also be used by network 107, database 104, DPP server 103, or responder 102' to verify the message 122 is from device 106 (since only device 106 with MAC.I 106n would normally send the message 122). A message 122 would have a source MAC address, which could be checked against MAC.I 106n that was recorded in a device database 104. Further, the hash value 101aa from a message 122 could be checked against a hash value calculated by device database 104 or DPP server 103 over the recoded initiator bootstrap public key Bi 101a. Additional information for verifying an identity for device 106 is provided for a step 312 below in FIG. 3a.

In some exemplary embodiments, MAC.I 106n can be omitted from a device database 104 or otherwise not available to a network 107, and in this case the MAC.I 106n can be recorded in a database 104 after successful receipt of a DPP authentication confirm message 123a depicted in FIG. 3b below. In other words, some devices 101 with initiators 106 may change or randomize the MAC.I 106n over time, and the MAC.I 106n stored in a device database 104 can comprise the value of MAC.I 106n used by device 106 to send a DPP authentication request message 122. A network 107 with a device database 104 could operate a plurality of different responders 102'. The responder identity 102i of a responder 102' communicating with a device 106 could be recorded in a device database 104, although in some exemplary embodiments the responder identity 102i could be optionally omitted. Responder identity 102i could be omitted or blank in a device database 104 until after a message 122 is received by a responder 102' and forwarded to device database 104 via network 107.

Figure 3A:
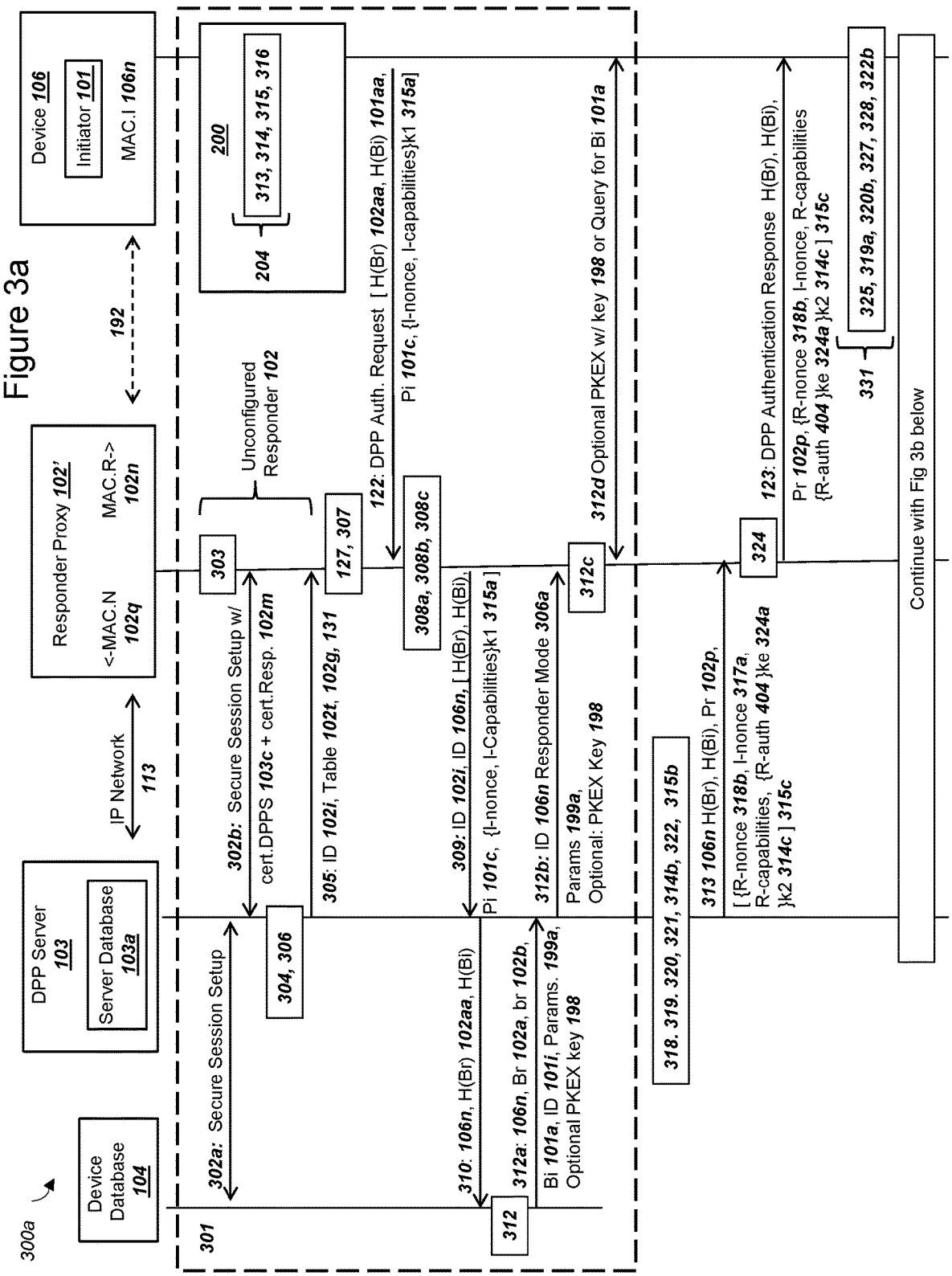
FIG. 3a is a simplified message flow diagram illustrating an exemplary system with exemplary data sent and received by a device database, a DPP server, a responder proxy, and an initiator, in accordance with exemplary embodiments.
Figure 5A:
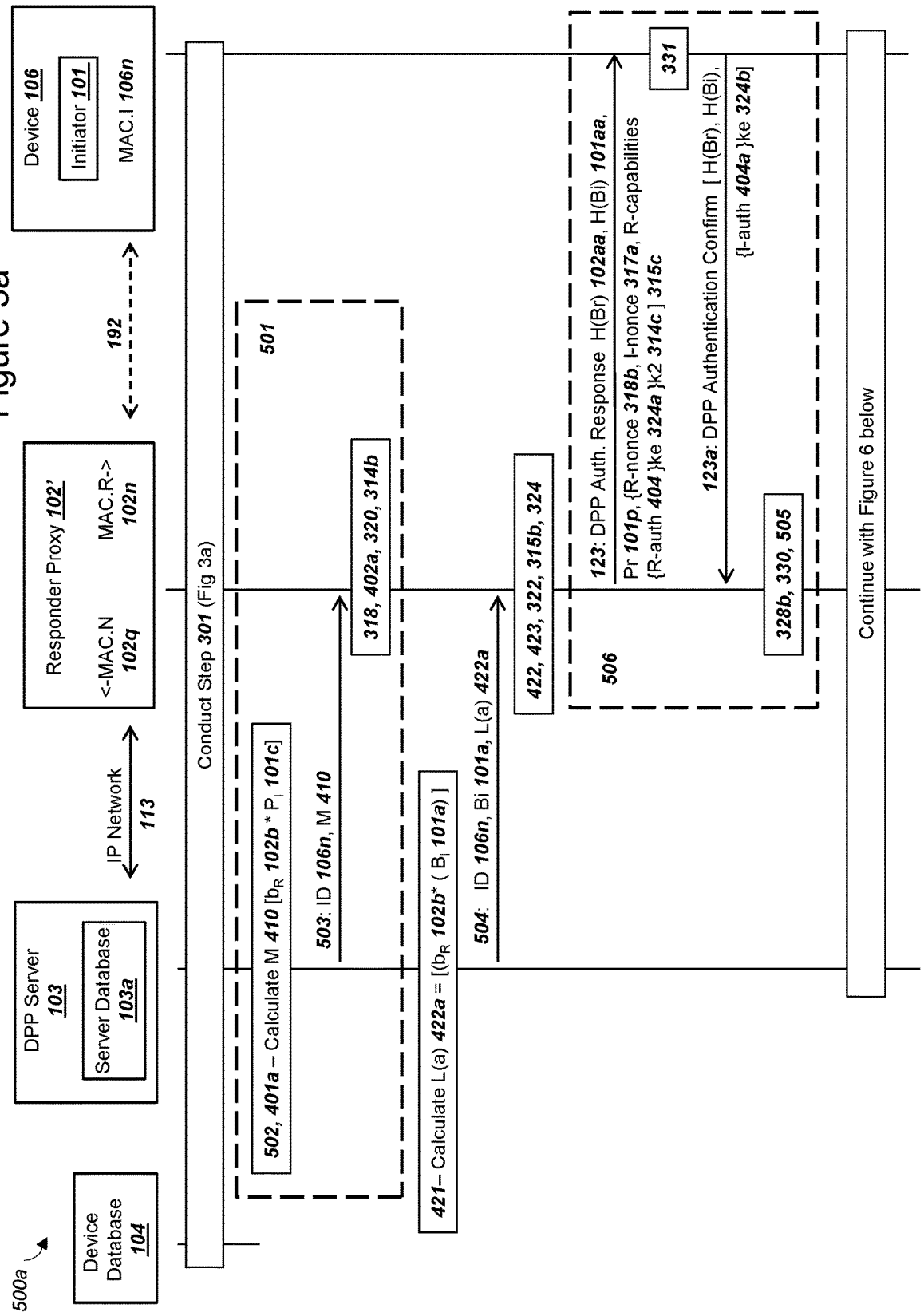
FIG. 5a is a simplified message flow diagram illustrating an exemplary system with exemplary data sent and received by a device database, a DPP server, a responder proxy, and an initiator, in accordance with exemplary embodiments.

A device database 104 could also specify a responder mode 306a (in FIG. 3a and FIG. 3c below) for responder 102' to operate with initiator 101, where different responder modes could comprise a first responder mode as depicted in FIG. 3a, where DPP server 103 records and operates on (a) responder bootstrap private key br 102b and (b) ephemeral PKI keys for responder 102' and (c) all derived secret shared keys (as depicted in the first row of FIG. 3c). A second responder mode 306a could comprise DPP server 103 recording and operating on responder bootstrap private key br 102b, but not derived responder ephemerals private key pr 102r for responder 102' (e.g. as depicted in FIG. 5a). A third responder mode 306a could comprise DPP server 103 recording and operating on responder bootstrap private key br 102b and derived responder ephemeral private key pr 102r, but not derived secret shared keys for encryption such as keys k1, k2, and ke (e.g. as depicted in FIG. 5b).

In some exemplary embodiments, a device 106 could comprise a higher value device 106 or require a greater level of security, so the security level of a DPP 191 could be selected using a responder mode 306a. In addition, the responder mode 306a could be selected based on the security level of a responder 102', such that a first responder mode 306a such as in FIG. 3a and FIG. 3b is selected by network 107 for a responder 102' with a lower level of security. A second responder mode 306a such as depicted in FIG. 5b is selected by a network for a responder 102' with a higher level of security, such as a gnodeb in a 5G network or a secured enterprise WiFi router. Other reasons for the selection of a responder mode exist as well without departing from the scope of the present disclosure.

Sets of cryptographic parameters 199 in device database 104 can represent different sets of cryptographic parameters supported by responder 102' and/or initiator 106 in order to conduct a device provisioning protocol 191. For example, some devices 106 may use a first set of cryptographic parameters with PKI keys such as bootstrap and ephemeral keys, and other devices may use a second set of cryptographic parameters, which could be specified by cryptographic parameters 199. Note that devices 101 can optionally support more than one set of cryptographic parameters, as depicted for device with exemplary identity ID.device 106i of "20003", where the device can operate with either a set "A" of cryptographic parameters 199 or a set "B" of cryptographic parameters.

PKEX key 198 could be used with a public key exchange protocol as specified in IETF draft document "Public Key Exchange", which is hereby incorporated by reference in its entirety. In some exemplary embodiments, a PKEX key 198 can be omitted, such as for the example data depicted with an "NA" in FIG. 2b. The values depicted of X1, X2, etc. for a PKEX key 198 could comprise the secret key for each device 106 identified by MAC.I 106n. For the exemplary database 104 depicted in FIG. 2a and other tables herein, a numeric value following a constant name can depict a subsequent or different instance or numeric value for the constant. In other words, "X1" and "X2" for a PKEX key 198 can represent different values of "X" for the PKEX. PKEX key 198 could be used as depicted and described in FIG. 3a with a PKEX session 312e in order to query device 106 for the initiator bootstrap public key Bi 101a if a database 104 does not record the key Bi 101a (or if network 107 cannot obtain key Bi 101a via other means via an IP network 113).

Device database 104 can record a key table 104k, which could comprise exemplary keys as depicted. A key table 104k can include responder bootstrap public key Br 102a, responder bootstrap private key br 102b, initiator bootstrap public key Bi 101a, a secure hash value for responder bootstrap public key 102aa, and a secure hash value for initiator bootstrap public key 101aa. Similarly, values of "Br-1" and "Br-2" depict different values for a responder bootstrap public key 102a, but exemplary values of "Br-1" and then a second "Br-1" can depict that the same value or number may be recorded as the responder bootstrap public key Br 102a in different devices 106 each with an initiator 101. The use of the same value for a responder bootstrap public key Br 102a across different devices 106 can comprise a shared responder bootstrap public key 102z, which is also depicted and described in connection with FIG. 1e above.

Figure 2B:
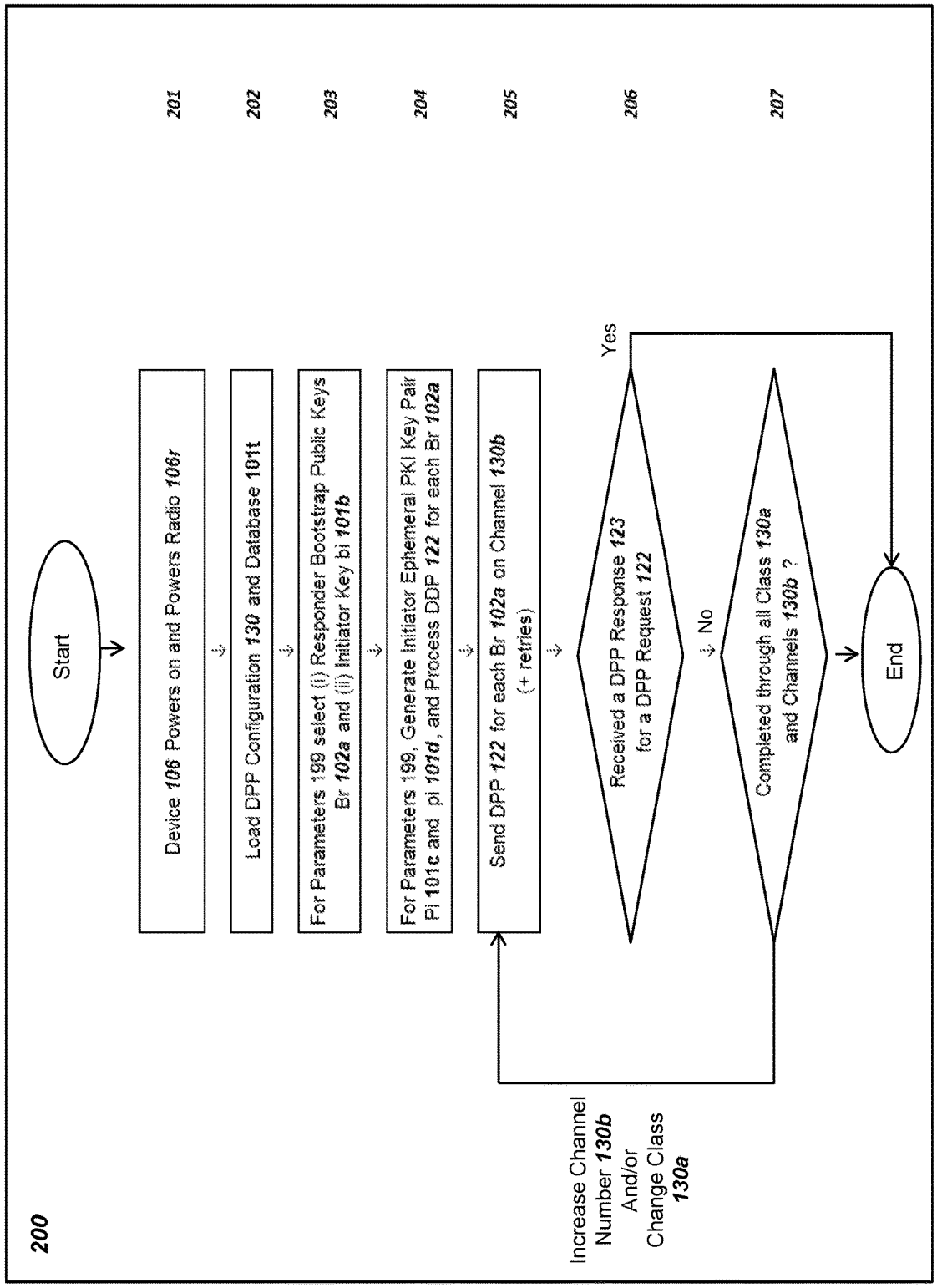
FIG. 2b is a flow chart illustrating exemplary steps for an initiator to use an initiator DPP configuration and initiator key database in order to automatically connect with a responder proxy, in accordance with exemplary embodiments.

Responder bootstrap public key Br 102a in a device database 104 can represent the bootstrap public key for responder 102'. Br 102a was also depicted and described above in connection with FIG. 1a, FIG. 1b, and FIG. 1e above. In exemplary embodiments, a device database 104 can record a plurality of different initiator bootstrap public keys Bi 101a, where each key for a set of parameters 199 can be associated with different initiators 101. As depicted in FIG. 2b, for some embodiments different initiators 101 could also share the same numeric value for an initiator bootstrap public key Bi 101a (e.g. depicted devices "20001" and "20002" can both use an initiator bootstrap public key Bi 101a of "Bi-1"). Also note that a DPP 191 can be conducted between a responder 102' and initiator 101 without recording an initiator bootstrap public key Bi 101a in a device database 104 or DPP server 103 or responder 102', which could comprise a responder only authentication 141 as depicted in FIG. 1b. For these embodiments, the depicted value for Bi 101a can be "NA" as shown in FIG. 2a.

In a key table 104k in device 104, different initiator bootstrap public keys Bi 101a can be associated with a different selected set of parameters 199a. The manufacturer or entity configuring initiator 101 in device 106 may not know which of a plurality of different possible sets of cryptographic parameters 199 may be utilized by an initiator 101 for conducting a DPP 191 in order to be compatible with a responder 102'. For example, DPP specification version 1.0 identifies several possible sets of cryptographic parameters 199 for bootstrap keys that could be utilized in a DPP 191, such as the different values for cryptographic parameters shown in Appendix A of DPP specification version 1.0. As depicted in FIG. 2a, an initiator bootstrap public key Bi 101a of "Bi-5 (A)" can represent an instance or number for Bi 101a which uses the selected set "A" of cryptographic parameters 199 (e.g. curve p256 with SHA-256), while initiator bootstrap public key Bi 101a of "Bi-5 (D)" can represent an instance of Bi 101a which uses the selected set "D" of cryptographic parameters 199 (e.g. curve 25519 with SHA-3) Similar designations and uses of different cryptographic parameters 199 with different responder PKI keys can be recorded in a device database 104 as well. In some exemplary embodiments, the values depicted for responder keys could be omitted from a device database 104 and recorded in another server such as DPP server 103.

Responder bootstrap public key Br 102a and corresponding responder bootstrap private key br 102b in a device database 104 can represent the bootstrap public key and the bootstrap private key for a responder proxy 102'. Br 102a and br 102b were depicted and described above in connection with FIGS. 1a through FIG. 1e above. In exemplary embodiments, a device provisioning protocol 191 using a responder 102' and a DPP server 103 can utilize a plurality of different responder bootstrap PKI keys, and different values for the responder bootstrap PKI keys Br 102a and br 102b can be associated with different initiators 101. As discussed above in connection with FIGS. 1a and 1b, an initiator 101 could record or obtain a responder bootstrap public key Br 102a, and subsequently the value Br 102 recorded for the initiator 101 could also be stored in a device database 104.

The responder bootstrap public key Br 102a and corresponding responder bootstrap private key br 102b could be stored by a device database 104 concurrently with the initiator bootstrap public key Bi 101a, where the initiator bootstrap public key Bi 101a could be (i) received from a device manufacturer or device distributor, or (ii) obtained by a PKEX session 312e (in FIG. 3a), or (iii) responder 102' scanning a QR code or bar code for initiator 101 (and sending the key Bi 101a to device database 104), and other possibilities exist as well for the source of key Bi 101a in a database 104 for device 106 with MAC.I 106n. Or, in exemplary embodiments a device manufacturer or a device distributor could operate a device database 104 and subsequently record the exemplary keys and values depicted of (i) Bi 101a for initiator 101 in device 106 and (ii) recorded Br 102a in device 106, but not (iii) br 102b, which could be recorded by a device database 104 for a network 107 operating or associated with responder 102'. As depicted in FIG. 2a, some responders 102' could share a common responder bootstrap public key Br 102a, which could be associated with the same responder bootstrap private key br 102b.

The sharing of responder bootstrap public key Br 102a among multiple devices 106 with initiators 101 (e.g. "shared key 102z") can simplify the manufacturing and distribution of devices by using a common responder bootstrap public key Br 102a for some embodiments. For the present disclosure, the potential tradeoff of greater simplicity for reduced security (by reusing a responder bootstrap public key Br 102a in multiple devices 106) can be avoided, since the responder bootstrap private key br 102b may (i) preferably not be sent to the responder 102', and (ii) remain recorded in and operated by a secured DPP server 103.

Yet, with the embodiments contemplated herein, the full set of device provisioning protocol messages 191 can be sent and received with an initiator 101 by responder proxy 102'. The full set of DPP 191 messages can be transmitted and received by a responder 102' with initiator 101 using either responder authentication 141 or mutual authentication 142. Embodiments for the present disclosure depict and describe the responder bootstrap private key br 102b as residing within a DPP server 103 when a responder 102' conducts a DPP 191 (as depicted and described in connection with FIG. 3a, FIG. 3b, FIG. 5a, etc. below). Consequently in exemplary embodiments and a difference with conventional technology depicted in FIG. 1b and FIG. 1c, (i) the responder bootstrap private key br 102a does not need to be recorded by a responder 102' (but br 102a is recorded for a conventional responder 102* in FIG. 1b and FIG. 1c), and (ii) a responder bootstrap public key Br 102a can be commonly shared between multiple initiators 101 in different devices 106 (e.g. "shared key 102z").

Thus, the present disclosure resolves the potential tradeoff of security versus simplification by supporting manufacturing and distribution of devices 106 with initiators 101 with commonly shared responder bootstrap public key Br 102a (also depicted in FIG. 1e as "shared key 102z"). Additional details will be provided in Figures below. The responder bootstrap private key br 102b can be recorded in a device database 104 and subsequently sent to a DPP server 103, but preferably not sent to responder 102', and responder 102' can still conduct a device provisioning protocol 191 for initiator 101 using mutual authentication 142 as depicted in FIG. 1c. In exemplary embodiments, a responder bootstrap public key Br 102a is recorded inside an initiator 102, while a device database 104 can record both the responder bootstrap public key Br 102a and the responder bootstrap private key br 102b, as depicted in FIG. 2a.

Cryptographic parameters 199 can specify sets of cryptographic parameters that are supported by responder 102' when using bootstrap PKI keys. Cryptographic parameters 199 can be recorded in a device database 104. Cryptographic parameters 199 can record a collection of cryptographic algorithms or specifications such as a set identifier 199a, a key length 199b, an ECC curve name 199c, a hash algorithm 199e, a key length for a symmetric ciphering algorithm 199f, and a nonce length 199g. Asymmetric encryption parameters 199h can specify values and parameters to use with an asymmetric encryption algorithm 351a depicted and described in connection with FIG. 3e below. Parameters 199i can specify encoding rules, padding, key lengths, selected algorithms, curve names, use of deterministic mode, and other values or fields necessary to utilize a signature algorithm 338b depicted and described in connection with FIG. 3d below. In exemplary embodiments, parameters 199i can specify ASN.1 syntax notation (abstract syntax notation) with distinguished encoding rules (DER). Parameters 199i can also specify the use of either (i) ephemeral PKI keys or (ii) bootstrap PKI keys for use with a digital signature algorithm.

As contemplated herein, when a selected set of cryptographic parameters such as using the words or description "parameters 199a" or "cryptographic parameters 199a" can specify a row of parameters or values in a set of cryptographic parameters 199, such that the collection of values in the row can be used with a device provisioning protocol 191. Set identifier 199a can be an identity for a row or set of values for cryptographic parameters 199. For example, set "A" can comprise cryptographic suite 1 as specified in section 3.2.3 of DPP specification version 1.0. Key length 199b can be the length of keys in bits for PKI keys used with a device provisioning protocol with an initiator 101 in a device 106. ECC Curve name 199b can be a name for an ECC curve used with PKI keys for a device provisioning protocol with an initiator 101 in a device 106.

Hash algorithm 199e in cryptographic parameters 199 can be the name of a secure hash algorithm, such as the exemplary SHA-256 algorithm depicted, which may also be referred to as "SHA-2". Hash algorithm 199e can be used in a key derivation function (e.g. 402a, 402b, etc. below) and also to generate a signature based on a received nonce. A key length for a symmetric ciphering algorithm 199f can specify the length of a symmetric key in bits to use with a symmetric ciphering algorithm. The depicted algorithm in FIG. 2a for algorithm 199f is "AES-SIV", although other symmetric ciphering algorithms could be specified in a set of cryptographic parameters as well. In other words, an additional, different column in cryptographic parameters 199, such as an exemplary "symmetric algorithm" 199z (not depicted) could specify the symmetric ciphering algorithm to utilize with a responder for a device provisioning protocol. Nonce length 199g can specify the length in bits for nonces or random numbers generated by both initiator 102' and responder 101x, including the length in bits of authentication values, where the nonces can be used for generating signatures and encryption keys.

FIG. 2b

FIG. 2b is a flow chart illustrating exemplary steps for an initiator to use an initiator DPP configuration and initiator key database in order to automatically connect with a responder proxy, in accordance with exemplary embodiments. An initiator 101 can use the exemplary data recorded in an initiator DPP configuration 130 and initiator key database 101t in order to automatically connect with a responder proxy 102'. The steps depicted in FIG. 2b allow a device 106 with initiator 101 to locate or find a compatible responder proxy 102' in an automated manner, such that no manual intervention is required by a device user to conduct a DPP 191 with subsequent configuration step 106a in order to load a device with credentials 109. This provides benefits over a conventional DPP 191, where additional manual intervention is required for operating a device with initiator 101 as a configurator and obtaining a bootstrap responder public key Br 102a via an "out of band" method, or loading a device 106 with a PKEX key 198.

The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present disclosure may comprise a computer program or hardware or a combination thereof which embodies the functions described herein and illustrated in the appended flow charts. However, it should be apparent that there could be many different ways of implementing the disclosure in computer programming or hardware design, and the disclosure should not be construed as limited to any one set of computer program instructions.

Further, a skilled programmer would be able to write such a computer program or identify the appropriate hardware circuits to implement the disclosed disclosure without difficulty based on the flow charts and associated description in the application text, for example. Therefore, disclosure of a particular set of program code instructions or detailed hardware devices is not considered necessary for an adequate understanding of how to make and use the disclosure. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present disclosure to function as described. However, the present disclosure is not limited to the order of the steps described if such order or sequence does not alter the functionality of the present disclosure. That is, it is recognized that some steps may be performed before, after, or in parallel other steps without departing from the scope and spirit of the present disclosure.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

At step 201, device 106 can be powered on and activate a WiFi radio 106r. A step 201 can include device 106 loading a bootloader program and an operating system for device 106, as well as starting a process or operating firmware to perform the steps of an initiator 101. At step 202, device 106 can load initiator DPP configuration 130 and initiator key database 101t from nonvolatile memory, where DPP configuration 130 and initiator key database 101t were depicted and described above in connection with FIG. 1d.

At step 203, device 106 can select a set of parameters 199 and then all recorded responder bootstrap public keys 102a and at least one initiator bootstrap private key bi 101b for the parameters 199 from an initiator key database 101t. A hash value 101aa for the corresponding initiator bootstrap public keys Bi 101a can be selected or processed in a step 203 as well. In addition, the initiator bootstrap public key Bi 101a can be selected in a step 203.

At step 204, for each set of parameters 199, the initiator 101 in device 106 can generate an ephemeral PKI key pair comprising initiator ephemeral private key pi 101d and corresponding initiator ephemeral public key Pi 101c. Initiator 101 in device 106 can then process or generate a DPP authentication request message 122 for each responder bootstrap public key Br 102a selected in step 203. As depicted in FIG. 3a below, the series of steps for processing a message 122 in a step 204 can comprise steps 313 through 316.

At step 205, initiator 101 operating in device 101 can send (i) a DPP authentication request message 122 on the current operating WiFi channel 130b within an operating class 130a for (ii) each responder bootstrap public key Br 102a selected in a step 203. For the first instance of step 205, the first WiFi channel 130b and associated operating class 130a can be the default channel 130b and class 130a selected by device 106 for WiFi radio 106r upon power up in step 201. A step 205 can also comprise sending each DPP message 122 for each key Br 102a multiple times with retry timers, such as waiting a few seconds between sending each DPP message 122. In exemplary embodiments, each DPP message 122 in a step 205 is sent as a broadcast message on the current channel 130b using MAC.I 106n. In exemplary embodiments, for a step 205 each DPP message 122 for each key Br 102a is sent an exemplary 3 to 5 times. Note that for a step 205, multiple different DPP messages 122 for different keys Br 102a can be sent concurrently in order to speed the process for responder 102' operating with responder DPP configuration 131 and a compatible network 107 for key Br 102a to receive the message 122 via WiFi link 192.

At step 206, initiator 101 or device 106 can determine if a DPP authentication response message 123 for a transmitted DPP authentication request message 122 has been received. If a DPP authentication response message 123 has been received, then initiator 101 and device 106 can conclude the step 200 in order to establish communications with a responder 102 or responder proxy 102' (by receiving a DPP authentication response message 123). If a DPP authentication response message 123 has not been received, then initiator 101 and device 106 can proceed to step 207.

At step 207, initiator 101 or device 106 can determine if device 106 has cycled through all available channels 130b on all available operating classes 130a for WiFi radio 106r operating in device 106. If device 106 has not cycled through all available channels 130b on all available operating classes 130a, then device 106 can (i) increment a channel number 130b from the recorded DPP configuration 130 or (ii) if device 106 is already operating at the highest channel number 130b in an operating class 130a then change the operating class 130a for radio 106r and implement the lowest channel number in the new operating class 130a, and then return to step 205 to retransmit the collection of DPP messages 122 for each key Br 102a on the new channel number.

At step 207, if device 106 has cycled through all available channels 130b on all available operating classes 130a, then device 106 can (i) store data from a step 204 in nonvolatile memory for access at a later step 200, and (ii) conclude step 200 and enter a period of sleep or dormancy. After a period of time, device 106 could then wake and repeat the series of steps in a step 200 in order to receive a DPP authentication response 123 message from a responder proxy 102'. Note that upon conducting a step 200 again at a later time, for a step 204 device 106 or initiator 101 could read (a) the data previously calculated or derived from a prior step 204 in (b) nonvolatile memory to access data for sending DPP messages 122 again, instead of re-calculating all the steps in 204.

Note that a step 200 can also be conducted for each set of parameters 199 supported by device 106, such as using a first step 200 with a first bootstrap private key bi 101b with a first set of parameters 199, and then a second step 200 concurrently with a second bootstrap private key bi 101b with a second set of parameters 199. Using the step 200 depicted for a device 106 operating an initiator 101 can allow device 106 to automatically receive a DPP authentication response message 123 from a responder proxy 102' when device 106 is powered on and with range of a responder proxy 102' for a responder bootstrap public key Br 102a (where responder 102' communicates with a DPP server 103 that securely records the responder bootstrap private key br 102b). A step 200 could be conducted with a responder 102* from FIG. 1b or FIG. 1c as well, such that the use of a responder proxy 102' is not required to use a step 200.

FIG. 3a

FIG. 3a is a simplified message flow diagram illustrating an exemplary system with exemplary data sent and received by a device database, a DPP server, a responder proxy, and an initiator, in accordance with exemplary embodiments. System 300a can include a device database 104, DPP server 103, responder proxy 102', and initiator 101 operating in device 106. Responder proxy 102' can communicate with DPP server 103 via IP network 113 as depicted in FIG. 1a. As contemplated herein, a responder proxy 102' depicted in FIG. 3a and subsequent Figures below may also be referred to herein as responder 102', and a responder 102' and responder proxy 102' may be equivalent. In other words, a responder 102' may operate as a responder with some functions and operations for DPP 191 by proxy with DPP server 103.

Before starting steps and message flows depicted in FIG. 3a, the device 106 with initiator 101 can record responder bootstrap public keys Br 102a depicted for an initiator key database 101t from FIG. 1d, where initiator 101 records at least one key Br 102a. The key Br 102a for a initiator 101 could be received in an "out of band" message 121 from FIG. 1b and FIG. 1c, or the key Br 102a could be recorded in a device 106 during manufacturing or distribution. Initiator key database 101t for device 106 could also record a plurality of responder bootstrap public keys Br 102a in a table 101ta from FIG. 1d. For embodiments supporting mutual authentication, then device 106 can also record at least one initiator bootstrap public key Bi 101a and a corresponding initiator bootstrap private key bi 101b, such as in a table 101tb from FIG. 1d. A device 106 with initiator 101 can also operate with at least one device supported configuration 130z from a DPP configuration 130 in FIG. 1d. Exemplary PKI keys for initiator 101 in device 106 could also comprise the exemplary keys depicted in FIG. 1e. Device database 104 can record data depicted and described in connection with FIG. 2a.

Responder 102' can be different than responder 102* in FIG. 1b and FIG. 1c, since (a) some PKI and cryptographic computations (plus recording of PKI keys) that would normally be performed by a responder 102* as contemplated by DPP specification version 1.0 can (b) be performed by DPP server 103 and thus responder 102' is different than an responder 102*. For system 300a, DPP server 103 and device database 104 may establish a secure session setup 302a, which could comprise establishing a secure communications link between the two servers using protocols such as TLS, IPSec, a virtual private network (VPN), a secure shell (SSH), or similar networking, transport, or application layer technologies in order to establish secure communications between DPP server 103 and database 104. Secure session setup 302a can utilize a certificate cert.DPPS 103c for DPP server 103 and a certificate for database 104 in order to provide mutual authentication and mutual key derivation for a symmetric encryption key in secure session 302a.

At step 303, responder 102 can be powered on and begin operating a WiFi radio 102x with a responder configuration 131 as depicted in FIG. 1f. At step 303, responder 102 can operate as an unconfigured responder 102 in FIG. 1f, where the subsequent responder configuration step 127 depicted in FIG. 3a can convert responder 102 into a configured responder 102'. In other words, responder 102' can comprise a responder 102 that has undergone a configuration step 127. At step 303, responder 102 can use a first MAC address MAC.R 102n to transmit or send and receive wireless data via WiFi link 192. At step 303, responder 102 can use a second, network MAC address MAC.N 102q in order to send and receive data with an IP network 113 and network 107 including DPP server 103. Or, in some exemplary embodiments, the same physical interface and MAC address could be used for both MAC.R 102n and MAC.N 102q.

DPP server 103 and responder 102 can establish a secure session 302b, where secure session 302b could comprise a session using TLS, DTLS, IPSec, a VPN, and other possibilities exist as well. Responder 102 can previously record a URL or domain name to reach DPP server 103. Responder 102 can also use a certificate for DPP server 103 comprising cert.DPPS 103c recorded in responder 102 in order to locate and connect with DPP server 103. As depicted in FIG. 3a, secure session 302b could also comprise DPP server 103 receiving and using a responder certificate cert.responder 102m in order to authenticate responder 102. Alternatively, DPP server 103 could authenticate a user of responder 102 via a user ID and password entered by user of responder 102 into a user interface 102k for responder 102. In some exemplary embodiments, authentication of a responder 102 or a user of responder 102 for a secure session 302b could be omitted, such as if responder 102 does not record a cert.responder 102m. Secure session 302b could be established using cert.DPPS 103c, similar to a web site providing HTTPS security based on a certificate for the web site (i.e. the session 302b can authenticate the server and secure the session based on the certificate from the server). In exemplary embodiments, responder 102 can authenticate the cert.DPPS 103c using parent certificates up to a recorded root certificate in cert.root 102w from FIG. 1f.

After secure session 302b has been established between DPP server 103 and responder 102, DPP server 103 can conduct a step 304. Note that a responder identity 102i for responder 102 could be received by DPP server 103 during setup of secure session 302b. At step 304, DPP server 103 can select a DPP application 102g for responder 102', where DPP application 102g can comprise software or firmware for an unconfigured responder 102 to load and operate in order to function as a configured responder 102' DPP application 102g was depicted and described in FIG. 1f. DPP server 103 could select DPP application 102g based on the OS 102e for responder 102, which could be communicated and received by DPP server 103 in setup of secure session 302b. DPP server 103 could obtain DPP application 102g from another server in network 107 or external networks. At step 304, DPP server 103 could also select or process a responder network table 102t for responder 102, where responder network table 102t was depicted and described in connection with FIG. 1f. Responder network table 102t can select which DPP server 103 a configured responder 102' should forward an incoming DPP authentication request message 122 based on the responder bootstrap public key hash value 102aa. Although a DPP server 103 is depicted in FIG. 3a as conducting secure session 302b and a step 304 and then a step 306, another server associated with network 107 could perform those functions and steps for a DPP server 103.

At step 306, DPP server 103 can select the responder mode 306a of operation for responder 102' to conduct a DPP 191 for receipt and processing of incoming DPP authentication request messages 122 from an initiator 101. The selected mode of operation for responder 102' can comprise a mode 306a or a responder mode 306a, which could be recorded in a server database 103a as depicted and described in connection with FIG. 3c below. The selected mode 306a in a step 306 can specify the distribution of PKI keys and related processing between DPP server 103 and responder 102'. The selected mode 306a in a step 306 can determine the subsequent series of steps and message flows between DPP server 103 and responder 102'. The selected mode 306a in a step 306 could be based on the security established or mutual authentication or server authentication in secure session 302b. As one example, if secure session 302b used a certificate cert.DPPs 103c but not a certificate cert.responder 102m (e.g. secure session 302b is less secure or not mutually authenticated or responder 102 is not securely authenticated), then selected mode 306a can comprise a first mode depicted in FIG. 3a and FIG. 3b, where DPP server 103 records and operates on responder ephemeral private key pi 102r and also all secret shared keys k1 314a, k2 314c, and ke 327a. As a second example, if secure session 302b is mutually authenticated (e.g. used a certificate cert.DPPs 103c and a certificate cert.responder 102m), then a selected mode 306a in a step 306 could comprise a second mode 306a for responder 102' to operate as depicted in FIG. 5a, where responder 102' records and operates on responder ephemeral private key pi 102r (and DPP server 103 does not record or operate on the key pi 102r).

As another example, a selected mode 306a in a step 306 could also depend on an identity for device 106, such as MAC.I 106n. For embodiments where the selected mode 306a of operation of a responder 102' depends on the identity of a device 106, then a step 306 to select the mode could be conducted after receipt of a DPP message 122 which would include MAC.I 106n in order to identify the device 106. In other words, in some exemplary embodiments, a preferred responder mode 306a for a device 106 could depend on the device 106, such as if device 106 was a higher-value piece of equipment such as an automobile compared to a potentially lower value networked sensor. For these embodiments, the responder mode 306a for responder 102' could be specified in a device database 104, and for these embodiments the selected mode 306a for responder 102' to operate could be conducted by a step 306 after the receipt of message 312a with data from device database 104.

A first mode 306a could (a) specify that DPP server 103 records all public and private bootstrap and ephemerals keys for responder 102', plus the public keys Bi 101a and Pi 101e for initiator 101 such that (b) resulting cryptographic operations and ECDH key exchanges and symmetric ciphering reside within DPP server 103 and results are transmitted to responder 102'. This first mode 306a could represent the message flows and steps in FIG. 3a and FIG. 3b, with the recording of keys depicted in FIG. 3c below. A second mode 306a could specify that DPP server records and operates on the responder bootstrap private key br 102b, but responder 102' records and operates on the responder ephemerals private key pr 101r, and the second mode 306a is depicted in FIG. 5a below. A third responder mode 306a could specify that both responder 102' and DPP server 103 record and operate on responder ephemeral private key pr 102r, such that (b) resulting cryptographic operations and key exchanges are shared between DPP server 103 and responder 102'. This third responder mode 306a could represent the message flows and steps depicted in FIG. 5b, with the recording of keys depicted in FIG. 3c below.

In exemplary embodiments, all the first, second, and third responder modes 306a specify responder bootstrap private key br 102b residing within DPP server 103 and not shared with responder 102'. By not sharing responder bootstrap private key br 102b with responder 102' (which could be a device with much less security than DPP server 103), the responder bootstrap private key br 102b can remain secured within network 107. These embodiments where responder bootstrap private key br 102b remains in network 107 (e.g. in DPP server 103 and device database 104) support securely sharing the same responder bootstrap public key Br 102a potentially across a plurality of devices 106 with initiators 101 (as well as responder 102' recording key Br 102a). Sharing the same responder bootstrap public key Br 102a across multiple devices supports recording the key Br 102a in a device 106 either (i) during manufacturing or distribution of device 106, or (ii) at a time before any association between device 106 and network access point 105 is known. This simplifies and enables the use of a device provisioning protocol 191 across multiple devices 106 with mutual authentication, where the responder bootstrap public key Br 102a can comprise a shared key 102z. Or, in other embodiments the responder bootstrap public key Br 102a may not be a shared key 102z, but rather unique for a responder 102' (such as a unique responder bootstrap public key Br 102a recorded in a tag 102v), and security is still enhanced because responder 102' may not record or operate on responder bootstrap private key br 102b.

In other words, without the technology described in the present disclosure, a device provisioning protocol with mutual authentication can essentially shift the problem of (a) securely mutually authenticating a device and providing credentials 109 to a device 106 to a new, but related problem of (b) securely providing a responder bootstrap private key br 102b to an responder 102*, where an initiator should record the responder bootstrap public key Br 102a. The first, second, and third modes 306a can solve this shifted/new problem since (i) the responder bootstrap private key 102b can permanently reside in a network 107 and does not need to be sent to the responder 102', and (ii) an initiator can be configured to record key Br 102a before receipt of device 106 by a user (since the same key Br 102a can be written to many different devices). However, with the technology in the present disclosure, the responder 102' can still transmit and receive the full set of a device provisioning protocol 191 messages with an initiator 101 as specified in DPP specification version 1.0.

A fourth mode 306a could specify that responder 102' records all of the responder bootstrap and ephemeral PKI keys, as well as the initiator 101 public keys, such that resulting cryptographic operations and key exchanges reside in responder 102'. This fourth mode 306a could represent the message flows and steps depicted in FIG. 1b or FIG. 1c, and in this case responder 102' could comprise an initiator 102*. Other possibilities exist as well without departing from the scope of the present disclosure. Additional details for the different responder modes 306a selected in a step 306, with the resulting different allocation or recording of PKI keys and derived symmetric ciphering keys are described below in FIG. 3b for a server database 103a.

After a step 306, DPP server 103 can send responder 102 a message 305, where message 305 can include a responder identity 102i, responder network table 102t, responder DPP application 102g, and a responder configuration 131. Note that the responder configuration 131 in message 305 can represent an updated responder configuration to replace or update a previous responder configuration 131 recorded by responder 102. DPP application 102g could comprise a link or URL for responder 102 to download and install DPP application 102g (comprising such as less than an exemplary 100 bytes), or the full software DPP application 102g for responder 102' to operate, which could comprise more than 1 megabyte of data. Responder identity 102i can be useful for a device such as access point 105 operating a responder 102', since in exemplary embodiments an access point 105 could operate more than one responder 102', and the different responders 102' operating in an access point 105 or other device could be identified using the responder identity 102i. In some exemplary embodiments, the responder mode 306a could also be sent in a message 305 from DPP server 103. In other exemplary embodiments, responder mode 306a for responder 102' can also be sent below in a message 312b, after an identity for device 106 such as MAC.I 106n is obtained from a subsequent message 122.

Responder 102 using responder identity 102i in system 300a can receive message 305 and process the data. Responder 102 can download and install the DPP application 102g from a message 305. Responder 102 can load and apply both responder network table 102t and the received responder configuration 131, which could specify radio frequencies or channels to utilize, such as class 131a and channels 131b. Responder 102 can conduct the responder configuration step 127 depicted and described in connection with FIG. 1f in order to begin operating as a configured responder 102'. At step 307, responder 102' can begin listening for incoming DPP authentication request messages 122 using WiFi radio 102x and operating with responder configuration 131 in order to communicate with a WiFi radio 106r operating in device 106 with initiator 101, where the communications can use a WiFi data link 192. In exemplary embodiments, DPP application 102g may be (i) included or distributed along with an operating system 102e running on responder 102' or (ii) acquired at a different time than a message 305, and thus from a separate download of DPP application 102g. In exemplary embodiments, WiFi radio 102x operating in responder 102' can listen for message 122 either broadcast or unicast messages or datagrams from device 106 with initiator 101 when using responder configuration 131. In exemplary embodiments, initiator 101 transmits DPP messages 122 using the same or compatible configuration as responder configuration 131.

Device 106 operating initiator 101 can conduct the steps 200 depicted and described in connection with FIG. 2b above. In summary, at step 200 in FIG. 3a, device 106 may power on from an unpowered or "deep sleep" state. Power could be provided from a battery or converted "wall power". Device 106 could (i) load the equivalent or initiator version of information contained in responder configuration 131 using a bootloader program and (ii) power on WiFi radio 106r. Device 106 can load database 101t for initiator 101 with at least one responder bootstrap public key Br 102a. As a portion of a step 200, device 106 can conduct a step 204 as depicted in FIG. 2b. Step 204 can comprise steps 313, 314, 315, and 316. Note that step 200 can comprise a cycle or loop through responder bootstrap public keys Br 102a recorded in database 101t so that initiator 101 send a DPP authentication request message 122 for each responder bootstrap public key Br 102a until initiator 101 successfully receives a DPP authentication response message 123.

A step 313 can comprise initiator 101 deriving an initiator ephemeral private key pi 101d and an initiator ephemeral public key Pi 101c. Step 313 can use a random number generator to produce a random number, which could be input into a key pair generation algorithm using the set of cryptographic parameters 199a. The resulting PKI key values from conducting a step 313 can comprise the initiator ephemeral private key pi 101d and the initiator ephemeral public key Pi 101c. The data for a step 313 comprising derived ephemeral PKI keys for initiator 101 can be recorded in memory of device 106, such that the ephemeral PKI keys can be derived one time until a DPP authentication response message 123 is received from a responder such as responder 102'.

Step 314 can comprise initiator 101 conducting a first initiator key exchange step 314 using an Elliptic Curve Diffie Hellman (ECDH) key exchange 401a, as depicted and described in connection with FIG. 4a below. Data input for a step 314 can comprise the initiator ephemeral private key pi 101d and the selected responder bootstrap public key Br 102a from a step 203. Data output from a step 314 can comprise a key k1 314a as described in FIG. 4a below. Step 314 can comprise the key exchange and symmetric key derivation step in DPP specification version 1.0 section 6.2.2 in order to for an initiator to obtain key k1 314a. Note that step 314 by initiator 101 can be conducted for each recorded responder bootstrap public key Br 102 in a database 101t. The data for a step 314 can be stored in memory for device 106 such that keys k1 314a for each key Br 101a can be stored and reused for a subsequent "loop" in a step 200 until initiator 101 receives a DPP authentication response message 123, thereby reducing the number of computations and energy required by device 106.

At step 315, initiator 101 can generate a random number for an initiator nonce 317a using parameters 199a. As used herein and throughout the present disclosure, the words "random number" can also mean a pseudo random number, since random numbers generated by nodes may not be truly random. However, their "randomness" may be sufficient in order to securely conduct the cryptographic operations contemplated herein. Initiator 101 can also determine the initiator capabilities, which could comprise an enrollee for the initiator as depicted in FIG. 3a. In other embodiments, the responder 102' could have initiator capabilities as an enrollee (where the initiator 101 could be the configurator). A step 315 can comprise encrypting the initiator nonce 317a and initiator capabilities using the derived key k1 from step 314. An encryption step 315 step is further depicted and described in connection with FIG. 4a below.

Note that step 315 by initiator 101 can be conducted for (i) each recorded responder bootstrap public key Br 102a in a database 101t with (ii) a corresponding key k1 314a recorded from a step 314. A single initiator nonce 317a can be reused across all encryption steps 315 and the output of all encryption steps 315 comprising ciphertext 315a can be recorded in memory of device 106, such that an encryption step 315 needs only to be conducted once by initiator 101 for each key Br 102a in a database 101t (by reusing initiator ephemeral private key pi 101d and key k1 314a). In other words, initiator 101 can record one ciphertext 315a for each responder bootstrap public key Br 102a in a database 101t, and a subsequent "loop" or generation of a DPP authentication request message 122 (such as transmitting on a different channel 130b) can reuse the ciphertext 315a recorded for the key Br 102a, key pi 101d, and initiator nonce 317a. In this manner, the number of computations and energy use by device 106 can be reduced, by reusing a previously recorded ciphertext 315a when re-transmitting a DPP authentication request message 122 for the same key Br 102a at a later time.

At step 316, initiator 101 can calculate secure hash value 101aa for initiator bootstrap public key Bi 101a and secure hash value 102aa for responder bootstrap public key Br 102a, using a secure hash algorithm 199e. The values are depicted in FIG. 3a as "H(Bi)" and "H(Br)", respectively. Initiator 101 can then transmit using radio 106r and channel 130b a DPP authentication request message 122, which can include the hash value 101aa for the initiator bootstrap public key Bi 101a and the hash value 102aa the responder bootstrap public key Br 102a, the derived initiator ephemeral public key Pi 101c, and ciphertext 315a, where ciphertext 315a is encrypted with key k1 314a and includes an initiator nonce 317a and the initiator capabilities.

In exemplary embodiments and as depicted and described in connection with FIG. 2b in a step 205 for a step 200 depicted in FIG. 3a, a DPP authentication request message 122 for each recorded responder bootstrap public key Br 102a can be transmitted by initiator 101 on channel 130b. In exemplary embodiments, each DPP message 122 can be transmitted as a broadcast message on channel 130b, since initiator 101 may not know a responder 102' MAC address. As depicted for a step 200 above in FIG. 2b, initiator 101 may need to repeat messages 122 for each key Br 102a multiple times on several different channels in a channel list 130b, since (i) responder 102' may be listening on a different channel in a responder channel list 131b, and (ii) responder 102' may be using only one of the bootstrap responder public keys Br 102a from a database 101t which corresponds to the key Br 102a recorded and operated by responder 102'.

Although a message 122, message 123, etc. as depicted herein shows key values of "k1", "ke", etc., the depiction of the keys is to illustrate that ciphertext is encrypted with the corresponding key by the use of brackets. In other words, although the key values are shown with the messages, the actual key values are not transmitted inside or with the message in exemplary embodiments. The equivalent syntax is used in DPP specification version 1.0.

Responder 102' can receive a DPP authentication request message 122 in a step 308a and process the message. For a step 308a, responder 102' can compare (i) hash values 102aa for H(Br 102a) received in message 122 with (ii) the recorded hash values 102aa in a responder network table 102t. Or, responder 102' can record the responder bootstrap public key Br 102a and calculate a hash value and compare with the hash value received in a message 122. If (a) the hash value 102*aa* for H(Br 102*a*) in message 122 matches or are equal to a recorded or calculated hash value 102*aa*, then (b) for a step 308 responder 102' can conduct a key validation step on received initiator ephemeral public key Pi 101*c* described two paragraphs below. Otherwise, responder 102' can continue to monitor or listen for new, different incoming messages 122 where the hash value 102*aa* would equal a recorded or calculated hash value 102*aa* for a responder bootstrap public key Br 102*a* in responder 102.

An identity for device 106 and initiator 101 could also comprise the secure hash value over the initiator bootstrap public key Bi 101*a*, which can be value 101*aa* as depicted for message 122 in FIG. 3*a*. In other words, as contemplated throughout the present disclosure, an identity for device 106 and/or initiator 101 can comprise the hash value 101*aa* over the initiator bootstrap public key Bi 101*a*. For example, a device database 104 (FIG. 2*a*), a server database 103*a* (FIG. 3*c*), or responder 102' could record and use hash value 101*aa* as an identity for device 106 or initiator 101 in order to select keys for conducting key exchange and encryption/decryption steps. The hash value 101*aa* could be either (i) instead of or (ii) in addition to MAC.I 106*n* or device identity ID.device 106*i* in order to identify and track device 106 with initiator 101 across a potential plurality of devices 106 in systems 100, 300, 500, etc.

A step 308*b* could comprise responder 102' performing the steps for an ECC Full Public-Key Validation Routine in section 5.6.2.3.2 of FIPS publication SP 800-56A (revision 2) for the received initiator ephemeral public key Pi 101*c*. Alternatively, step 308*b* can comprise responder 102' performing the steps ECC Partial Public-Key Validation Routine in section 5.6.2.3.3 of the same FIPS publication. Other example steps within a public key validation step 308 can comprise (i) verifying the public key is not at the "point of infinity", and (ii) verifying the coordinates of the point for the public key are in the range [0, p−1], where p is the prime defining the finite field. Other possibilities exist as well for evaluating and validating a received public key is cryptographically secure in a public key validation step 308*b*, without departing from the scope of the present disclosure. As contemplated in the present disclosure, a responder 102', a DPP server 103, or an initiator 101 can conduct a public key validation step 308*b* each time a public key is received. In addition, a responder network table 102*t* can include a set of parameters 199*a* for each entry corresponding to a key Br 101*a*, and the set of parameters 199*a* could be used for key validation steps in a step 308*b*.

A step 308*c* can comprise responder 102' selecting a DPP server 103 based on the received hash value 102*aa* for responder bootstrap public key Br 102*a* in message 122. A responder 102' could communicate with a plurality of different DPP servers 103 or networks 107, and a key Br 102*a* could be associated with different DPP servers 103. For example, different networks 107 or DPP servers 103 could record and operate with the responder bootstrap private key br 102*b* in order to conduct or support a DPP 191 with initiator 101. The responder 102' could use the hash value 102*aa* and a responder network table 102*t* as depicted in FIG. 1*f* in order to determine which DPP server 103 should receive data from the incoming DPP authentication request message 122. FIG. 3*a* depicts hash value 102*aa* for DPP server 103 in network 107 from FIG. 1*a*, although hash value 102*aa* could be for a different network 107 in exemplary embodiments. In other words, DPP server 103 could comprise a depicted "DPP 103-1" for responder network table 102*t* in FIG. 1*f*, and a different hash value 102*aa* for Br 102*a* in message 122 could be for a different DPP server 103 comprising a depicted value of "DPP 103-3" in responder network table 102*t* in FIG. 1*f*. A step 308*c* can also include responder 102' starting a timer in order to count the seconds between receiving message 122 and sending upcoming message 123. Additional details regarding the timer from a step 308*c* are described in a step 324 below.

After steps 308*a*, 308*b*, and 308*c*, responder 102' can send DPP server 103 a message 309 via the secure session 302*b*. Message 309 can include a responder identity 102*i*, an identity for initiator 101 and/or device 101 comprising MAC.I 106*n*, and the data contained in DPP authentication request message 122 received by responder 102'. Note that MAC.I 106*n* could be observed by responder 102' as the source MAC address for message 122 received via WiFi link 192. Data from message 122 in message 309 can include secure hash value 101*aa* for initiator bootstrap public key Bi 101*a* and secure hash value 102*aa* for responder bootstrap public key Br 102*a*, the initiator ephemeral public key Pi 101*c*, and ciphertext 315*a*. Although not depicted in FIG. 3*a*, a message 309 could also include the responder bootstrap public key Br 102*a*, for embodiments where responder 102' also records key Br 102*a*. DPP server 103 can receive message 309 and process the data, including recording the received initiator ephemeral public key Pi 101*c* in a server database 103*a*, which is also depicted in FIG. 3*c* below. Before taking steps to process the received ciphertext 315*a*, DPP server 103 could require additional PKI keys, if they are not already recorded in a server database 103*a*.

For embodiments where DPP server 103 does not already record PKI keys for responder 102' and initiator 101, DPP server 103 can send device database 104 a message 310 in order to query for keys and information in order to support a DPP 191 between responder 102' and initiator 101. DPP server 103 can send message 310 through secure session 302*a*. Message 310 can include an identity for device 101, which could be MAC.I 106*n* and secure hash value 101*aa* for initiator bootstrap public key Bi 101*a* and secure hash value 102*aa* for responder bootstrap public key Br 102*a*.

Device database 104 can receive message 310. Device database 104 in step 312 can conduct a query of device database 104 for data associated with the received data from an initiator comprising and identity of MAC.I 106*n*, hash value 102*aa* and hash value 101*aa*. Exemplary data for device database 104 was depicted and described in connection with FIG. 2*a* above. Not all data in the depicted message 310 is required to conduct a query in a step 312, and a hash value 101*aa* for Bi 101*a* could be omitted as one example. Or, in exemplary embodiments, the MAC.I 106*n* may not be recorded in a device database 104, but data for a device 106 could be found using hash value 101*aa* for Bi 101*a*. Thus, in exemplary embodiments at least one of MAC.I 106*n* and hash value 101*aa* for Bi 101*a* is received by device database 104 in a message 310, and the at least one MAC.I 106*n* and hash value 101*aa* for Bi 101*a* is recorded in a device database 104.

In exemplary embodiments, a query in a step 312 can select a responder bootstrap private key br 102*b*, responder bootstrap public key Br 102*a*, optionally either (i) initiator bootstrap public key Bi 101*a* or (ii) PKEX key 198 for device 106 from a device database 104. For embodiments where initiator bootstrap PKI keys for device 106 are updated over time, then the most recently updated initiator bootstrap public key Bi 101*a* can be selected by a database query in a step 312. Additional data can be selected for device 106 and/or initiator 101 in a query at step 312 as well, including a set of parameters 199*a* to use with bootstrap PKI keys and ephemeral keys and/or a responder mode 306a for DPP server 103 and responder 102' to use when conducting a DPP 191 with initiator 101. Note that a responder mode 306a could be selected for responder 102' in either a step 306 or a query in step 312. The query in step 312 can return values for a message 312a from device database 104 to DPP server 103.

The values in a message 312a can comprise data for a device identity of MAC.I 106n (or hash value 101aa) and the values can include responder bootstrap public key Br 102a, initiator bootstrap public key Bi 101a, responder bootstrap private key br 102b, a device identity ID.device 101i, a selected set of cryptographic parameters 199a for the PKI keys, and optionally PKEX key 198. MAC.I 106n or hash value 101aa can be included in a message 312a so that DPP server 103 can track which of a possible plurality of initiators 101 and devices 106 that message 312a is associated with. Although not depicted for a message 312a, a message 312a could also include a responder mode 306a for device 106 using MAC.I 106n.

DPP server 103 can receive the message 312a and record the data received in a server database 103a. DPP server 103 can (i) use a device identity such as MAC.I 106n or hash value 101aa in order to select or update a responder mode 306a previously selected in a step 306, or (ii) conduct a step 306 at this time in order to select a responder mode 306a recorded for responder 102' in a server database 103a, where a server database 103a is depicted and described in connection with FIG. 3c below. As depicted in FIG. 3a, DPP server 103 can then send message 312b to responder 102', where message 312b can include (i) the selected responder mode 306a of operation for responder 102' and DPP server 103 to use when conducting a DPP 191 with initiator 101, (ii) a selected set of cryptographic parameters 199a for use with PKI keys and a device provisioning protocol, and (iii) optionally a PKEX key 198 for conducting a public key exchange with initiator 101. In exemplary embodiments, the PKEX key 198 can be included in message 312a for embodiments where device database 104 does not record an initiator bootstrap public key Bi 101a for device 106 with MAC.I 106n. Message 312b can also optionally include a device identity such as MAC.I 106n or hash value 101aa in order to associate the data in message 312b with a particular initiator 101, since responder 102' could potentially communicate with a plurality of different devices 106.

Responder 102' can receive message 312b from DPP server 103 and conduct a step 312c. In step 312c, responder 102' can use and record the responder mode 306a in order to conduct subsequent steps for responder 102' and messages with DPP server 103 for device 106 with initiator 101. Note that a responder mode 306a could specify the operation of responder 102' with device 106, such that responder 102' could operate with a first responder mode 306a for a first device 106 and a second responder mode 306a with a second device 106. The depicted subsequent steps and messages for responder 102' in FIG. 3a with the responder mode 306a depicted as received in a message 312b can comprise a first responder mode 306a depicted as "FIG. 3" in server database 103a.

For embodiments where PKEX key 198 is received in a message 312b (e.g. embodiments where device database 104 may not previously record initiator bootstrap public key Bi 101a before step 312), then responder 102' can conduct a public key exchange protocol exchange 312d with initiator 101 using the PKEX key 198 depicted in FIG. 3a. A PKEX 312d can comprise the PKEX protocol as specified in section 5.6 of DPP specification version 1.0. In this manner, responder 102' can receive the key Bi 101a if not previously recorded by a device database 104. Although not depicted in FIG. 3a, upon conclusion of a PKEX 312d (or otherwise obtaining an initiator bootstrap public key Bi 101a such as an "out of band" message 126 in FIG. 1c), responder 102' can forward the key Bi 101a to DPP server 103 after receipt of the initiator bootstrap public key Bi 101a from a step 312d. The use of a PKEX protocol and key 198 can also be optionally omitted in some embodiments, if initiator bootstrap public key Bi 101a can be recorded by a network 107 prior to a step 312c.

As depicted in FIG. 3a, the collection of steps and messages in FIG. 3a, from step 200 for device 106 through the optional message 312d can be grouped together into a step 301. Step 301 with the collective group of sub-steps and messages depicted for a step 301 can also be performed in other embodiments depicted in FIG. 5a and FIG. 5b below. Subsequent messages and steps depicted in FIG. 3a starting after step 301 can represent a first responder mode 306a for DPP server 103 and responder 102', where the allocation of recording PKI keys and symmetric keys from key exchanges for the first mode 306a are depicted below in FIG. 3c. The first responder mode 306a can be depicted in FIG. 3c with the label "FIG. 3" is depicted in FIG. 3a and FIG. 3b.

For the first responder mode 306a selected in a step 306, DPP server 103 can then conduct the series of depicted steps 318 through 315b in FIG. 3a in order to generate data for responder 102' to send a DPP authentication response message 123. At step 318, DPP server 103 can also generate two random numbers using a random number generator. The first random number can be used as a responder ephemeral private key pr 102d. The responder ephemeral private key pr 102p can be input into an ECC key pair generation algorithm in order to output a responder ephemeral public key Pr 102p. The set of cryptographic parameters 199a used for the responder ephemeral PKI key pair can match the recorded parameters 199a used with the bootstrap public keys such as responder bootstrap public key Br 102a. The second random number generated by DPP server 103 can be used as a responder nonce 318b. DPP server 103 can also determine responder capabilities 319b, which could comprise the capabilities for a configurator. The responder ephemeral private key pr 102d can also be referred to as responder protocol private key pr 102d, and responder ephemeral public key Pr 102c can be referred to as responder protocol public key Pr 102c. The second random number in a step 318 can comprise a responder nonce value 318b, which can be used in subsequent messages and calculation of authentication values.

Figure 4A:
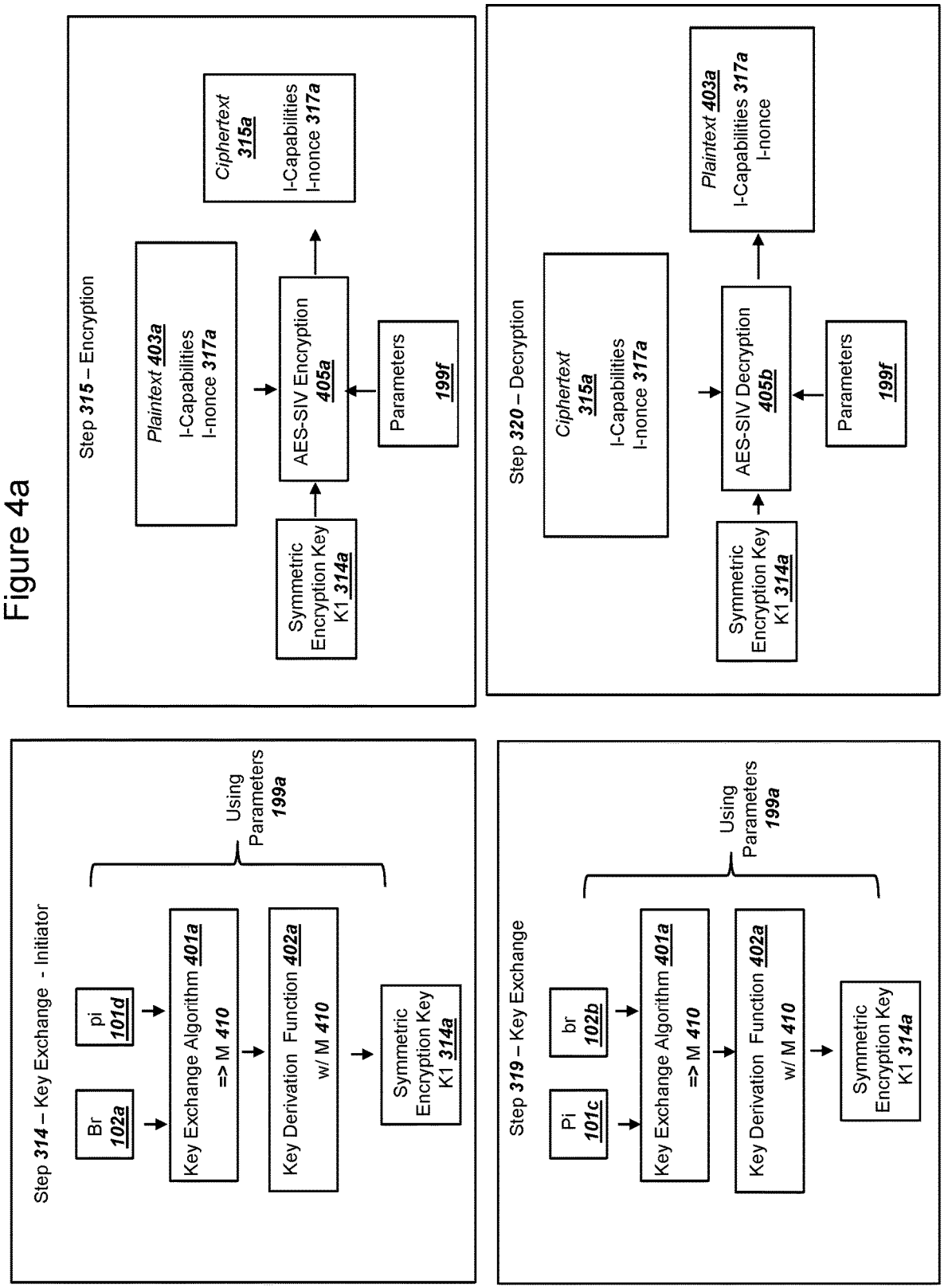
FIG. 4a is a flow chart illustrating exemplary steps for conducting a key exchange using PKI keys in order to derive a shared secret key, and for using the derived shared secret key to encrypt and decrypt data, in accordance with exemplary embodiments.
Figure 4B:
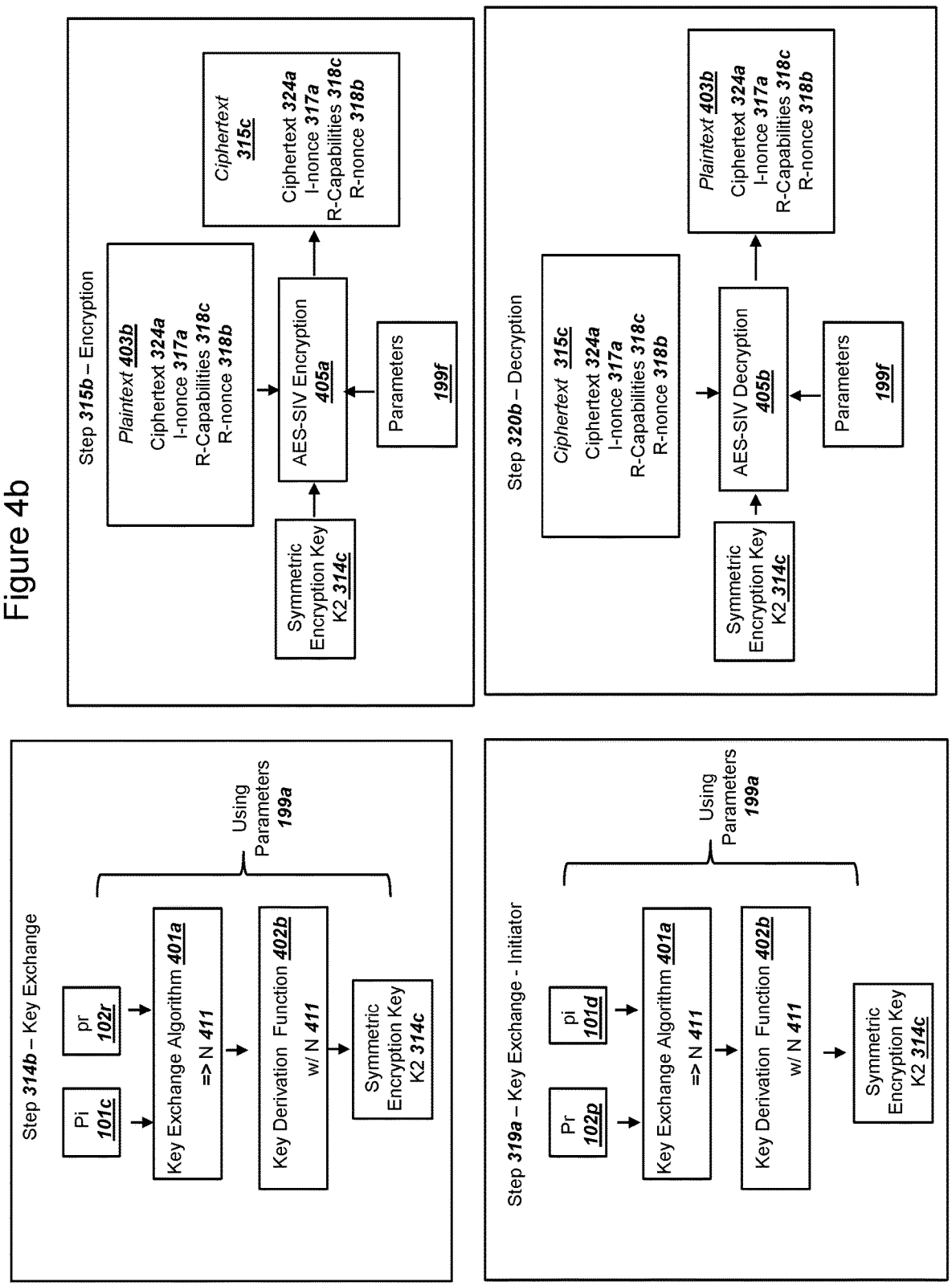
FIG. 4b is a flow chart illustrating exemplary steps for conducting a key exchange using PKI keys in order to derive a shared secret key, and for using the derived shared secret key to encrypt and decrypt data, in accordance with exemplary embodiments.

DPP server 103 can conduct a first responder key exchange step 319, where the details for a key exchange step 319 are depicted in FIG. 4a below. In summary, the received initiator ephemeral public key Pi 101c and the responder bootstrap private key br 102b can be input into an ECDH key exchange in order to mutually derive a shared secret key M 410. The shared secret key M 410 can be input into a key derivation function 402a in order for DPP server 103 to derive mutually shared key k1 314a. A DPP server 103 can then conduct a decryption step 320 as depicted in FIG. 4a below. DPP server 103 can input the received ciphertext 315a from a message 122 into a symmetric ciphering algorithm 405b and key k1 314a using parameter 199f in order to read the plaintext 403a, which could comprise the initiator nonce 317a and the initiator capabilities. In exemplary embodiments, the responder 102' can have capabilities of a configurator, and DPP server 103 can select initiator capabilities or an enrollee in a step 320. Steps 319 and steps 320 can also comprise the first four paragraphs of section 6.2.3 of DPP specification version 1.0.

DPP server 103 can then conduct a second responder key exchange step 314b, where the details for a key exchange step 314b are depicted and described in connection with FIG. 4b below. In summary, the initiator ephemeral public key Pi 101c received in message 122 can be input into an ECDH key exchange algorithm 401a along with the responder ephemeral private key pr 102r derived in a step 318 above in order to output a secret shared key N 411. The value for shared secret key N 411 can be recorded and used in the derivation of a key ke 327a in a third key exchange step 321 below. For a step 314b, the value for the shared secret key N 411 can be input into a key derivation function 402b in order to derive a mutually shared symmetric key k2 314c.

Figure 4C:
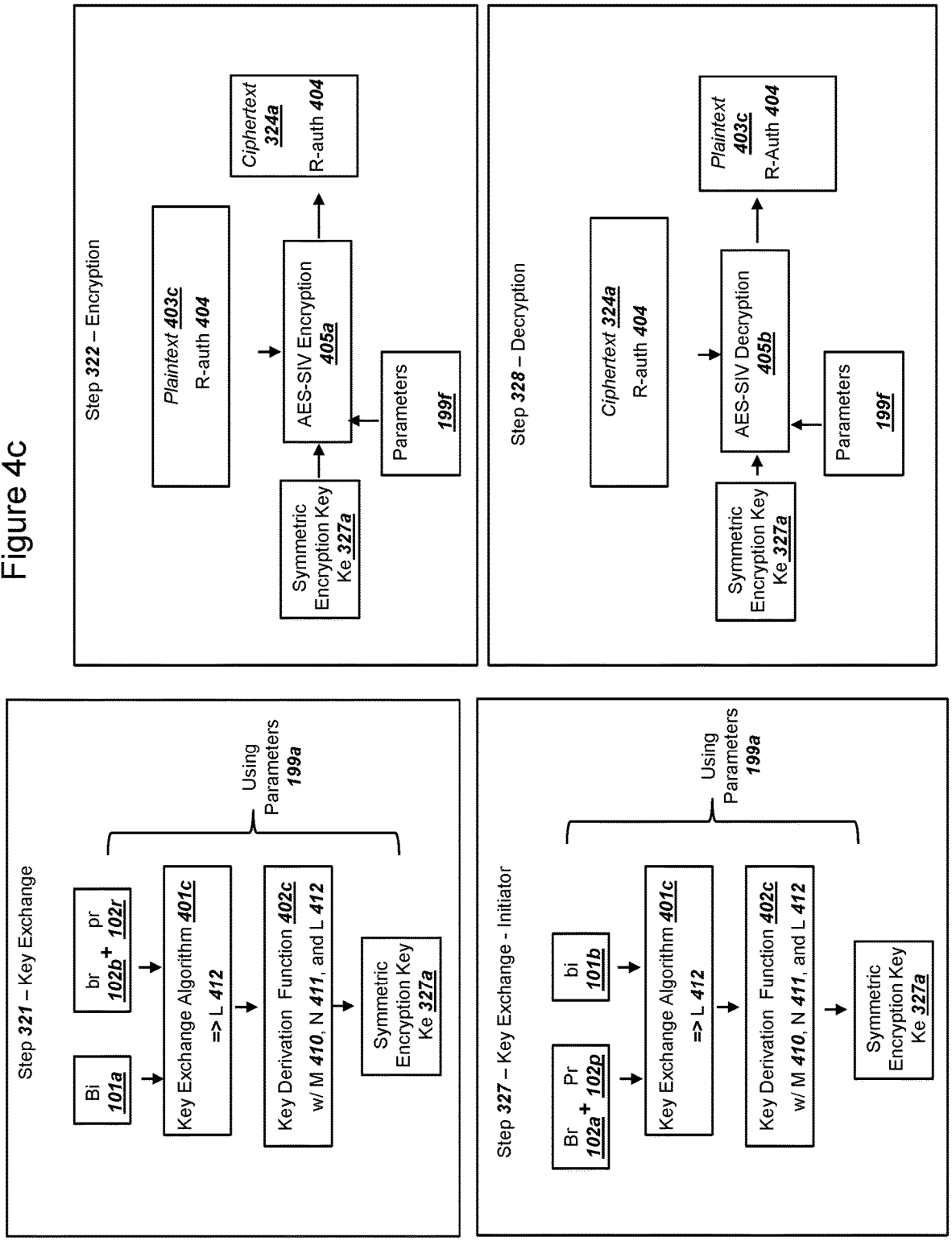
FIG. 4c is a flow chart illustrating exemplary steps for conducting a key exchange using PKI keys in order to derive a shared secret key, and for using the derived shared secret key to encrypt and decrypt data, in accordance with exemplary embodiments.

DPP server 103 can conduct a third responder key exchange step 321, where the details for a key exchange step 321 are depicted in FIG. 4c below. In summary, both (i) the derived responder ephemeral private key pr 102r from a step 318 with the recorded responder bootstrap private key br 102b, and (ii) the initiator bootstrap public key Bi 101a can be input into an ECDH key exchange algorithm 401c in order to output a secret shared key L 412. For embodiments where a DPP responder authentication 141 is conducted by DPP server 103 without the use of an initiator bootstrap public key Bi 101a, then calculation of a secret shared key L 412 can be optionally omitted in a step 321. Step 321 for DPP server 103 can then comprise a key derivation function 402c using the mutually derived secret shared keys M 410, N 4111, and optionally L 412 in order to mutually derive secret shared key ke 327a. An example for a key exchange step 321 is described in point 2 of section 6.2.3 of DPP specification version 1.0 on page 48.

DPP server 103 can then conduct an encryption step 322, where the details for an encryption step 322 are depicted and described in connection with FIG. 4c below. Step 322 can also comprise DPP server 103 creating a value R-auth 404, where R-auth 404 can comprise a hash of the initiator nonce 317a from plaintext 403a in step 320, the second random number R-nonce 318b from a step 318 above, and public PKI keys. The value for R-auth 404 in a step 322 can comprise the value in point 3 of section 6.2.3 of DPP specification version 1.0. An encryption step 322 can comprise DPP server 103 (a) encrypting the value for R-auth 404 using the mutually derived key ke 327a from the third key exchange step 321 above, where (b) the output of encryption step 322 can comprise ciphertext 324a.

DPP server 103 can then conduct an encryption step 315b, where the details for an encryption step 315b are depicted and described in connection with FIG. 4b below. Ciphertext 324a from an encryption step 322 above can also be encrypted again for an encryption step 315b. The symmetric ciphering key for encryption step 315b can comprise symmetric key k2 314c. Encryption step 315b, encryption step 322, and decryption step 320 can use a common symmetric ciphering algorithm 405a, which could comprise the Advanced Encryption Standard with Synthetic Initialization Vectors (AES-SIV) (and deciphering algorithm) also with a common set of symmetric ciphering parameters 199f. Symmetric ciphering parameters 199f can also specify the use of a block chaining mode such as cipher block chaining (CBC), counter mode (CTR), or Galois/Counter mode (GCM) and other possibilities exist as well. In addition, symmetric ciphering parameters 199f could specify a mode for message authentication, which could comprise a CMAC mode as specified in NIST publication SP-800-38B. In exemplary embodiments, a symmetric ciphering algorithm 405a can comprise the AES-SIV algorithm as specified in IETF RFC 5297. The output from an encryption step 315b can be ciphertext 315c, as depicted in FIG. 4b below.

After the encryption step 315b, DPP server 103 can send responder 102' a message 313, where message 313 can include an identity for device 106 such as MAC.I 106n, hash value 102aa for key Br 102a, hash value 101aa for key Bi 101a, the responder ephemeral (or protocol) public key Pr 102p from a step 318 and a ciphertext 315c. The ciphertext 315c can comprise the encrypted data depicted and described in connection with FIG. 4b below from the encryption step 315b. As depicted in FIG. 3a, ciphertext 315c can be encrypted with key k2 314c and include the responder nonce 318c, the initiator nonce 317a, the responder capabilities (as an exemplary configurator in FIG. 3a), and a ciphertext 324a. In other words, ciphertext 324a can comprise data that is encrypted twice, where the first encryption with a key ke 327a can be in a step 322 as depicted in FIG. 4c below, and the second encryption step can be with key k2 314c. Ciphertext 324a can include a responder authentication value 404, where the responder authentication value 404 is encrypted by DPP server 103 with key ke 327a.

Responder 102' can receive message 313 and conduct a step 324 to process the message. Note that message 313 and other messages between responder 102' and DPP server 103 can be sent and received via secure session 302b. Responder 102' can conduct a step 324. For a step 324, responder 102' can record the received responder ephemeral public key Pr 102p in a responder network table 102t along with the identity of device 106 comprising potentially MAC.I 106n. In other words, a responder network table 102t can be updated to include information received from network 107 (and DPP server 103) regarding devices 106 communication through network 107 via responder 102'. Step 324 can also include responder 102' conducting a key validation step 308b on the received key Pr 102p from message 313 using parameters 199a from a message 312b above. In exemplary embodiments, if message 313 has been received after more than an exemplary 10 seconds after the start of the timer in step 308c (e.g. maximum exemplary time between message 122 and message 123), then step 324 comprises responder 102' caching the data from message 313 in memory 102f until responder 102' receives a retry message 122 again. Upon responder 102' receiving the message 122 again (this time after message 313 has been received with data from message 313 cached in memory 102f), then responder 102' can send the cached data from message 313 recorded in the step 324.

Using the data received from DPP server 103, responder 102' can then send initiator 101 a DPP authentication response message 123. In exemplary embodiments, message 123 is sent as a unicast message from (i) the responder MAC address MAC.R 102n (which received message 122) to (ii) the initiator MAC address MAC.I 106n (which sent message 122), over (iii) WiFi link 192. As depicted in FIG. 3a, message 123 can include hash values of the bootstrap public keys H(Br 102a), H(Bi 101a), the responder ephemeral public key Pr 102p, and the ciphertext 315c. The ciphertext 315c can have encrypted values for (i) R-nonce 318b, (ii) I-nonce 317a, (iii) R-capabilities 318c, and (iv) ciphertext 324a. The ciphertext 315c can be encrypted with mutually derived symmetric encryption key k2 314c. Ciphertext 324a can be encrypted with the mutually derived symmetric key ke 327a and can include a plaintext value for R-auth 404. As described above, R-auth 404 can comprise a hash value over an initiator nonce 317a received and the responder nonce 318b.

As depicted in FIG. 3a, initiator 101 can receive DPP Authentication Response message 123. Although not depicted in FIG. 3a, in exemplary embodiments, initiator 101 can conduct a step 308b to process and validate the received responder ephemeral public key Pr 102p, such as evaluating that the received key in message 123 is securely compatible with key pi 101d and key bi 101b, using the same steps as a key validation step 308c. In other words, a key validation step 308c by responder 102' may not be as complete as a key validation step 308b by initiator 101, since initiator 101 can compare the received key Pr 102p from a message 123 with data from private keys pi 101d and key bi 101b using parameters 199a for the keys.

Initiator 101 can receive DPP authentication response message 123 from responder 102' and conduct a series of steps in order to process the message and reply to the responder 102'. At step 325, initiator 101 can record the validated, received responder ephemeral public key Pr 102p in a responder public key table 101ta, as depicted in FIG. 1d above. In other words, although FIG. 1d does not depict a column for key Pr 102p, the column and data could be added for a responder as the data is received. Initiator ephemeral private key pi 101d and initiator ephemeral public key Pi 101c could be recorded in a responder public key table 101ta as well, when the keys can be utilized. Any insertion of key Pr 102p, pi 101d and Pi 101c (for responder 102' identified by key Br 102a into table 101ta preferably has the data deleted upon conclusion of a DPP 191 and receipt and installation of credentials 109 as a configuration object for device 106 with initiator 101.

At step 319a, initiator 101 can conduct a second initiator key exchange step 319a, where initiator 101 can input the received, validated responder ephemeral public key Pr 102p and the derived initiator ephemeral private key pi 101d into an ECDH key exchange algorithm 401b in order to calculate a shared secret key N 411. The second server key exchange step 319a is also depicted and described in connection with FIG. 4b below. Shared secret key N 411 can also be used by initiator 101 in a step 327 below. Initiator 101 can input shared secret key N 411 into a key derivation function 402b in order to mutually derive the symmetric encryption key k2 314c.

At step 320b, initiator 101 can use the derived key k2 314c from a step 319a in order to conduct a decryption step 320b on received ciphertext 315c. A decryption step 320b on received ciphertext 315c using key k2 314c is depicted an described in connection with FIG. 4b below. Initiator 101 can read the plaintext 403b values from decryption step 320b. The plaintext values 403b can include the initiator nonce 317a from a message 122 and message 309 above. The plaintext values 403b can also include a second ciphertext 324a (e.g. ciphertext 324a can be inside ciphertext 315c). Initiator 101 verifies that the initiator nonce 317a received in message 123 and decrypted in step 320b is equal to the initiator nonce 317a value sent in message 122 above. If the two initiator nonce 317a values are not equal, then initiator 101 can abort the DPP procedure and subsequent steps.

At step 327, initiator 101 can conduct a third initiator key exchange step 327, where initiator 101 can determine the secret shared key L 412 by inputting (i) the an ECC point addition of the responder bootstrap public key Br 102a and the responder ephemeral public key Pr 102p, and (ii) the initiator bootstrap private key bi 101b into an ECDH key exchange algorithm 401c. This third server key exchange step 327 is depicted and described in connection with FIG. 4b below. The shared secret key L 412 along with share secret keys M 410 and N 411 can be used with a key derivation function 402c in order to output the mutually derived symmetric ciphering key ke 327a.

At step 328, initiator 101 can conduct a decryption step 328 on the ciphertext 324a using the key ke 327a. A decryption step 328 is depicted and described in connection with FIG. 4c below. Initiator 101 can use the decryption step 328 in order to read the plaintext value of R-auth 404. R-auth 404 can comprise a hash 199e value over at least a combination of initiator nonce 317a and the responder nonce 318b. At step 328, initiator 101 can then also internally calculate the same value for R-auth 404, and if the internally calculated value and the received, decrypted value are equal, then the responder 102' can be consider authenticated with initiator 101. The calculation of R-auth 404 by initiator 101 can be according to section 6.2.3 of DPP specification version 1.0.

Initiator 101 can then conduct a step 322b, where step 322b can comprise calculating an initiator authentication value I-auth 404a. Initiator authentication value 404a can be similar to responder authentication value R-auth 404, except the values of initiator nonce 317a can be sequenced before a responder nonce 318b inside a hash 199e calculation over the two nonces. An initiator 101 can then encrypt the initiator authentication value 404a using an encryption step 322 using key ke 327a, as depicted in FIG. 4c below. In other words, an encryption step 322 in FIG. 4c depicts the encryption of R-auth 404, and encryption step 322b can comprise a initiator 101 encrypting the initiator authentication value I-auth 404a using the key ke 327a derived in a step 327. The resulting ciphertext with the encrypted initiator nonce valued 404a from an encryption step 322b can comprise ciphertext 324b. As depicted in FIG. 3a, the collection of steps for an initiator 101 of the depicted steps 325, 319a, through 322b can comprise a step 331. A step 331 in summary allows initiator 101 to process and verify the received DPP authentication response message 123. As depicted in FIG. 3a, additional steps for a responder 102' in initiator 101, and DPP server 103 to conduct in order to complete a device provisioning protocol session are depicted in FIG. 3b below.

FIG. 3b

Figure 3B:
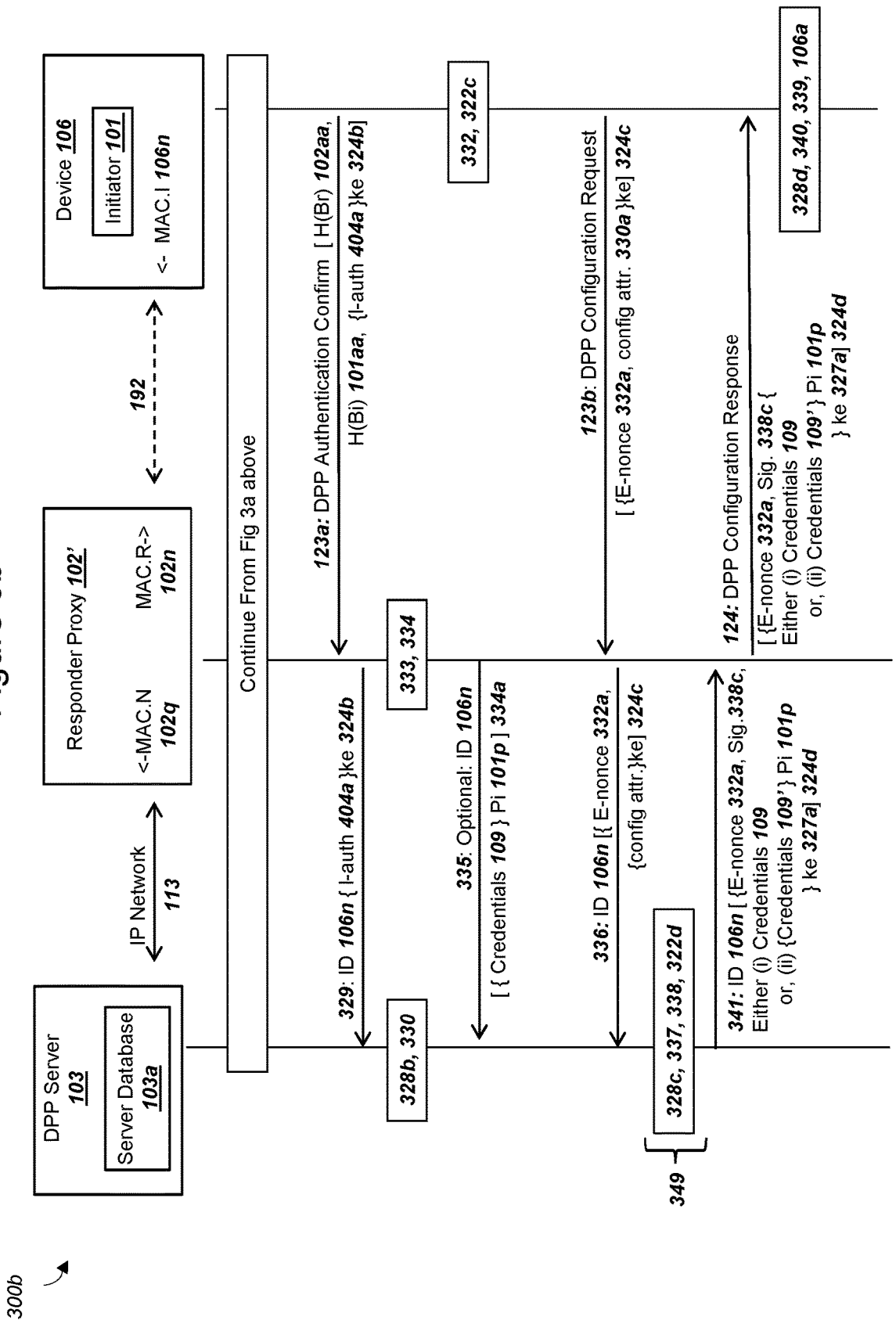
FIG. 3b is a simplified message flow diagram illustrating an exemplary system with exemplary data sent and received by a DPP server, a responder proxy, and an initiator, in accordance with exemplary embodiments.

FIG. 3b is a simplified message flow diagram illustrating an exemplary system with exemplary data sent and received by a DPP server, a responder proxy, and an initiator, in accordance with exemplary embodiments. Before starting steps and message flows depicted in FIG. 3b, the device 106 with initiator 101, responder 102', and DPP server 103 can complete the series of steps and message flows depicted above in FIG. 3a. System 300b can include a DPP server 103, responder proxy 102', and initiator 101 operating in device 106. Responder proxy 102' can communicate with DPP server 103 via IP network 113 as depicted in FIG. 1a. Responder proxy 102' can communicate with initiator 101 via WiFi link 192.

After completing the series of steps for a step 331 in FIG. 3a, initiator 101 can send responder 102' a DPP authentication confirm message 123a. The data and steps to determine and calculate a DPP authentication confirm message 123a can be compatible with section 6.2.4 of DPP specification version 1.0. Note that although the DPP authentication confirm message 123a can be equivalent to the DPP authentication confirm message from section 6.2.4 of DPP specification version 1.0, an important difference can be the operation of responder 102' in FIG. 3b versus a responder as contemplated by DPP specification version 1.0. In the present disclosure as depicted in FIG. 3b, responder 102' does not record the responder bootstrap private key br 102b. However, using the technology depicted in FIG. 3a and FIG. 3b, a responder 102' can (i) send and receive messages that are fully compatible with a DPP protocol 191 (including DPP specification version 1.0), but (ii) DPP server 103 can record and operate on key br 102b. In other words, a initiator 101 may not "know" that a responder 102' operates as either (i) an responder 102* from FIG. 1b or FIG. 1c, or (ii) an responder 102' from FIG. 3a and FIG. 3b since the messages transmitted and received by the initiator 101 from responder 102' can be fully compatible with a DPP 191.

Other differences besides the location of recording and operating on key br 102b can apply as well for the responder mode 306a depicted in FIG. 3a and FIG. 3b, such as key pr 102r also remains in DPP server 103 and not recorded or operated on by responder 102'. The recording and operation of responder private keys br 102b and key pr 102r by DPP server 103 can comprise a first responder mode 306a, where responder mode 306a was selected by DPP server 103 or network 107 in a step 306 and communicated to responder 102' in a message 312b.

Responder 102' can listen for either (i) a broadcast message with the hash 199e values for the bootstrap public keys 102aa and 101aa, or (ii) a unicast message to MAC.R 102n from MAC.I 106n for initiator 101 operating in device 106. Responder 102' can receive the DPP authentication confirm message 123a and process the message. DPP authentication confirm message 123a can be processed by initiator 101 using a step 331 as depicted in FIG. 3a. DPP authentication confirm message 123a can include an encrypted value for initiator authentication value 404a as a ciphertext 324b, where ciphertext 324b is encrypted with derived key ke 327a in a step 322b.

Upon receipt of DPP authentication confirm message 123a from device 106, responder 102' can forward data in the message to DPP server 103 via secure session 302b. Responder 102' can send DPP server 103 a message 329, where message 329 includes an identity for device 106 (which could be the depicted value of MAC.I 106n) as well as ciphertext 324b. Although not depicted for a message 329 in FIG. 3b, ciphertext 324b can also include the hash values for the bootstrap public keys of hash value 102aa and/or hash value 101aa.

DPP server 103 can receive message 329 and record data from the message 329 and process the data. DPP server 103 can use the identity for device 106 comprising MAC.I 106n (or another device identity such as ID.device 106i or hash value 101aa sent in a message 329). DPP server 103 can first conduct a decryption step 328b, where decryption step 328b can use the same steps as a decryption step 328 as depicted in FIG. 4c below, with a difference being decryption step 328b operates on the ciphertext 324b containing the encrypted initiator authentication value I-auth 404a instead of the R-auth 404 value. After a step 328b, DPP server 103 can read the plaintext initiator authentication value I-auth 404a.

In step 330, DPP server 103 can compare the decrypted value for I-auth 404a with a calculated value for I-auth 404a and if the two values match then the initiator 101 can be considered by DPP server 103 to be authenticated. The calculation of I-auth 404a for DPP server 103 in a step 330 can comprise a calculation of a secure hash value over at least the responder nonce 318b and bootstrap and ephemeral public keys, with an exemplary calculation for I-auth 404a shown in the sixth paragraph of page 50 of DPP specification version 1.0. Other calculations of an initiator authentication value over the responder nonce 318b are possible as well, without departing from the scope of the present disclosure.

In a step 333, responder 102' can select a set of network credentials 109 for device 106 using initiator 101. The set of network credentials 109 could comprise the exemplary set of credentials 109 depicted and described in connection with FIG. 1a. The set of network credentials 109 can comprise an SSID.network-AP 109a, a pairwise master key (PMK) PMK.network-AP 109b, and a set of configuration data comprising config.network-AP 109c. The value PMK.network-AP 109b can also include an identifier for a PMK such as a PMKID. Or, for legacy WiFi connections that utilize WPA2 and similar or earlier standards, PMK.network-AP 109b can comprise a value for a shared secret key such as a PSK. The set of network credentials 109 can comprise values for device 106 to authenticate and encrypt data with network access point 105 in order for device 106 to connect with network access point 105. The network credentials 109 could support use of WiFi link 192 with WPA3 standards from the WiFi Alliance™ in exemplary embodiments. Note that in some exemplary embodiments, a step 333 for selecting credentials 109 for device 106 can be omitted by responder 102' and the step 333 can be performed by DPP server 103 or another server within network 107, such as a server running a RADIUS server, or performing an extensible authentication protocol (EAP) based authentication with device 106.

In a step 334, for embodiments where responder 102' conducts the step 333 to select credentials 109, responder 102' can optionally encrypt the credentials 109 with an asymmetric ciphering algorithm using a public key for initiator 101 or device 106. The use of an asymmetric ciphering algorithms and associated public keys is depicted below in a step 334 in FIG. 3e. Responder 102' can send DPP server 103 a message 335, where the message 335 includes an identity for device 106 such as MAC.I 106n, and a ciphertext 334a, where the ciphertext includes the asymmetrically encrypted network credentials 109'. The encryption key depicted in FIG. 3b for ciphertext 334a is initiator ephemeral public key Pi 101p, although a different public key for device 106 or initiator 101 could be used as well, such as the initiator bootstrap public key or a public key in certificate cert.device 106m. The device certificate cert.device 106m could be (i) stored in a device database 103d and (ii) sent to DPP server 103 in a message 312a in FIG. 3a, and then (ii) sent from DPP server 103 to responder proxy 102' in a message 312b in FIG. 3a.

The "optional" notation for a message 335 depends on the source of credentials 109 in a system 300b. If a device operating responder 102' (such as an exemplary access point 105) is responsible for generating or operating credentials 109 (such as a single access point in a user's home), then responder 102' can be the source of the credentials 109 and send the message 335. If a network 107 is responsible for generating or operating credentials 109 (such as in a corporate or campus network of LAN access points 105), including operating EAP-based authentication via RADIUS or similar standards, then the message 335 can be optionally omitted since DPP server 103 could obtain the network credentials 109 from another source in a network 107 besides the device operating responder 102'.

After transmitting the DPP authentication confirm message 123a, in step 332, initiator 101 can take on a roll of enrollee, such that initiator 101 can prepare to send a configuration attribute 330a. Configuration attribute 330a can be used to specify that initiator 101 can take the roll of enrollee and is expecting a set of network credentials 109 from responder 102'. A configuration attribute 330a can be formatted according to section 6.3.4 of DPP specification version 1.0. For the exemplary embodiment depicted in FIG. 1a, device 106 with initiator 101 would prefer a role of WiFi client (or "sta") for a configuration attribute 330a, but other possibilities exist as well. For the exemplary embodiment depicted in FIG. 7 below a responder 102' operating within an access point 105 would prefer a role of WiFi access point (or "ap") for a configuration attribute 330a.

In step 332, initiator 101 can also generate a third random number, for an enrollee nonce E-nonce 332a. E-nonce 332a and other nonce values in FIG. 3a such as the initiator nonce I-nonce 317a and responder nonce R-nonce 318b can be processed using nonce parameters 199g. Initiator 101 can then conduct an encryption step 322c, where encryption step 322c can comprise (i) an encryption step 322 using key ke 327a, and (ii) the plaintext to be encrypted can be at least the E-nonce 332a and the configuration attribute 330a. The output of an encryption step 322c can be a ciphertext 324c. Initiator 101 can then send responder 102' a DPP Configuration Request message 123b, where the configuration request 123b can include the ciphertext 324c, where the plaintext in ciphertext 324c can include E-nonce 332a and the configuration attribute 330a. DPP Configuration Request message 123b can be processed by initiator 101 according to section 6.3.3 of DPP specification version 1.0.

Responder 102' can receive DPP Configuration Request message 123b via connection 192 and using DPP application 102g. As contemplated herein, a DPP application 102g can perform the steps for responder 102' depicted in FIG. 3a, such as transmitting/receiving DPP 191 messages using a first MAC.R 102n for connection 192 and transmitting/receiving messages with DPP server 103 using MAC.N 102q via access network 112. DPP application 102g could also perform the depicted steps 308b above to validate the received initiator ephemeral public key Pi 101c. For embodiments where responder 102' uses a WAN radio 102h to connect with IP network 113 and DPP server 103, then DPP application 102g could also use a different identity than MAC.N 102q to identify the physical interface of WAN radio 102h, such as an IMEI, or other possibilities exist as well. For other embodiments MAC.R 102n could also potentially be the same as MAC.N 102q, and other possibilities exist as well for the identification of physical network interfaces used by responder 102' or a device operating responder 102' without departing from the scope of the present disclosure.

Responder 102' can send DPP server 103 a message 336 via secure connection 302b, where message 336 can include the ciphertext 324c. Message 336 can also include an identity for device 106, such as, but not limited to, MAC.I 106n or ID.device 106i, since both DPP server 103 and responder 102' can communicate with a plurality of different devices 106 over time, and DPP server 103 may prefer to know which ciphertext 324c is associated with which device 106 in order to process the ciphertext 324c. As depicted in FIG. 3b, message 336 can include the encrypted values for E-nonce 332a and configuration attribute 330a.

DPP server 103 can receive message 336 and process the message 336. DPP server 103 can conduct a decryption step 328c using decryption step 328 depicted in FIG. 4c below. A difference between decryption step 328 and decryption step 328c is that decryption step 328c uses the ciphertext 324c as input into the symmetric decryption algorithm 405b. DPP server 103 can use the previously calculated key ke 327a in order to read the plaintext within ciphertext 324c. In a step 328c, DPP server 103 can record the plaintext E-nonce 332a and configuration attribute 330a.

In step 337, DPP server 103 can process the received configuration attribute 330a. For the exemplary embodiment depicted in FIG. 1a, configuration attribute 330a can specify that device 106 with initiator 101 may have a role of WiFi client. For a step 337, DPP server 103 can select a set of network credentials 109 for device 106 using initiator 101 in order to create a configuration object. The configuration object in a step 337 can be compatible with a configuration object in section 6.3.6 of DPP specification version 1.0. For embodiments where DPP server 103 received a message 335 with an asymmetrically encrypted set of credentials 109' from responder 102', then in a step 337 DPP server 103 can select and use the credentials 109' as the data for a configuration object. If encrypted credentials 109' are selected by DPP server 103 in a step 337, then the credentials 109' after decryption by device 106 using a decryption step 339 can comprise a configuration object per section 6.3.6 of DPP specification version 1.0. As contemplated herein, a reference to DPP specification version 1.0 can also include subsequent and related versions of the standard that would be substantially compatible with version 1.0.

Continuing at step 337, for embodiments where DPP server 103 did not receive a message 335 from responder 102', then DPP server 103 can be responsible for obtaining credentials 109, such as if network 107 is responsible for generating or creating the network credentials 109 for device 106 (such as if access point 105 uses EAP-based authentication and other possibilities exist as well). Note that DPP server 103 could also receive an asymmetrically encrypted set of network credentials 109' from another server or external network 108 in a step 337, where DPP server 103 or network 107 sends an identity for device 106 such as Bi 101a or H(BI) 101aa to the external network 108 and the external network 108 can use the identity 106 to conduct a step 334 for credential 109'. Or, in a step 337, DPP server 103 could receive plaintext network credentials 109 from another server in network 107 or generate the network credentials 109 using data recorded for access point 105 in a server database 103a. Other possibilities exist as well for the source of a set of network credentials 109 for DPP server 103 in a step 337 without departing from the scope of the present disclosure.

Continuing at step 337, DPP server 103 can process a configuration object for network credentials 109, and the configuration object can include an SSID value of SSID-.network-AP 109a, a pairwise master key value of PMK-.network-AP 109b, and configuration values of config.network-AP 109c. The value of PMK.network-AP 109b can also include a value for PMKID (e.g. PMK identifier), such that PMK.network-AP 109b is used by each of a client and an access point with the PMKID value. The configuration values of config.network-AP 109c in a configuration object could also specify required supporting data for operation of device 106 with an access point 105 after a configuration step 106a, such as an operating class 131a, channel list 131b, an authentication mode for device 106 to operate, which could be PSK, PMK, SAE, EAP, also with any required supporting data and/or identities in order to use the authentication mode. The configuration values of config.network-AP 109c in a configuration object could also include a passphrase or pre-shared key values of PSK for legacy WPA2 networks. In other words, credentials 109 for other authentication schemes between a device and an access point could be supported as well, including EAP-TLS, EAP-PSK, EAP-AKA, EAP-AKA', etc.

As contemplated herein, a set of network credentials 109 can include either (i) network credentials 109 for a selected primary access network, and/or (ii) network credentials 109 for both a selected primary access network and a selected backup access network. Or, in another exemplary embodiment, although a single configuration object of network credentials 109 is depicted in FIG. 3b, DPP server 103 could process (i) a first set of network credentials 109 for selected primary access network into a first configuration object and then (ii) a second set of network access credentials 109 for selected backup access network into a second configuration object. At the conclusion of a step 337, DPP server 103 can record and process a configuration object comprising a set of plaintext network credentials 109 or asymmetrically encrypted set of network credentials 109' for device 106 operating initiator 101, where device 106 can be identified by an identity such as ID.device 106i or MAC.I 106n or H(Bi) 101aa.

For a step 338 in FIG. 3b, DPP server 103 can conduct a signature creation step 338 as depicted and described in connection with FIG. 3d below. The configuration object with network credentials 109 (or encrypted credentials 109') can be signed using the recorded responder ephemeral private key pr 102r, corresponding to public key Pr 102p sent in message 325. The digital signature by DPP server 103 in FIG. 3b can comprise a digital signature 338c. Or, in another embodiment the configuration object with network credentials 109 can be signed using the recorded responder bootstrap private key 102b, where initiator 101 could verify the signature 338c with the bootstrap public key Br 102a. Note that some exemplary embodiments contemplate that DPP server 103 receives (i) credentials 109 or asymmetrically encrypted credentials 109' from (ii) another server in network 107 or an external network 108, and a step 338 can comprise DPP server 103 creating a digital signature 338c for the (i) credentials 109 or asymmetrically encrypted credentials 109' from (ii) another server in network 107 or an external network 108. The steps to create and verify a signature with ECC PKI keys can be according to FIPS publication 186-4, and other possibilities exist as well. The use of a digital signature 338c for credentials 109 or 109' is optional in exemplary embodiments, and for some embodiments a digital signature 338c could be omitted (as well as signature creation step 338 and signature verification step 340).

At step 332d, DPP server 103 can conduct an encryption step 332d using an encryption step 322 depicted and described in connection with FIG. 4c below. Encryption step 332d can be performed using key ke 327a for device 106. For encryption step 332d, the plaintext values of (i) the E-nonce 332a and (ii) the configuration object comprising network credentials 109 (or asymmetrically encrypted credentials 109') can be input into a symmetric encryption algorithm 405a in order to generate a ciphertext 324d. Note that digital signature 338c can be included in an encryption step 332d as well, although digital signature 338c could also optionally not be included in a ciphertext 324d and sent in a subsequent message 341 and 124 external to ciphertext 324d. As depicted in FIG. 3b, the collection of steps 328c through 322d can comprise a step 349.

DPP server 103 can then send responder 102' a message 341, where message 341 includes the ciphertext 324d. Message 338 can also include (i) an identity for device 106 such as MAC.I 106n or ID.device 106i, and (ii) a signature 338c from a signature creation step 338. Message 338 can be sent via secure connection 302b, as depicted in FIG. 3b. Although signature 338c is depicted as within ciphertext 324d for a message 341, signature 338c could be external to ciphertext 324d in a message 341.

Responder 102' using DPP application 102g can receive message 341 via secure connection 302b. Responder 102' can use an optional identity for device 106 in a message 341 in order to determine which of a potential plurality of devices 106 is associated with ciphertext 324d in order to forward the data to device 106. Responder 102' can then send initiator 101 a DPP configuration response message 124 via connection 192, where message 124 can include the ciphertext 324d, and the ciphertext 324d can include the E-nonce 332a, the signature 338c, and either network credentials 109 or asymmetrically encrypted network credentials 109'. If network credentials 109' are sent in ciphertext 324d, then the network credentials 109' can comprise a set of "double encrypted" network credentials of (i) asymmetrically encrypted network credentials 109' and (ii) then encrypted again in a ciphertext 324d using the key ke 327a.

Initiator 101 can receive message 124 from responder 102' with ciphertext 324d. Initiator 101 can conduct a decryption step 328d using decryption step 328 depicted in FIG. 4c below. A difference between decryption step 328 and decryption step 328d is that decryption step 328d uses the ciphertext 324d as input into the symmetric decryption algorithm 405b. Initiator 101 can use the previously calculated key ke 327a in order to read the plaintext within ciphertext 324d. Initiator 101 can confirm that plaintext in ciphertext 324d includes the previously sent E-nonce 332a. Initiator 101 can extract a plaintext value for (i) network credentials 109 or (ii) asymmetrically encrypted network credentials 109' using symmetric decryption algorithm 405b and key ke 327a. In other words, with credentials 109' decryption step 328d removes the first layer of "double encryption" where the first layer was encrypted with key ke 327a, and the "plaintext" after decryption step 328d for credentials 109' can comprise the asymmetrically encrypted network credentials 109' (e.g. with the first layer of encryption with key ke 327a has been removed).

Initiator 101 can conduct a signature verification step 340 as depicted and described in connection with FIG. 3d above in order to verify signature 338c received in message 124. Initiator 101 can use either (i) responder ephemeral bootstrap public key Pr 102p or (ii) responder bootstrap public key Br 102a in order to conduct a signature verification step 340 on digital signature 338c. If plaintext network credentials 109 are included in ciphertext 324d, then initiator 101 can read the plaintext values for credentials 109. If asymmetrically encrypted network credentials 109' are included in ciphertext 324d, then initiator 101 or device 106 operating initiator 101 can conduct an asymmetric decryption step 339 depicted below in FIG. 3e in order to convert credentials 109' into plaintext credentials 109.

After reading the plaintext network credentials 109 and optionally verifying a signature using recorded public keys 102p or 102a, device 106 can complete the configuration step 106a by loading the network credentials 109 and begin operating a WiFi radio 106r with the network credentials 109. In other words, the WiFi data link 192 depicted in FIG. 1a can be converted into a fully authenticated and encrypted WiFi connection using network credentials 109 and standards such as WPA2, WPA3, and also subsequent or related standards where WiFi nodes such as clients or access points use a compatible set of network credentials 109. For example, device 106 could begin scanning for SSID.network-AP 109a on a channel in Config.network-AP 109c, and then send access point 105 a probe request. In this manner, device 106 can obtain connectivity to network access point 105.

FIG. 3c

FIG. 3c is an illustration of an exemplary server database, with tables for a server database recording exemplary data, in accordance with exemplary embodiments. A server database 103a depicted and described above in connection with FIG. 1a and FIG. 3a can record data for a DPP server 103 to work with a responder 102' in order for the responder 102' to conduct a device provisioning protocol 191 with a device 106 operating an initiator 101. A server database 103a could record a plurality of tables for a plurality of devices 106 and a plurality of responders 102', including the depicted device credentials table 345. Other possibilities exist as well for the organization, tables, and recorded data within a server database 103a without departing from the scope of the present disclosure. Data within server database 103a could be encrypted using a symmetric key. As depicted in FIG. 1a, a DPP server 103 operating in a network 107 could operate and record a server database 103a.

Server database 103a can record a device identity for device 106 of MAC.I 106n, a responder identity which could be MAC address MAC.N 102q, a responder mode 306a comprising a mode of operation for the DPP server 103 and responder 102', a selected set of Cryptographic Parameters 199a, a Responder Ephemeral Public Key Pr 102p, a Responder Ephemeral Private Key pr 102r, an Initiator Ephemeral Public Key Pi 101c, Bootstrap keys 399, an optional PKEX Key 198, a Shared Secret k1 314a, a Shared Secret k2 314c, and a Shared Secret ke 327a. Different identities for device 106 and responder 102' could be recorded in a server database 103a as well, such as ID.device 106i or an identity for a responder 102' that is different than a MAC address for responder 102', such as a serial number or unique identifier for responder 102'. In exemplary embodiments, hash value 101aa over the initiator bootstrap public key Bi 101a can be used for a device identity in a server database 103a.

For exemplary embodiments, not all depicted values may be recorded in a server database 103a, as shown by the depicted value of "–", which can mean that the value is not recorded or stored in a server database 103a. A responder 102' could record and operate on the value depicted as "–" for a server database 103a in FIG. 3c for some responder modes 306a. For example, with the row in server database 103a depicted with a mode "FIG. 5a", the responder 102' could derive, record, and operate on the responder ephemeral public key Pr 102p, and DPP server 103 may not need or record the key. Similarly, with the row in server database 103a depicted in FIG. 3c as a mode of "FIG. 5a", the responder 102' could derive or operate on shared secret keys k1 314a, k2 314c and ke 327e, while server database 103a would not need to record or operate on the shared secret keys in order for responder 102' with a mode 306a of "FIG. 5a" to conduct a DPP 191 with initiator 101.

Note that in alternative exemplary embodiments, a server database 103a could record the values M 410, N 411, and L 412 respectively instead of key k1 314a, k2 314c, and/or ke 327e, and either server 103 or responder 102' could use the key derivation function 402a, 402b, and/or 402c, respectively in order to convert the values M, N, and L into keys k1, k2, and ke as depicted in FIGS. 4a through 4c. In exemplary embodiments, the time that a device shared secret key or a derived ephemeral PKI key, or a bootstrap key is recorded in a server database 103a can be minimized to the minimum time necessary to conduct a DPP 191. For example, shared secret keys and ephemeral PKI keys recorded in a server database 103a can be deleted once a configuration step 106a has been completed for a device 101, such as at the time DPP server 103 receives a confirmation that device 106 has begun using the credentials 109 with a network access point 105.

Responder mode 306a can specify an operating mode for responder 102' and DPP server 103, such that a sequence of steps and transmitting/receiving PKI and/or shared secret keys and/or related supporting messages can be specified by the responder mode 306a. A responder mode 306a could also be referred to as a "server mode" 306a, since the mode specifies the operation of a DPP server 103. Or, responder mode 306a could be referred to as a "mode 306a", since both steps for responder 102' and DPP server 102 are affected by the mode. Other terms could be used to refer to the selected mode as well, such as a "method", "procedure", or a "process". FIG. 2a above also described a first, second, and third operating responder modes 306a. A first mode is depicted as "FIG. 3" in FIG. 3c and can comprise the mode 306a depicted in FIG. 3a and FIG. 3b. Note that all depicted ephemeral PKI keys and bootstrap PKI keys, as well as all depicted shared secret keys can be recorded in a server database 103a for a responder 102' for the first mode. In other words, when conducting a DPP 191, responder 102' and DPP server 103 could have all the depicted keys recorded in a server database 103a for the first mode. This first mode for an initiator mode 306a can be preferred for embodiments where (i) responder 102' may have a lower level of trust with network 107, or (ii) responder 102' could have a lower level of processing resources, or (iii) an owner for device 106 or a network 107 may prefer that responder bootstrap private key br 102b is not shared externally to network 107, (iv) regulatory requirements where device 106 could comprise a high value or sensitive piece of equipment, or (v) responder 102' conducts a secure session 302b without a responder certificate cert.responder 102m. Other possibilities exist as well for the reasons different modes 306a may be used in a server database 103a to specify the steps for a responder 102' and DPP server 103 to conduct a DPP 191 with device 101.

A second responder mode 306a is depicted as "FIG. 5a" in FIG. 3c, where (a) the steps and message flows in FIG. 5 for responder 102' and DPP server 103 can comprise (b) the second mode. Note that all relevant bootstrap PKI keys 399 are recorded in a server database 103a for the second responder mode 306a depicted in FIG. 5a. The second mode 306a can also omit (i) the initiator ephemeral public key Pi 101c, (ii) and the responder ephemeral private key pr 102r from being recorded in a server database 103a. Note that secret shared keys can optionally not be recorded in a server database 103a for the second mode depicted in FIG. 5a. This exemplary embodiment of a second responder mode 306a may be preferred for cases where (i) responder 102' can handle more of the cryptographic operations (e.g. reducing DPP server 103 processing load), but (ii) a network 107 could prefer that the responder bootstrap private key br 102b is not transmitted to or recorded in responder 102'. A third responder mode 306a is depicted as "FIG. 5b" in FIG. 3c, where (a) the steps and message flows in FIG. 5b for responder 102' and DPP server 103 can comprise (b) the third mode.

Figure 6:
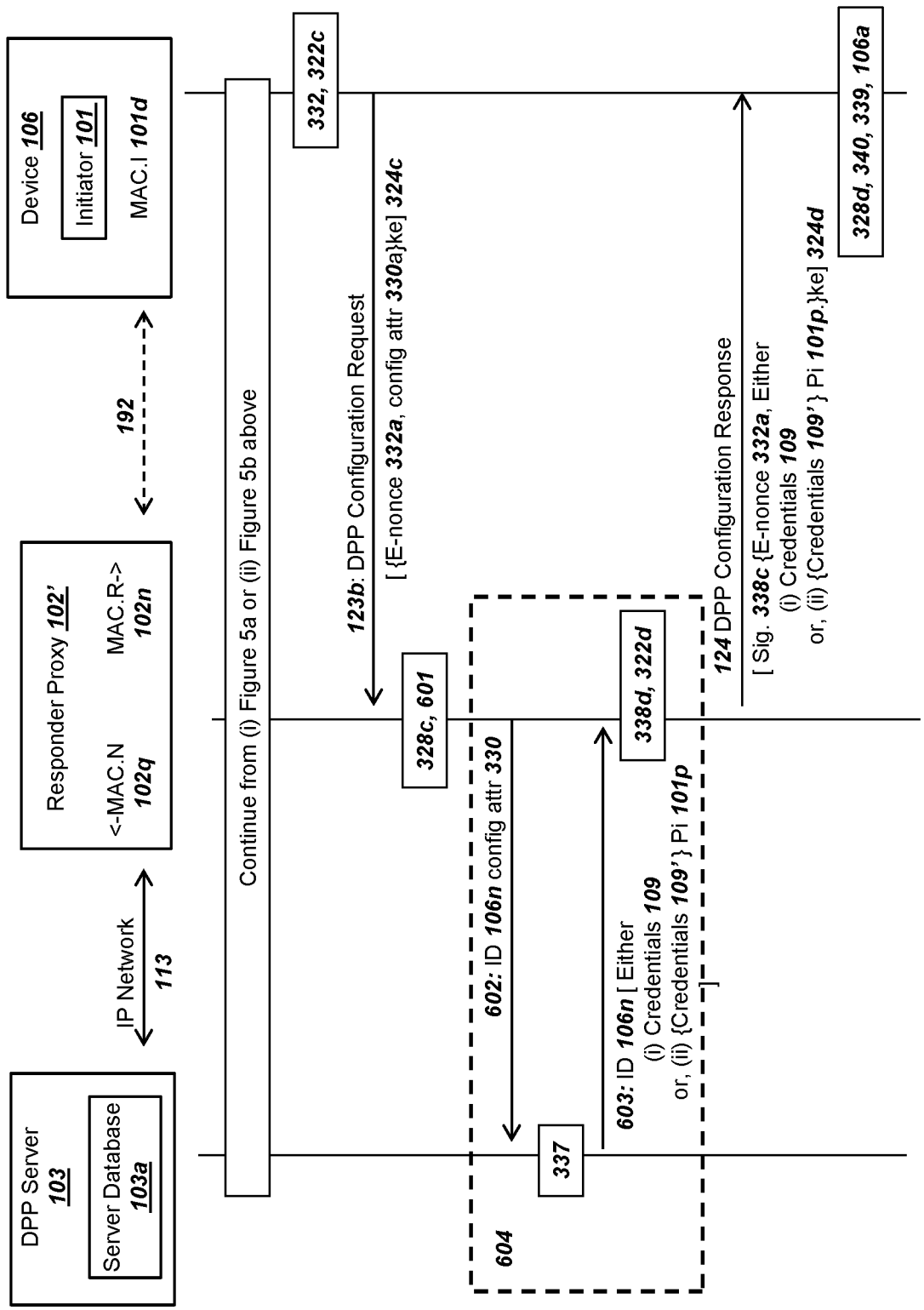
FIG. 6 is a simplified message flow diagram illustrating an exemplary system with exemplary data sent and received by a DPP server, a responder proxy, and an initiator, in accordance with exemplary embodiments.

A fourth responder mode 306a in FIG. 3c can comprise responder 102' operating as a responder 102* depicted in FIG. 1b and FIG. 1c, and in this case responder 102* can record the keys shown for the third mode 306a in FIG. 3b (depicted as "102*"). A DPP server 103 can still provide the bootstrap keys 399 shown to responder 102* in this third mode of operation, or the responder 102* could obtain the bootstrap keys 399 from other means, such as "out of band" messages 121 and 126 in FIG. 1c. In addition, a responder 102* could obtain the bootstrap keys "in band" (e.g. via WiFi link 192) using PKEX key 198. In exemplary embodiments, a fourth responder mode 306a where responder 102' operates as a responder 102* as depicted in FIG. 1b and FIG. 1c (e.g. responder 102' would record responder bootstrap private key br 102b), responder 102 can conduct a step 604 as depicted in FIG. 6 in order to obtain credentials 109 from a DPP server 103. In other words, although the conventional technology depicted for a responder 102* in FIG. 1b and FIG. 1c contemplates sending credentials 109 from responder 102* to initiator 101, the conventional technology does not suggest responder 102* obtains the credentials from a DPP server 103. A step 604 as depicted and described below in connection with FIG. 6 could be used by a responder 102' with the fourth responder mode 306a in order for responder 102' (operating as a responder 102*) in order to obtain credentials 109 or credentials 109' from a DPP server 103.

Bootstrap keys 399 in a server database 103 can record the bootstrap keys depicted in FIG. 3c. For embodiments where a device 106 can support multiple different sets of cryptographic parameters 199a, a server database 103a can record the selected set of cryptographic parameters 199a for communication between a responder 102' and device 106 with initiator 101. The keys for "bootstrap keys 399" can be according to the selected set of parameters 199a. In other words, a device database 104 in FIG. 2a above can record all versions of the bootstrap PKI keys for all supported cryptographic parameters 199a for a device 106. However, since a set of cryptographic parameters 199a can be selected for a DPP 191 (e.g. based on data received from initiator 101 in message 122 such as key Pi 101c or hash value 102aa), then the bootstrap keys 399 for that selected set of cryptographic parameters 199a can be recorded in a server database 103a.

A server database 103a can also record a pre-shared PKEX key 198, if PKEX is optionally supported by initiator 101. PKEX key 198 can be used by responder 102' to securely transfer bootstrap public keys in band (i.e. via connection 192 in FIG. 1a and FIG. 3a). The use of a PKEX protocol to exchange the public keys is described in section 5.6 of DPP specification version 1.0. For embodiments where responder 102' uses PKEX key 198 with initiator 101, the responder bootstrap private key br 102b preferably continues to reside within a network 107 and can be in a server database 103a. Embodiments can omit the use of PKEX key 198, as depicted with the value of "NA" for the key in FIG. 3c. Derived, shared secret keys with initiator 101 can also be recorded in a server database 103a. The derived shared secret keys could comprise key k1 314a, key k2 314c, and key ke 327e. The steps to derive and use these keys are depicted and described below in FIG. 4a, FIG. 4b, and FIG. 4c, respectively. As discussed above, some keys may reside in server database 103a, and other keys may reside within a responder 102' (depicted with a "–"), depending on the responder mode 306a.

The present disclosure contemplates other implementations of a device provisioning protocol besides the DPP specification version 1.0. These other implementations could have different mutually derived shared secret keys than those depicted in FIG. 3c, and the different mutually derived shared secret keys could be recorded in a server database 103a as well. For example, different key derivation functions 402 could be used to derive a secret shared key than that specified in DPP specification version 1.0. In addition, other or different PKI keys for a responder 102' and/or initiator 101 could be recorded in a server database 103a. For example, the DPP specification version 1.0 could be extended to explicitly include a DPP server 103 public and private key, in order to extend support with a DPP server 103, and in these embodiments the DPP server 103 public and private keys could be included in a server database 103. Other possibilities exist as well for a server database 103a to record PKI keys and shared secret keys without departing from the scope of the present disclosure.

A server database 103a could also record a device credentials table 345. Device credentials table 345 can record a device identity ID.device 106i, MAC.I 106n, a set of primary network credentials 350a, and a set of backup network credentials 350b. The set of primary network credentials 350a can comprise the set of credentials (plus configuration) for a device 106 to use with a selected primary network, such as an exemplary network access point 105 in FIG. 1a. The set of backup network credentials 350b can comprise the set of credentials (plus configuration) for a device 106 to use with a selected backup network. The credentials in a device credentials table 345 could be obtained from during a step 333 or a step 337 as depicted and described above in connection with FIG. 3b. Note that a DPP server 103 could conduct a step 337 in order to select the network credentials 109, including receiving the credentials 109 from an external network 108. DPP server 103 could receive and record the asymmetrically encrypted network credentials 109' in a device credentials table 345.

For example, with the first device depicted in a device credentials table 345, the credentials in device table for the first device depicted could comprise a set of plaintext credentials 109 depicted in FIG. 1a. The depicted designation of "109-1" can identify the specific set of plaintext credentials 109 for a primary network 350a device 106 with ID.device 106i. The device in the second row can use the same plaintext network credentials 109. The credentials stored for the primary network for the third device can comprise depicted credentials "109'-1", which can mean asymmetrically encrypted network credentials 109' are recorded. The asymmetrically encrypted network credentials 109' could be received from an external network 108 (or possibly just securely recorded by a network 107), and only the third device could feasibly decrypt the credentials 109' using a step 339 and a recorded private key for the device 106.

In exemplary embodiments, the asymmetrically encrypted credentials 109' are encrypted using Elgamal encryption and either (i) the initiator bootstrap public key Bi 101a or (ii) the initiator ephemeral public key Pi 101c. The DPP server 103 could send either (i) the initiator bootstrap public key Bi 101a or (ii) the initiator ephemeral public key Pi 101c (along with an identity for device 106 such as ID.device 106i or MAC.I 106n) to a server that conducts an asymmetric encryption step 334 on plaintext credentials 109. The DPP server 103 could receive the encrypted credentials 109' and record them for device 106 with ID.device 106i in a device credentials table 345. Additional details for receiving credentials from an external network 108, and recording the encrypted credentials 109' in a server database 103 are depicted and described below in connection with FIG. 3b, depicted as credentials 109'.

Note the present disclosure contemplates that (a) credentials 109 or 109' could utilize wireless networking technology other than WiFi or 802.11 based technology. For example, surrounding wireless networks for device 101 could use exemplary potential 5G wireless technology or LPWAN networking technology potential wireless networks for device 106. Thus, credentials 109 or 109' in a server database 103a and used by device 106 can support networking technology other than WiFi. As one example, an initiator 101 could be operated by an Ethernet interface on a computer or server, and an Ethernet switch could operate a responder 102'. The flow of messages for a DPP 191 protocol could be conducted via a physical wired Ethernet link instead of a WiFi link 192. In this manner, the device operating an initiator 101 could be authenticated and configured by an Ethernet switch operating the responder 102'. As one example, the values and configuration in a dynamic host configuration protocol (DHCP) could be sent as credentials 109 or credentials 109' in a message 124 from an Ethernet switch operating a responder 102'.

In another exemplary embodiment, a wireless WAN network, such as a 5G or 6G wireless network according to future 3GPP or ETSI standards, could implement support for the device provisioning protocol contemplated herein. A base station or base transceiver station for the wireless network could operate as a responder 102' and a user device desiring to connect with the network could operate as an initiator 101. The user device and base station could conduct a DPP 191 and the base station could send credentials 109 or credentials 109' for the 5G or 6G wireless network to the user device in a DPP message 124 after successful authentication using DPP. The credentials 109 or 109' for either a wired Ethernet network or a wireless WAN network could be recorded for a device 106 or a plurality of devices 106 in a server database 103a. The use of a primary and backup network for device 101 can provide increased reliability for the operation of device 106, such that if the primary access network for credentials 350a is not available then device 101 could use the selected backup network with credentials 350b in order for device 106 to maintain connectivity to an IP network 113.

FIG. 3d

Figure 3E:
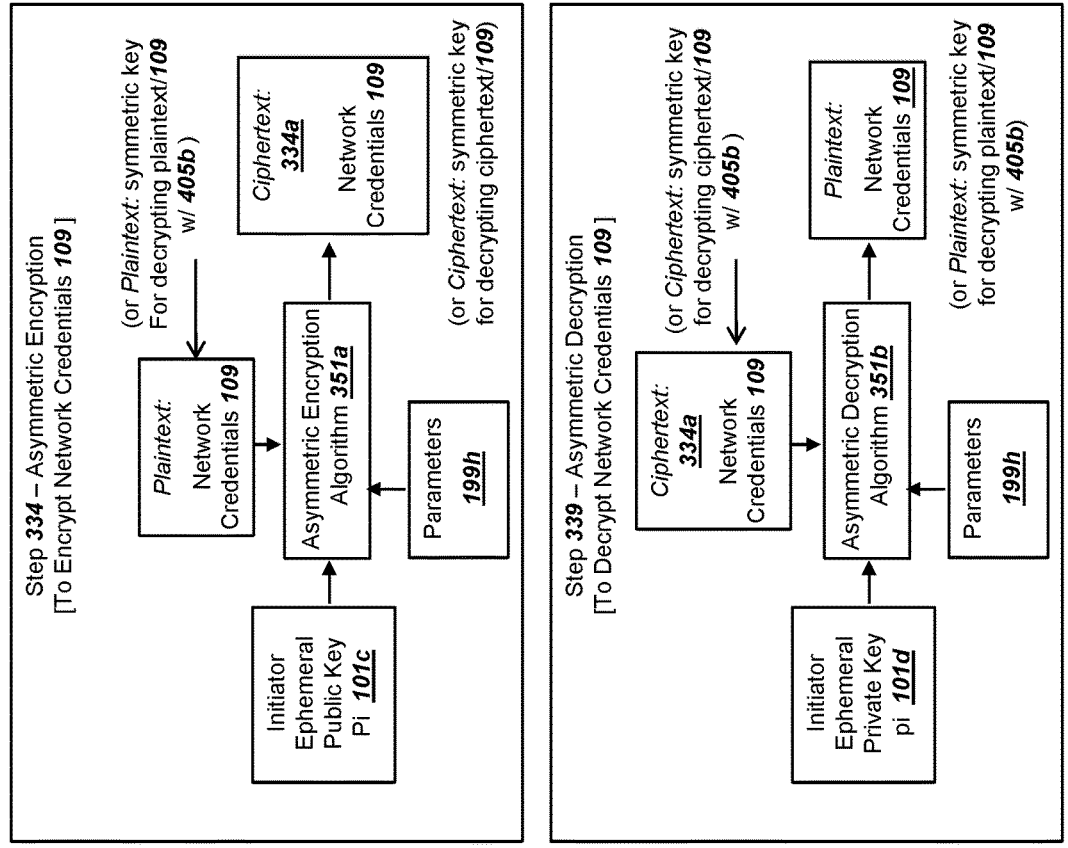
FIG. 3e is a flow chart illustrating exemplary steps for using asymmetric ciphering in order to encrypt credentials using a public key and decrypting credentials using the corresponding private key, in accordance with exemplary embodiments.
Figure 3D:
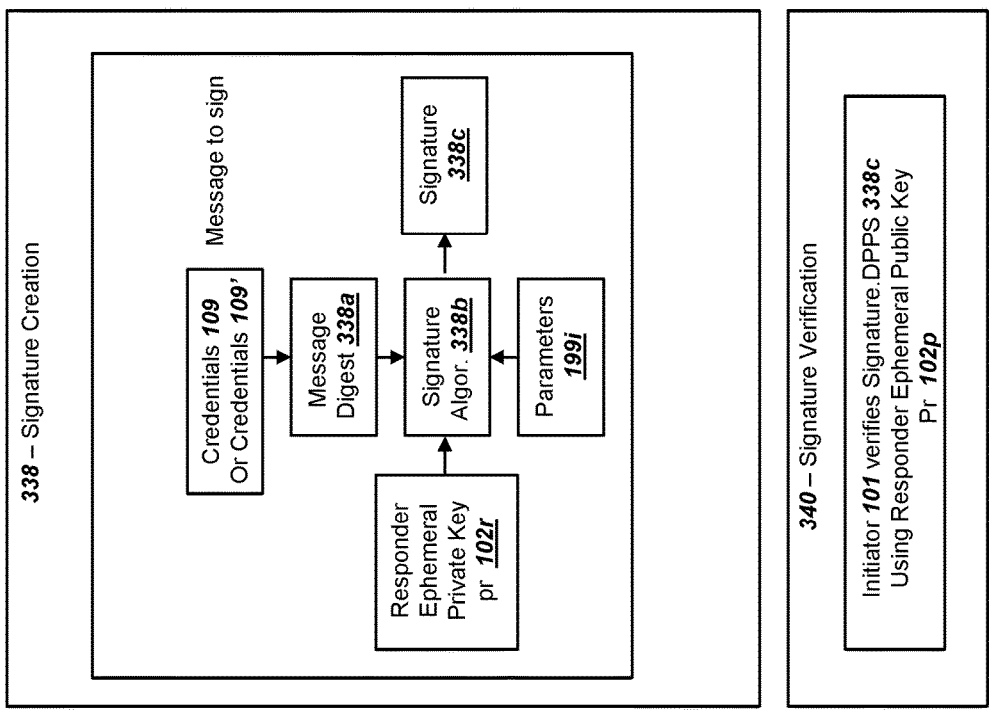
FIG. 3d is a flow chart illustrating exemplary steps for creating and verifying a digital signature using PKI keys, parameters, and data input, in accordance with exemplary embodiments.

FIG. 3d is a flow chart illustrating exemplary steps for creating and verifying a digital signature using PKI keys, parameters, and data input, in accordance with exemplary embodiments. Nodes in a system 100 and other systems herein can create and verify digital signatures using the steps depicted for a signature creation step 338 and a signature verification step 340. In exemplary embodiments, a DPP server 103 or a responder proxy 102 could conduct a signature creation step 338 and an initiator 101 operating in a device 106 can conduct a signature verification step 340. In FIG. 3d, signature creation 338 can use the sub-steps of obtaining a message to sign, calculating a message digest 338a, using a private key such as responder ephemeral private key pr 102r, using a signature algorithm 338b, inputting parameters 199i, and calculating a resulting signature 338c. The steps and sub-steps depicted for DPP server creating signature 338 in FIG. 3d can also be used by other nodes, including signature creation 338d for a responder 102' to create a signature 338c, where responder 102' creates a signature 338c for network credentials 109 received from a DPP server 103 in FIG. 6 below.

Signature algorithm 338a and a corresponding signature verification algorithm for a signature verification step 340 below could comprise an RSA-based digital signature algorithm (DSA) or an ECC based elliptic curve digital signature algorithm (ECDSA), and other possibilities exist as well for signature algorithm 338a and the corresponding signature verification algorithm without departing from the scope of the present disclosure. When using a DSA or ECDSA algorithm in non-deterministic mode for a signature creation 338, a value of "k" or "r", which could comprise a random number can be associated with the digital signature 338c. When using a DSA or ECDSA in deterministic mode for preferred exemplary embodiments, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a separately transmitted random number with digital signature 338c (such as value "k" or "r") can be optionally omitted, such that "r" can be deterministically calculated based on the message to sign. In exemplary embodiments, device 106 and servers such as DPP sever 103 can utilize deterministic ECDSA without also sending a random number along with a digital signature, although the value "r" from the deterministic mode could be sent with the digital signature 338c. In other words, a value can be sent with the digital signature 338c that is deterministically derived and associated with the message to sign. In other exemplary embodiments, a random number can be generated a derived value for the random number such as "r" sent with digital signature 338c (e.g. not in deterministic mode).

For a signature creation 338 step, the exemplary message to sign comprises either plaintext network credentials 109 or asymmetrically encrypted network credentials 109'. The message to sign values can be transmitted to the initiator 101 in an encrypted format, such as shown for message 124 in FIG. 3b. The message to sign values can be input into a message digest algorithm 338a, which could comprise a standard algorithm such as SHA-256, SHA-3, or similar algorithms. In exemplary embodiments, the message digest algorithm 338a can be specified by a hash value 199e in a selected set of parameters 199a from parameters 199. The output of message digest algorithm 338a can be input along with parameters 199i and a private key such as pr 102d into signature algorithm 338b. Parameters 199i can specify encoding rules, padding, key lengths, selected algorithms, curve names, and other values or fields necessary to utilize a signature algorithm 338b. Both a signature creation step 338 and a signature verification step 340 use the same or equivalent values for parameters 199i. A private key used in a signature creation step 338 can comprise a private key held and recorded by a network 107 where initiator 101 can record the corresponding public key.

FIG. 3d depicts the private key as responder ephemeral private key pr 102r, although alternatively the private key could be responder bootstrap private key br 102b or a different compatible private key recorded by network 107. The selection of (i) key pr 102r or key br 102b for a signature creation step 338 and (ii) key Pr 102p or key Br 102a for a signature verification step 340 can be specified in a set of cryptographic parameters 199a, or simply included in software for DPP server 103 and initiator 101. For embodiments where signature 338 uses a private key of responder bootstrap private key br 102b, then initiator 101 could record and use responder bootstrap public key Br 102a. For embodiments where signature 338 uses a private key for network 107, then initiator 101 could record a certificate for the network 107 and use the public key from the certificate for a signature verification step 340.

Signature verification 340 can comprise a step using the sub-steps of (i) obtaining a message to verify, (ii) calculating a message digest 338a for the message to verify, (iii) using a public key corresponding to the private key, such as responder ephemeral public key Pr 102p for responder ephemeral private key pr 102r, (iv) using a signature verification algorithm corresponding to signature creation algorithm 338*b*, (v) inputting parameters 199*i* and received signature 338*c* into the signature verification algorithm, and (vi) determining a pass/fail. If the signature 338*c* received matches a calculated signature using the public key and message to verify, then the received signature 338*c* passes or is validated or verified. If the signature 338*c* does not match the calculated signature in a step 340, then the signature 338*c* is considered to fail or not be verified. In exemplary embodiments, a device 106 operating an initiator 101 can conduct a signature verification step 340 for a set of credentials 109 (or encrypted credentials 109') before accepting and applying the credentials in a configuration step 106*a*.

FIG. 3*e*

FIG. 3*e* is a flow chart illustrating exemplary steps for using asymmetric ciphering in order to encrypt credentials using a public key and decrypting credentials using the corresponding private key, in accordance with exemplary embodiments. An encryption 334 step could be performed by (i) a responder 102' as depicted and described in connection with FIG. 3*b* above in order to create a ciphertext 334*a*, (ii) an external network 108 (different than network 107 operating DPP server 103), where the external network 108 could be the source of a plaintext set of credentials 109 for device 106. The purpose of an encryption 334 step can be to convert a plaintext set of network credentials 109 into the ciphertext 334*a*, which can comprise and be depicted as an asymmetrically encrypted set of network credentials 109' in FIG. 3*b*, FIG. 3*c*, FIG. 6, etc. An exemplary reason that an asymmetrically encrypted set of network credentials 109' may be preferred for receipt by and operation inside DPP server 103 is that DPP server 103 is that a network access point 105 or an external network 108 may prefer that DPP server 103 or responder 102' not be able to read asymmetrically encrypted set of network credentials 109', while device 106 could decrypt and read the plaintext set of network credentials 109'.

An encryption step 334 can use an asymmetric encryption algorithm 351*a*, where asymmetric encryption algorithm 351*a* can be based on either RSA or ECC algorithms. The use of an asymmetric encryption algorithm 351*a* and an asymmetric decryption algorithm 351*b* with RSA based keys is described in Internet Engineering Task Force Request for Comments (RFC) 8017, which is titled "PKCS #1: RSA Cryptography Specifications Version 2.2", which is hereby incorporated by reference. The use of asymmetric encryption algorithm 351*a* and an asymmetric decryption algorithm 351*b* with elliptic curve cryptography can be accomplished with ElGamal asymmetric encryption, as summarized in the Wikipedia article for ElGamal encryption from Apr. 3, 2018, which is herein incorporated by reference. Other possibilities exist as well for the use of ECC algorithms for asymmetric encryption, including IEEE 1363a standards and ISO/IEC standard 18033-2. Other possibilities exist as well without departing from the scope of the present disclosure.

For an encryption step 334, the initiator ephemeral public key Pi 101*c* can be input into an asymmetric encryption algorithm 351*a*. As depicted, the plaintext values can be input as well, along with a set of parameters 199*h*. Parameters 199*h* can be a subset of parameters 199 depicted and described in connection with FIG. 2*a* above, and can include a set of asymmetric encryption parameters 199*h*. Note that where initiator 101 or responder 102' is depicted as recording or using a set of parameters 199*a*, the set of parameters 199*a* can specify a selected row in a set of parameters 199, such that a single value for parameters 199*a* can identify all values for 199*a* through 199*h* in a set of cryptographic parameters 199. Parameters 199*h* can specify key lengths, encoding rules, byte orders, use of point compression, and other values necessary to operate an asymmetric ciphering algorithms 351*a* and 351*b*. The output of an asymmetric encryption algorithm 351*a* can be ciphertext 334*a*.

In a different, but related, exemplary embodiment, the public key used in an encryption step 334 can comprise a public key from certificate cert.device 106*m* as depicted for device 106 in FIG. 1*a*. The public key from certificate cert.device 106*m* may be more accessible to an external network 107 or a node than key Pi 101*c*. The parameters 199*h* used for a step 334 in this different embodiment could be recorded in the certificate cert.device 106*m*. Cert.device 106*m* could be publicly shared by a device manufacturer or device distributor along with a device identity in the certificate such as ID.device 106*i* or MAC.I 106*n*. For this different, but related embodiment of encryption step 334, the secret key for device 106 or initiator 101 to utilize in a decryption step 339 below can comprise the secret key SK.device 106*s*.

As depicted in FIG. 3*e*, and encryption 334 step could also comprise an embodiment of encrypting a plaintext symmetric key using asymmetric encryption, such that the symmetric key could be used with a symmetric ciphering algorithms 405*a* and 405*b* such as AES, AES-SIV, or Triple Data Encryption Standard (3DES) or Blowfish, or related algorithms. In this embodiment, (i) the symmetric key for encryption network credentials 109 could comprise a random number derived by responder 102' (or a node for the owner of credentials 109), and (ii) ciphertext 334*a* could comprise two parts, where the first part is the encrypted symmetric key and the second part is a symmetric encryption of network credentials 109. In other words, for this embodiment where (a) a symmetric key for encrypting/decrypting credentials 109 is asymmetrically encrypted with algorithm 351*a*, then (b) network credentials 109 would be symmetrically encrypted/decrypted using the asymmetrically encrypted/decrypted symmetric key.

For a decryption step 339, the initiator ephemeral private key pi 101*d* for initiator 101 in device 106 can be input into an asymmetric decryption algorithm 351*b*. The initiator ephemeral private key pi 101*d* can be the secret key corresponding to the public key Pi 101*c* used with the asymmetric encryption algorithms 351*a*. Asymmetric decryption algorithm 351*b* can correspond to asymmetric encryption algorithm 351*a*, such that if an ECC curve with a given set of parameters 199*h* is used with asymmetric encryption algorithm 351*a*, then the same ECC curve with the same or equivalent set of parameters 199*h* can be used with asymmetric decryption algorithm 351*b*. The output of an asymmetric decryption algorithm 351*b* can be the plaintext, as depicted in FIG. 3*e*.

In addition, although credentials 109 are depicted as decrypted in a decryption step 339, an asymmetric decryption algorithm 351*b* could be used to read a plaintext symmetric key for a symmetric ciphering algorithm, where the plaintext credentials 109 could be read by inputting the plaintext symmetric key and encrypted credentials 109 into a symmetric ciphering algorithm 405*b*. Standards such as IEEE 1363a standards and ISO/IEC standard 18033-2 describe using asymmetric algorithms and public keys to encrypt symmetric keys, and asymmetric decryption algorithms and private keys to decrypt the asymmetrically encrypted symmetric keys, where (i) the plaintext and ciphertext can be converted using the symmetric key, and then (ii) a second plaintext comprising credentials 109 could be read using the symmetric key and a symmetric ciphering algorithm. In other words, as described in two paragraphs above, the ciphertext 334a could comprise two parts, where (i) the first part comprises a symmetric key asymmetrically decrypted by 351b, and then (ii) the second part comprises the symmetrically encrypted credentials 109, where the symmetrically encrypted credentials 109 are decrypted with the asymmetrically decrypted (e.g. plaintext) symmetric key.

Note that encryption step 334 and decryption step 339 can be used with other plaintext values and ciphertext values as contemplated herein, such as (i) a device 106 asymmetrically encrypting in a step 334 a configuration attribute 330a for an external network 108 using a public key for the external network, and then (ii) the external network 107 asymmetrically decrypting in a step 339 the configuration attribute 330a using a private key. Other possibilities exist as well without departing from the scope of the present disclosure.

FIG. 4a

FIG. 4a is a flow chart illustrating exemplary steps for conducting a key exchange using PKI keys in order to derive a shared secret key, and for using the derived shared secret key to encrypt and decrypt data, in accordance with exemplary embodiments. Exemplary steps for a responder 102' and an initiator 101 to mutually derive keys can comprise (i) a key exchange 319 step for DPP server 103 or responder 102' (depending on the responder mode 306a) to derive a symmetric encryption key k1 314a and (ii) a key exchange 314 step for a initiator 101 to derive the same symmetric encryption key k1 314a. Exemplary steps for a initiator 101 to encrypt data and responder 102' or DPP server 103 (depending on a mode 306a) to decrypt data can comprise (a) an encryption step 315 for initiator 101 to utilize the symmetric encryption key k1 314a to convert plaintext to ciphertext, and (b) a decryption 320 step for responder 102' or DPP server 103 (depending on mode 306a) to utilize the symmetric encryption key k1 314a to convert the ciphertext received from initiator 101 into plaintext.

The use of the steps for a key exchange 314, a key exchange 319, encryption 315, and decryption 320 were also depicted and described in connection with FIG. 3a and FIG. 3b above. Additional detail regarding the use of these steps will be provided herein. Further, although the steps are depicted specifically for the use of particular keys and plaintext/ciphertext combinations in FIG. 4a, the steps illustrated can be used with different keys and plaintext/ciphertext combinations. For example, FIG. 4b below depicts the same functionality used by the nodes as in FIG. 4a, but with (i) different PKI keys input to mutually derive a different symmetric encryption key, (ii) a different key derivation function and (iii) different plaintext encrypted and different ciphertext decrypted.

A key exchange 314 step for initiator 101 to derive a symmetric encryption key 314a can utilize a selected set of cryptographic parameters 199a as depicted and described in connection with FIG. 1d and FIG. 1e above. As depicted in FIG. 4a, a key exchange algorithm 401a can receive input both of a responder bootstrap public key Br 102a and an initiator ephemeral private key pi 101d. The key exchange algorithm 401a could comprise a Diffie Hellman key exchange (DH), an Elliptic Curve Diffie Hellman key exchange (ECDH), and other possibilities exist as well without departing from the scope of the present disclosure. A key exchange algorithm 401a can support either PKI keys based on elliptic curves or RSA algorithms, although support of elliptic curves may be preferred in some exemplary embodiments due to their shorter key lengths and lower processing requirements.

A summary of ECDH as a key exchange algorithm 401a is included in the Wikipedia article titled "Elliptic Curve Diffie-Hellman" from Mar. 9, 2018, which is herein incorporated by reference. An exemplary embodiment of key exchange algorithm 401a could comprise a "One-Pass Diffie-Hellman, C(1, 1, ECC CDH)" algorithm as described in section 6.2.2.2 on page 81 of the National Institute of Standards and Technology (NIST) document "NIST SP 800-56A, Recommendation for Pair-Wise Key Establishment Schemes Using Discrete Logarithm Cryptography" from March, 2007 which is hereby incorporated by reference its entirety. Other key exchange algorithms in NIST SP 800-56A could be utilized as well for a key exchange algorithm 401a in FIG. 4a, FIG. 4b, and FIG. 4c without departing from the scope of the present disclosure. Example calculations for an ECDH key exchange for a key exchange algorithm 401a are shown on pages 88 and 89 of DPP specification version 1.0, where a selected set of parameters 199a can use the ECC curve P-256 with PKI key lengths of 256 bits.

Other algorithms to derive a shared symmetric encryption key using public keys and private keys may also be utilized in a key exchange algorithm 401a (and 401b in FIGS. 4b and 401c in FIG. 4c), such as, but not limited to, the American National Standards Institute (ANSI) standard X-9.63. Cryptographic parameters 199a can also include information for using a key exchange algorithm 401a and a key derivation function 402a in order to derive a commonly shared symmetric encryption key k1 314a. As contemplated herein, the terms "selected set of cryptographic parameters 199a" and "cryptographic parameters 199a", and "parameters 199a" can be equivalent. Parameters 199a input into a key exchange algorithm 401a can include a time-to-live for a key k1 314a that is derived, a supported point formats extension, where the supported point formats extension could comprise uncompressed, compressed prime, or "compressed char2" formats, as specified in ANSI X-9.62. In other words, an ECC keys input into a key exchange algorithm 401a may have several different formats and a set of parameters 199a can be useful to specify the format.

As depicted in FIG. 4a, the output of a key exchange algorithm 401a, such as an ECDH key exchange, can comprise a secret shared key M 410. The secret shared key M 410 can be input into both (i) a first key derivation function 402a in order to calculate the key k1 314a and (ii) a second key derivation function 402c in order to calculate a symmetric encryption key ke 327a as depicted in FIG. 4c below. Key derivation function 402a could use a hash algorithm 199e from parameters 199a, where an input into the hash algorithm 199e can include the value M 410, in addition to other data such as public keys. As contemplated herein, a secret shared key can also be referred to as a value, since the secret shared key can be a numeric value or a number in the form of a sequence of digits. In DPP specification version 1.0 a key derivation function to determine key k1 314a is depicted on the fourth line of page 48.

Note that in some exemplary embodiments, such a second responder mode 306a depicted and described in connection with FIG. 5a below, (i) a key exchange algorithm 401a can be processed by a DPP server 103 and a key derivation function 402a can be processed by an responder 102'. In other words, for some embodiments the key exchange 314b step can be shared or distributed between a DPP server 103 and an responder 102'. Other possibilities exist as well for a key derivation function 402a without departing from the scope of the present disclosure. For example, with other embodiments besides those within DPP specification version 1.0, the output of a key derivation function 402a can be both a symmetric encryption key k1 314a and a message authentication code (MAC) key, where a MAC key can function to verify message integrity of ciphertexts generated with the symmetric encryption key 314a.

As depicted in FIG. 4a, an encryption 315 step could be utilized with the derived symmetric encryption key k1 314a in order to convert plaintext 403a into ciphertext 315a. An encryption 315 step can utilize a symmetric encryption algorithm 405a, where symmetric encryption algorithm 405a could comprise an algorithm according to the Advanced Encryption Standard (AES), Blowfish, and Triple Data Encryption Standard (3DES), and other possibilities exist as well. As depicted in FIG. 4a, a symmetric encryption algorithm 405a can comprise the AES-SIV algorithm as specified in IETF RFC 5297. Parameters 199f could specify settings for a symmetric ciphering algorithm 405a as well, such as key length and a block cipher modes of ECB, CBC, OFB, and CFB. Parameters 199f may also specify an authenticated encryption mode such as CCM (NIST SP800-38C), GCM (NIST SP800-38D), and other examples exist as well.

Symmetric encryption algorithm 405a can accept input of (i) plaintext 403a, (ii) symmetric encryption key k1 314a, (iii) parameters 199f, and (iv) optionally an initialization vector (not shown in FIG. 4a and not required for AES-SIV), and output ciphertext 315a. Although not depicted in FIG. 4a, and encryption 405a step can output a message authentication code (MAC), where the MAC can be calculated with the MAC key from a key derivation function 402a. In exemplary embodiments the use of a MAC and MAC key, as well as an initialization vector can be optionally omitted, such as with algorithm 405a. The exemplary listed values for plaintext and ciphertext in step 315 in FIG. 4a were described in connection with depicted step 315 in FIG. 3a.

Key exchange 319 step for a responder 102' or DPP server 103 (depending on a mode 306a) depicted in FIG. 4a can correspond to key exchange 319 in FIG. 3a. Key exchange 319 step can comprise inputting or using the initiator ephemeral Public key Pi 101c (from message 122) and the responder bootstrap private key br 101b into key exchange algorithm 401a, which can comprise the same or equivalent key exchange algorithm 401a depicted and described in connection with key exchange step 314 described above. Other elements or algorithms within a key exchange step 319 can be equivalent to a key exchange step 314 above, including the use of shared parameters 199a. In this manner, responder 102' or DPP server 103 (depending on a mode 306a) and initiator 101 can securely derive the same symmetric encryption key k1 314a as depicted in FIG. 4a.

For embodiments with a first mode 306a depicted in FIG. 3a, DPP server 103 can conduct key exchange step 319 and for embodiments with a second mode 306a depicted in FIG. 5a, a responder 102' can conduct key derivation function 402a and DPP server 103 can conduct key exchange algorithm 401a. For embodiments where DPP server conducts a key exchange step, such as step 401a in FIG. 4a, or other key exchange steps such as 401a in FIG. 4b below, etc., the appropriate keys for input into the key exchange algorithm can be selected from a database (e.g. 103a for DPP server) or table (e.g. table 102u) using an identity for device 106 received in message 122. In exemplary embodiments, the identity of device 106 can comprise either MAC.I 106n or the hash value 101aa over the initiator bootstrap public key Bi 101a.

A decryption 320 step allows responder 102' or DPP server 103 (depending on mode 306a) to convert the ciphertext 315a received in a message 122 from FIG. 3a into plaintext 403a. Decryption 320 step can utilize a symmetric decryption algorithm 405b, which could comprise the same algorithm used in symmetric encryption algorithm 405a except the algorithm being used for decryption instead of encryption. For example, if symmetric encryption algorithm 405a in FIG. 4a comprises an AES-SIV encryption, then symmetric decryption algorithm 405b can comprise an AES-SIV decryption. Note that the same values are input into symmetric decryption algorithm 405b as symmetric encryption algorithm 405a, such as symmetric encryption key k1 314a and parameters 199f in order to convert ciphertext 315a back into plaintext 403a. Responder 102' or DPP server 103 (depending on the mode 306a) can the read and process plaintext 403a after a decryption 320 step. For example, with the first mode 306a depicted in FIG. 3a and FIG. 3b, DPP server 103 can perform decryption step 320 to read plaintext 403a. With the second mode 306a depicted in FIG. 5, responder 102' can perform decryption step 320 to read plaintext 403a.

For embodiments where a MAC code is received with ciphertext 315a, initiator 101 can also verify the MAC code using a MAC key from a key derivation function 402a in order to verify the integrity of ciphertext 315a. Note that AES-SIV can have a message integrity check built into the algorithm, and thus a separate MAC code and MAC key can be optionally omitted in some exemplary embodiments. In exemplary embodiments, the successful decryption of a ciphertext into a plaintext using decryption algorithms 405b supports mutual authentication between the two nodes, since successful decryption can only take place when the two nodes record the depicted private keys used for the depicted key exchange.

FIG. 4b

FIG. 4b is a flow chart illustrating exemplary steps for conducting a key exchange using PKI keys in order to derive a shared secret key, and for using the derived shared secret key to encrypt and decrypt data, in accordance with exemplary embodiments. Exemplary steps for (i) an responder 102' or a DPP server 103 (depending on the mode 306a) and (ii) a an initiator 101 to mutually derive keys can comprise (a) a key exchange 314b step for DPP server 103 or responder 102' (depending on the mode 306a) to derive a symmetric encryption key k2 314c and (b) a key exchange 319a step for a initiator 101 to derive the same symmetric encryption key k2 314c. Exemplary steps for a initiator 101 to decrypt data and responder 102' (or DPP server 103) to encrypt data can comprise (i) an encryption 315b step for responder 102' or DPP server 103 to utilize the symmetric encryption key k2 314c to convert plaintext to ciphertext, and (ii) a decryption 320b step for initiator 101 to utilize the symmetric encryption key k2 314c to convert the ciphertext received from responder 102' into plaintext. The use of the steps for a key exchange 314a, a key exchange 319a, encryption 315b, and decryption 320b were also depicted and described in connection with FIG. 3a above.

Note that steps in FIG. 4b and the steps in FIG. 4a can share some algorithms and values, and the descriptions for the algorithms and values in FIG. 4a can be applicable for FIG. 4b. For example, a same key exchange algorithm 401a depicted and described in FIG. 4a can also be used in FIG. 4b. The key exchange algorithm 401a can comprise an ECDH key exchange. The set of parameters 199a depicted and described in FIG. 4a can also be used in FIG. 4b. Further, a symmetric encryption algorithm 405a and a symmetric decryption algorithm 405b can be the same in FIG. 4a and FIG. 4b. A set of parameters 199f for a symmetric encryption algorithm 405a and a symmetric decryption algorithm 405b can be the same in FIG. 4a and FIG. 4b.

A responder 102' or DPP server 103 (depending on a mode 306a) can conduct a key exchange step 314b. In a key exchange step 314b, the initiator ephemeral public key Pi 101c received in message 122 from FIG. 3a can be input into an ECDH key exchange algorithm 401a along with the responder ephemeral private key pr 102r derived in a step 318 in FIG. 3a in order to output a secret shared key N 411. The value for shared secret key N 411 can be recorded and also used in the derivation of a key ke 327a in a key exchange step 321 below in FIG. 4c. For a step 314b, the value for the shared secret key N 411 can be input into a key derivation function 402b in order to derive a mutually shared symmetric key k2 314c. In exemplary embodiments which support DPP specification version 1.0, a key derivation function 402b can comprise the key derivation function for key k2 in point 2 of section 6.2.3 of DPP specification version 1.0. For a first responder mode 306a depicted in FIG. 3a, a DPP server 103 can conduct key exchange step 314b and for a second responder mode 306a depicted in FIG. 5a, a responder 102' can conduct key exchange step 314b.

An initiator 101 can conduct a key exchange step 319a. At step 319a, a received, validated responder ephemeral public key Pr 102p and a derived initiator ephemeral private key pi 101d can be input into an ECDH key exchange algorithm 401a in order to calculate a shared secret key N 411. Shared secret key N 411 can also be recorded and used in a step 327 below. Initiator 101 can input shared secret key N 411 into a key derivation function 402b in order to mutually derived the symmetric encryption key k2 314c. In exemplary embodiments which support DPP specification version 1.0, a key derivation function 402b can comprise the key derivation function for key k2 in section 6.2.4 of DPP specification version 1.0.

Responder 102' or DPP server 103 (depending on a mode 306a) can conduct an encryption step 315b. The use for an encryption step 315b for a DPP server 103 in a first responder mode 306a is depicted and described in connection with FIG. 3a above. The use for an encryption step 315b for responder 102' for a second responder mode 306a is depicted and described in connection with FIG. 5a below. Ciphertext 324a can comprise a ciphertext from an encryption step 322 below in FIG. 4c. In other words, a responder 102' or DPP server 103 can conduct the encryption step 322 below and also key exchange step 321 below in FIG. 4c before conducting the encryption step 315b. As depicted in FIG. 4b, the ciphertext 324a can also be encrypted again for an encryption step 315b. The symmetric ciphering key for encryption step 315b can comprise symmetric key k2 314c from a key exchange step 314b in two paragraphs above. The output from an encryption step 315b can be ciphertext 315c, as depicted in FIG. 4b. The plaintext 403b for an encryption step 315b can comprise the depicted values of ciphertext 324a, I-nonce 317a, R-Capabilities 318c, and R-nonce 318b.

A decryption 320b step can be performed by an initiator 101. A decryption 320b step converts the ciphertext 315c received in a message 123 from FIG. 3a into plaintext 403b. Decryption 320b step can utilize a symmetric decryption algorithm 405b, which could comprise the same algorithm used in symmetric encryption algorithm 405a except the algorithm being used for decryption instead of encryption. Note that the same values (other than ciphertext) are input into symmetric decryption algorithm 405b as symmetric encryption algorithm 405a, such as symmetric encryption key k2 314c and parameters 199f in order to convert ciphertext 315c back into plaintext 403b. Initiator 101 can read and process plaintext 403b after a decryption 320b step. In exemplary embodiments, the successful decryption of a ciphertext into a plaintext using decryption algorithms 405b supports mutual authentication between the two nodes, since successful decryption can only take place when the two nodes record the depicted private keys used for the depicted key exchange.

FIG. 4c

FIG. 4c is a flow chart illustrating exemplary steps for conducting a key exchange using PKI keys in order to derive a shared secret key, and for using the derived shared secret key to encrypt and decrypt data, in accordance with exemplary embodiments. Exemplary steps for (i) an responder 102' or a DPP server 103 (depending on the mode 306a) and (ii) an initiator 101 to mutually derive keys can comprise (a) a key exchange 321 step for DPP server 103 or responder 102' (depending on the mode 306a) to derive a symmetric encryption key ke 327a and (b) a key exchange 327 step for a initiator 101 to derive the same symmetric encryption key ke 327a. Note that in some exemplary embodiments, such a second responder mode 306a depicted and described in connection with FIG. 5a below, (i) a key exchange algorithm 401c can be processed by a DPP server 103 a key derivation function 402c can be processed by an responder 102'. In other words, for some embodiments the key exchange 321 step can be shared or distributed between a DPP server 103 and an responder 102'.

Exemplary steps in FIG. 4c for (i) a responder 102' or DPP server 103 to encrypt data and initiator 101 to decrypt data can comprise (i) an encryption 322 step for responder 102' or DPP server 103 to utilize the symmetric encryption key ke 327a to convert plaintext to ciphertext, and (ii) a decryption 328 step for initiator 101' to utilize the symmetric encryption key ke 327a to convert the ciphertext received from responder 102' into plaintext. The use of the steps for a key exchange 321, a key exchange 327, encryption 322, and decryption 328 were also depicted and described in connection with FIG. 3a and FIG. 3b above.

Note that the steps in FIG. 4c and the steps in FIG. 4a can share some algorithms and values, and the descriptions for the algorithms and values in FIG. 4a can be applicable for FIG. 4c. For example, the key exchange algorithm 401c can comprise an ECDH key exchange. The set of parameters 199a depicted and described in FIG. 4a can also be used in FIG. 4c. Further, a symmetric encryption algorithm 405a and a symmetric decryption algorithm 405b can be the same in FIG. 4a and FIG. 4c. A set of parameters 199f for a symmetric encryption algorithm 405a and a symmetric decryption algorithm 405b can be the same in FIG. 4a and FIG. 4c.

For a first responder mode 306a depicted in FIG. 3a and FIG. 3b, a DPP server 103 can conduct a key exchange step 321. For a second responder mode 306a depicted in FIG. 5a, a key exchange step 321 can be shared between DPP server 103 and responder 102', such that DPP server 103 conducts a key exchange algorithm 401c and responder 102' conducts a key derivation function 402c. In a key exchange step 321, (i) the initiator ephemeral public key Pi 102a received in message 122 from FIG. 3a can be input into an ECDH key exchange algorithm 401c along with (ii) the responder ephemeral private key pr 102r and the responder bootstrap private key br 102b.

An ECDH key exchange algorithm 401c can use (pr 102r+br 102b) modulo q, as specified in DPP specification version 1.0 in point 2 of section 6.2.3, so algorithm 401c for initiator 101 can be slightly different than algorithm 401a for initiator 101 above in FIG. 4a and FIG. 4b. The output of key exchange algorithm 401c can be a shared secret key L 412. The value L 412 can be input into a key derivation function 402c in order to calculate a shared secret key ke 327a. Note that for a key derivation function 402c, the input can include all of key M 410 from a step 319, key N from a step 314b, and the derived key L 412. As contemplated herein, a key derivation function 402a, 402b, and 402c can also use other data mutually shared between (i) initiator 101 and (ii) responder 102' or DPP server 103 (depending on a mode 306a). In exemplary embodiments which support DPP specification version 1.0, a key derivation function 402c can comprise the key derivation function for key ke 327a in point 2 of section 6.2.3 of DPP specification version 1.0.

An initiator 101 can conduct a key exchange step 327. At step 327, (i) a combination of a recorded responder bootstrap public key Br 102a and received responder ephemeral public key Pr 102p, and (ii) the recorded initiator bootstrap private key bi 101b can be input into an ECDH key exchange algorithm 401c in order to calculate a shared secret key L 412. The recorded responder bootstrap public key Br 102a and received responder ephemeral public key Pr 102p can be combined via elliptic curve point addition. Shared secret key L 412 can be input into a key derivation function 402c, along with shared secret key M 410 from a step 314 and shared secret key N 411 from a step 319a in order to mutually derive the symmetric encryption key ke 327a. In exemplary embodiments which support DPP specification version 1.0, a key derivation function 402c can comprise the key derivation function for key ke 327e in section 6.2.4 of DPP specification version 1.0.

Responder 102' or DPP server 103 (depending on a mode 306a) can conduct an encryption step 322, where the use for an encryption step 322 are depicted and described in connection with FIG. 3a above and also FIG. 4b above. Plaintext 403c in a step 322 can comprise the responder authentication value 404, where value R-auth 404 can comprise a hash 199e that includes at least the initiator nonce 317a, the second random number R-nonce 318b from a step 318 above in FIG. 3a, and public PKI keys such as responder bootstrap public key 102a and responder ephemeral public key 102c. The value for R-auth 404 in a step 322 can comprise the value in point 3 of section 6.2.3 of DPP specification version 1.0. The symmetric ciphering key for encryption step 322 can comprise symmetric key ke 327a from a key exchange step 321.

The output from an encryption step 322 can be ciphertext 324a, as depicted in FIG. 4c. Note that ciphertext 324a in a step 322 can also be encrypted again in a step 315b above in FIG. 4b. In other words, a responder 102' or DPP server 103 (depending on the mode 306a) can conduct the encryption step 322 herein for FIG. 4c (along with the key exchange 321 herein in FIG. 4b) before conducting the encryption step 315b. For a first mode 306a representing an embodiment depicted in FIG. 3a, DPP server 103 can conduct encryption step 322. For a second mode 306a representing an embodiment depicted in FIG. 5a, a responder 102' can conduct encryption step 322.

A decryption step 328 can be performed by initiator 101. A decryption 328 step converts the ciphertext 324a received in a message 123 from FIG. 3a into plaintext 403c. Decryption 328 step can utilize a symmetric decryption algorithm 405b, which could comprise the same algorithm used in symmetric encryption algorithm 405a except the algorithm being used for decryption instead of encryption. Note that the same values are input into symmetric decryption algorithm 405b as symmetric encryption algorithm 405a in FIG. 4c, such as symmetric encryption key ke 327a and parameters 199f in order to convert ciphertext 324a back into plaintext 403c. Initiator 101 or device 106 can the read and process plaintext 403c after a decryption 328 step. In exemplary embodiments, the successful decryption of a ciphertext into a plaintext using decryption algorithms 405b supports mutual authentication between the two nodes, since successful decryption can only take place when the two nodes record the depicted private keys used for the depicted key exchange. In other words, only the nodes could derive key ke 327a in FIG. 4c, and thus data that is successfully encrypted by one node and decrypted by the other node using key ke 327a would confirm the nodes are authenticated, since only the nodes recording the private keys depicted in FIG. 4c would be able to derive keys ke 327a.

As depicted and described in connection with FIG. 3a, a responder 102' or DPP server 103 can also conduct both an encryption step 322 and a decryption step 328. The steps for DPP server 103 to conduct a decryption step 328 for a first responder mode 306a can comprise step 328b and step 328c as depicted and described in FIG. 3a. When responder 102' or DPP server 103 conducts decryption step 328 using symmetric encryption key ke 327a, the ciphertext and plaintext will comprise different values than those depicted in FIG. 4c. For example, in FIG. 3a a DPP server 103 with a first responder mode 306a can use a decryption step 328b (e.g. step 328 but with different ciphertext than that depicted in FIG. 4c) in order to decrypt the encrypted initiator authentication value 404a into a plaintext authentication value 404a. Also, in FIG. 5a, a responder 102' for a second responder mode 306a can use a decryption step 328b (e.g. step 328 but with different ciphertext 324e than that depicted in FIG. 4c) in order to decrypt the encrypted initiator authentication value 404a. Further, an initiator 101 can use a decryption step 328d to decrypt network credentials 109 from a responder 102'.

Note that in some exemplary embodiments, the "plaintext" network credentials 109' (for the purposes of a step 328d in FIG. 5a) can comprise network credentials 109' that can also be encrypted with an asymmetric ciphering algorithm such as Elgamal using a step 351a in FIG. 3e above. In other words, network credentials 109' can comprise credentials that are "double encrypted" with both (i) a symmetric key 327a (which can be decrypted by initiator 101 using a decryption step 328d, where decryption step 328d uses the depicted decryption 328 in FIG. 4c), and then (ii) an asymmetric ciphering algorithm 351b such as Elgamal from a step 339. In other words, the output of a decryption step 328d could be input into an asymmetric decryption algorithm 351b, so that the input into asymmetric decryption algorithm 351b could be decrypted by initiator 101 using either (i) initiator ephemeral private key pi 101d or (ii) initiator bootstrap private key bi 102b.

FIG. 4d

Figure 4D:
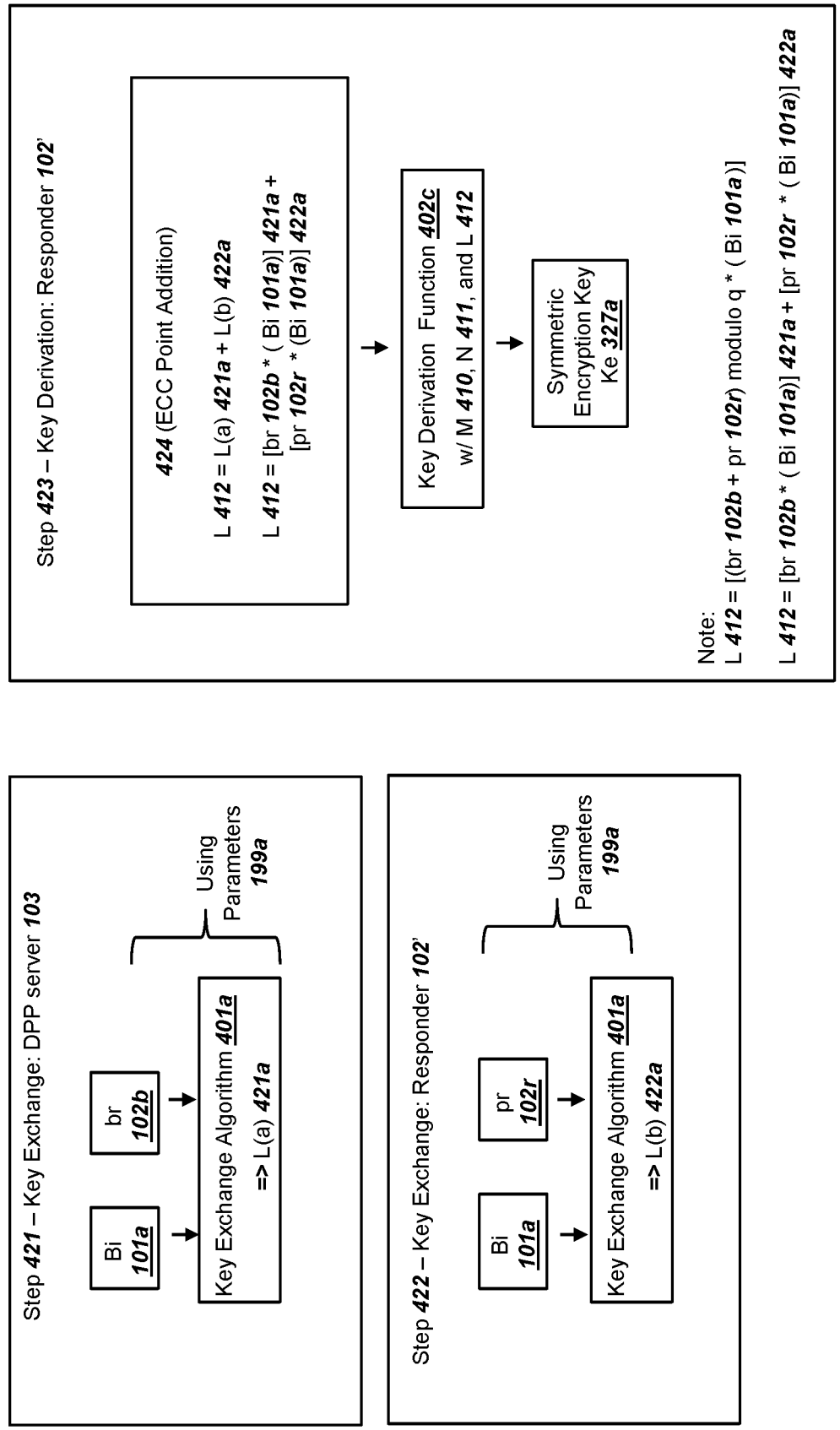
FIG. 4d is a flow chart illustrating exemplary steps for conducting key exchanges using PKI keys in order to derive a first and a second shared secret keys, where ECC point addition is performed on output from a key exchange algorithm in order to derive a third shared secret key.

FIG. 4d is a flow chart illustrating exemplary steps for conducting key exchanges using PKI keys in order to derive a first and a second shared secret keys, where ECC point addition is performed on output from a key exchange algorithm in order to derive a third shared secret key. The exemplary key exchange step 421 can be used by a DPP server 103 in order to derive a key L(a) 421a. The exemplary key exchange step 422 can be used by a responder 102' in order to derive a key L(b) 422a. A key derivation step 423 can combine key L(a) 421*a* and key L(b) 422*b* in order to calculate or derive the key L 412, using ECC point addition on key L(a) 421*a* and key L(b) 422*b*. In this manner, key L 412 can be calculated through the use of two different key exchange steps 421 and 422 in some exemplary embodiments such as those depicted and described in connection with FIG. 5*a* below, instead of the single key exchange step 321 depicted in FIG. 4*c*.

Key exchange 421 can use an ECDH key exchange algorithm 401*a*, where the input comprises the initiator bootstrap public key Bi 101*a* and the responder bootstrap private key br 102*b*. The set of mutually agreed parameters 199*a* between with an initiator 101 can be used with a key exchange step 421. The output of ECDH key exchange algorithm 401*a* can comprise key L(a) 421*a*. In exemplary embodiments, where DPP server 103 conducts the key exchange step 421, the responder bootstrap private key br 102*b* can remain in DPP server 103 or within a network 107 and does not need to be shared with responder 102'. In addition, although a DPP server 103 is described herein for a FIG. 4*d* as performing the key exchange step 421, another server on an external network 108 could (i) record the responder bootstrap private key br 102*b* and (ii) perform a key exchange step 421, and the output of key exchange step 421 in the form of key L(a) 421*a* could be sent to a DPP server 103 or responder 102', such as in a message 503 depicted in FIG. 5*a* below. Or, DPP server 103 could be operated by an external network 108 and communicate with a responder 102' via a secure session 302*b*. Key L(a) 421*a* could comprise a shared secret key, although in exemplary embodiments an initiator 101 may not need to calculate the corresponding key L(a) 421*a* directly, but rather initiator 101 can calculate a shared secret key L 412 using step 327 as depicted in FIG. 4*c*.

Key exchange 422 can use an ECDH key exchange algorithm 401*a*, where the input comprises the initiator bootstrap public key Bi 101*a* and the responder ephemeral private key pr 102*r*. The set of mutually agreed parameters 199*a* between with an initiator 101 can be used with a key exchange step 422. The output of ECDH key exchange algorithm 401*a* can comprise key L(b) 422*a*. In exemplary embodiments, where responder 102' conducts the key exchange step 422, the responder does need access to the responder bootstrap private key br 102*b*, which can remain in DPP server 103 or within a network 107 and does not need to be shared with responder 102'. Key L(b) 422*a* could comprise a shared secret key, although in exemplary embodiments an initiator 101 may not need to calculate the corresponding key L(b) 421*a* directly, but rather initiator 101 can calculate a shared secret key L 412 using a step 327 as depicted in FIG. 4*c*.

A key derivation step 423 can (i) combine the output of key exchange steps 421 and 422 in order to calculate or derived the shared secret key L 412 and then (ii) perform a key derivation function step 402*c* on the derived or calculated shared secret key L 412 in order to determine or calculate shared secret key ke 327*a*, which can be also mutually derived by initiator 101, where initiator 101 uses the key exchange step 327 depicted and described in connection with FIG. 4*c*. In exemplary embodiments, a responder 102' can conduct the key derivation step 423 using (i) the value L(a) 421*a* received from a DPP server 103 (where receipt of L(a) 421*a* by responder 102' can be in a message 503 as shown in FIG. 5*a* below), and (ii) the value or key L(b) 422*b* output from a key exchange step 422 in the paragraph above.

Key derivation step 423 can comprise two primary steps. A first step in key derivation 423 can comprise an ECC point addition 424 on the value L(a) 421*a* and the value L(b) 422*a*. The result of the ECC point addition will be equal to the value L 412, where the value L 412 could also be calculated without ECC point addition 424 using a step 321. Exemplary calculations for an ECC point addition 424 can comprise the calculations shown for point addition in the Wikipedia article for "Elliptic Curve Point Multiplication" dated May 15, 2018, which is herein incorporated by reference in its entirety. As depicted in FIG. 4*c*, the calculation of L 412 using an ECC point addition 424 over L(a) 421*a* and L(b) 422*a* will equal the value for L 412 calculated by a key exchange algorithm 401*c* from a step 321 in FIG. 4*c*. A second step in key derivation step 423 as depicted in FIG. 4*d* can comprise a key derivation function step 402*c* using input from ECC point addition step 424 (e.g. value L 412 output from step 424), where the output of key derivation function step 402*c* can comprise key ke 327*a*, which is also depicted in FIG. 4*c* above.

By conducting a key derivation step 423 as depicted in FIG. 4*c* (where DPP server 103 conducts the calculations using the responder bootstrap private key br 102*b*), (i) responder 102' can calculate key ke 327*a* without recording or operating on the responder bootstrap private key br 102*b*, and (ii) the responder bootstrap public key Br 101*a* could comprise a shared key 102*z* as depicted in FIG. 2*a* across multiple different devices 106. Although the responder 102' can receive the key or value L(a) 421*a*, the responder bootstrap private key br 102*b* remains secure, because responder 102' cannot feasibly calculate or determine the responder bootstrap private key br 102*b* using a received key L(a) 421*a*. In other words, the use of a key derivation step 423 can allow a responder bootstrap public key Br 102*a* to be securely shared between multiple devices 106 in order to conduct a DPP 191, since a responder 102' can conduct a DPP 191 as contemplated herein without recording, receiving, or operating on a responder bootstrap private key 102*b*.

Exemplary data and numbers can be provided to demonstrate the calculations for key exchange steps 421, key exchange step 422, and key derivation step 423 using an ECC point addition 424. The exemplary data can comprise decimal numbers for the example data and calculations listed in "Test vectors for DPP Authentication using P-256 for mutual authentication" on pages 88 and 89 of the DPP specification version 1.0. Parameters 199*a* can comprise the elliptic curve 199*c* of "secp256r1" with key lengths 199*b* of 256 bit long keys.

The responder bootstrap private key 102*b* can comprise the exemplary following number, and may be recorded in a DPP server 103:

38358416135251014160802731750427376395128366423455574545250035236739593908128

The responder ephemeral private key 102*r* can comprise the exemplary following number, and may be recorded by a responder 102':

111991471310604289774359152687306247761778388605764559848869154712980108827301

The initiator bootstrap public key Bi 101*a* can comprise the following exemplary values with X and Y numbers (or "coordinates") of:

X: 61831688504923817367484272103056848457721601106987911548515219119661140991966

Y: 43682127411605262630763685096978902757372085459561282092692249825509082694

Key exchange step 421 for an ECDH algorithm key exchange 401a can input the initiator bootstrap public key Bi 101a and the responder bootstrap private key br 102b (both with numbers above) in order to calculate a key L(a) 421a. An exemplary number or value for key L(a) 421a from the values above using parameters 199a can be:

X: 11490047198680522515311590962599671482029417064351337303313906642805743573119

Y: 27933966560238204731245097943399084523809481833434754409723604970366082021855

Key exchange step 422 for an ECDH algorithm key exchange 401a can input the initiator bootstrap public key Bi 101a and the responder ephemeral private key pr 102r (both with numbers above) in order to calculate a key L(b) 422a. An exemplary number or value for key L(b) 422a from the values above using parameters 199a can be:

X: 78944719651774206698250588701582570633503182903415394243006529481189158194650

Y: 11227712702924684581834935828837489140201820424536062912051086382324589445237

An ECC point addition 424 for the above two derived points L(a) 421a (from keys Bi 101a and br 102b) and L(b) 422b (from keys Bi 101a and pr 102r) will result in the following point that also equals L 412.

X: 11373450062906554555789352406461011374085896683167264961556504203569523071309

Y: 68961429691307429166796760881095689348088875771334970644593306388375741965262

Note that key L 412 can also be derived by initiator 101 from a key exchange step 327 using ECDH key exchange algorithm 401c. ECDH key exchange algorithm 401c can comprise initiator 101 calculating L from keys Br 102b, Pr 102p, and bi 101b, represented by (Br 102b+Pr 102p)*bi 101b. Using hexadecimal representations of the above keys Br 102b, Pr 102p, and bi 101b from the same keys values in DPP specification version 1.0 and exemplary numbers above, the X,Y numbers or point or "coordinates" derived by initiator 101 with algorithm 401c for shared secret L on page 89 equals:

X: fb737234 c973cc3a 36e64e51 70a32f12 089d198c 73c2fd85 a53d0b28 2530fd02

Y: 9876c937 b642cce8 f604bef0 c24ce0da d2c27867 08a7575a f940a58c fe8ca3ce

The hexadecimal representation of shared secret L using keys Br 102b, Pr 102p, and bi 101b by initiator 101 equals the decimal representation of shared secret key L 412 from the ECC point addition 424 by a responder 102', where ECC point addition 424 used as input key L(a) 421a and key L(b) 422a.

After an ECC point addition 424, a key derivation step 423 in FIG. 4c can input the shared secret key L 412 output from the ECC point addition 424 into a key derivation function 402c. The key derivation function 402c can comprise the same key derivation function 402c as depicted and described in connection with FIG. 4c above. The key derivation function 402c can also use input of shared secret key M 410 from FIG. 4a in a step 319 and shared secret key N 411 from a step 314b. The output of the key derivation function 402c can be shared secret key ke 327a. An exemplary key derivation function 402c could comprise the key derivation function in point 2 of page 48 of DPP specification version 1.0. Note that initiator 101 can mutually derive the same value or number or "coordinate" for shared secret key ke 327e using a key exchange step 321. As contemplated herein, the use of the words or description "shared secret key" can also mean "shared secret". Thus, "shared secret key M 410" can be the same as "shared secret M 410", "shared secret key N 411" can be the same as "shared secret N 411", etc.

FIG. 5a

FIG. 5a is a simplified message flow diagram illustrating an exemplary system with exemplary data sent and received by a device database, a DPP server, a responder proxy, and an initiator, in accordance with exemplary embodiments. System 500a can include a device database 104, DPP server 103, responder proxy 102', and initiator 101 operating in device 106. Before starting steps and message flows depicted in FIG. 5a, the initiator, DPP server, and device database depicted for system 500a in FIG. 5a may previously complete exemplary message flows and steps depicted for a step 301 in FIG. 3a above. Responder 102' can use data received from initiator 101 in a message 122 from step 301 (such as initiator ephemeral public key Pi 101c) in order to conduct the steps and process the messages depicted for a responder 102' in FIG. 5a.

Responder proxy 102' can communicate with DPP server 103 via IP network 113, also as depicted in FIG. 3a above. As contemplated herein, a "responder proxy 102'" depicted in FIG. 5a may also be referred to as responder 102', and a responder 102' and responder proxy 102' may be equivalent. A difference between system 500a in FIG. 5a and system 300 in FIG. 3a can be that (i) responder ephemeral private key pr 102r, with corresponding (ii) responder ephemeral public key Pr 102p are derived and recorded by a responder 102' instead of a DPP server 103. In exemplary embodiments depicted in FIG. 5a the responder bootstrap private key br 102b can remain recorded in a DPP server 103 and not exposed to responder 102'. In exemplary embodiments depicted in FIG. 5a the responder ephemeral private key pr 102r can remain recorded in responder 102' and not exposed to DPP server 103. The exemplary embodiment depicted in FIG. 5a can comprise a second mode 306a of operation for responder 102' and DPP server 103, as depicted and described in connection with FIG. 3c above.

At step 502, DPP server 103 can select a mode 306a for both responder 102' and DPP server 103. Note that the mode 306a selected is not normally observable to an initiator 101, since the full and complete set of DPP 191 messages between initiator 101 and responder 102' can be transmitted and received between the two nodes. In other words, (a) the different distribution of PKI and shared secret keys in a server database 103a and responder 102' for a first mode 306a in FIG. 3a and a second mode 306a in FIG. 5a (b) would not normally be observable to an initiator 101. The recording of PKI and shared secret keys in a server database is depicted in a server database 103a in FIG. 3c, where the value "–" can mean that the key is recorded and/or operated by responder 102'. Step 502 can also comprise DPP server 103 selecting a responder bootstrap public key Br 102a and a responder bootstrap private key br 102b and initiator bootstrap public key Bi 101a for device 106 using MAC.I 106n, although a different value in server database 103a could be used as well, such as device identity ID.device 106i or hash value 101aa. Selecting keys Br 102a and br 102b in a step 502 can use the parameters 199a received in a message 312a in FIG. 3a, in order to select keys that are compatible with received initiator ephemeral public key Pi 101c from a message 122 in FIG. 3a. Also, although a step 502 is depicted in FIG. 5a, a step 502 could be used in other Figures and embodiments herein, include embodiments depicted in FIG. 3a and FIG. 5b.

DPP server 103 can then conduct an ECDH key exchange step 401a using as input (i) the responder bootstrap private key br 102b and (ii) the initiator ephemeral public key Pi 101c received in a message 122 from FIG. 3a during a step 301. This ECDH key exchange step 401a is depicted and described in connection with a key exchange step 319 depicted and described in connection with FIG. 4a. The output of step 401a can be shared secret M 410. DPP server 103 can send (i) shared secret M 410 along with a device identity such as MAC.I 106n (or ID.device 106i or hash value 101aa) to (ii) responder 102' in a message 503. The use of a device identity in message 503 can be helpful for embodiments where responder 102' communicates with a plurality of devices 106 either simultaneously or in sequence.

Responder 102' can receive message 503 with shared secret M 410 and conduct a series of steps in order to prepare a DPP authentication response message 123. A step 318 in FIG. 5a can comprise the same steps 318 as performed by DPP server 103 in FIG. 3a, except responder 102' performs the actions in FIG. 5a instead of DPP server 103 performing the actions. In summary for a responder 102' in FIG. 5a, responder 102' can derive two random numbers using a random number generator. The first random number can be used as a responder ephemeral private key pr 102r and the second random number can be used as a responder nonce 318b. Parameters 199a can specify the format and length of key pr 102p and nonce 318b in a step 318 for responder 102. Responder 102' can also derive a responder ephemeral public key Pr 102p using the derived key pr 102r. DPP server 103 can also determine responder capabilities 319b, which could comprise the capabilities for a configurator.

Responder 102' can process a key derivation function 402a using the received shared secret M 410 from a message 503. The key derivation function 402a can be equivalent to a function 402a depicted and described in connection with FIG. 4a. Shared secret M 410 can be input into key derivation function 402a, and the output can be shared secret key k1 314a. Responder 102' can then perform a decryption step 320 using the derived key k1 314a, where a decryption step 320 is depicted and described in connection with FIG. 4a. Decryption step 320 can be performed by responder 102' on the ciphertext 315a received in a DPP authentication request message 122. After a decryption step 320, responder 102' can read plaintext 403a with the values of the initiator nonce 317a and the initiator capabilities. For the embodiment depicted in FIG. 5a, the initiator 101 can have the capabilities of an enrollee, although other possibilities exist as well without departing from the scope of the present disclosure.

Responder 102' can then conduct a second responder key exchange step 314b, where the details for a key exchange step 314b are depicted and described in connection with FIG. 4b above. In summary, the initiator ephemeral public key Pi 101c received in message 122 can be input into an ECDH key exchange algorithm 401a along with the responder ephemeral private key pr 102r derived in a step 318 above in order to output a secret shared key N 411. The value for shared secret key N 411 can be recorded and used in the derivation of a key ke 327a in a key derivation function 402c below by responder 102'. For a step 314b, the value for the shared secret key N 411 can be input into a key derivation function 402b in order to derive a mutually shared symmetric key k2 314c. As depicted in FIG. 5a, the collection of steps and messages beginning with a step 502 by DPP server 103 though key exchange step 314b can comprise a step 501, where a step 501 can also be used by a DPP server 103 and responder 102' in FIG. 5b below.

In FIG. 5a, a DPP server 103 can then conduct or calculate an ECDH key exchange step 421, where key exchange step 421 was depicted and described in connection with FIG. 4d above. In summary, the initiator bootstrap public key Bi 101a and the responder bootstrap private key br 102b can be input into an ECDH key exchange algorithm 401d using a set of parameters 199a. The output of key exchange step 421 can comprise a value L(a) 421a. Note that step 421 can be performed before a step 501 or concurrently with a step 501. DPP server 103 can then send responder 102' a message 504, where message 504 include an identity for device 106 such as MAC.I 106n, the initiator bootstrap public key Bi 101a, and the calculated value L(a) 421a from a key exchange step 421. Message 504 can be sent via secure session 302b established during a step 301 from FIG. 3a.

Responder 102' can receive message 504 and begin performing a series of steps in order to process the data and prepare a DPP authentication response message 123. Responder 102' can conduct a key exchange step 422 in order to calculate a value L(b) 422a. In summary, the responder ephemeral private key pr 102r can be input into an ECDH key exchange algorithm 401a along with the initiator bootstrap public key Bi 101a, using a set of parameters 199a in order to calculate the value or key L(b) 422a using a key exchange step 422. Key Bi 101a can be received by responder 102' in message 504. A key exchange step 422 for responder 102' was depicted and described in connection with FIG. 4d above. Responder 102' can then conduct a key derivation step 423 from FIG. 4d above in order to determine or derived a secret shared key ke 327a.

A key derivation step 423 for responder 102' was depicted and described in connection with FIG. 4d above. In summary, responder 102' can perform an elliptic curve point addition step 424 for the two values or points of L(a) 421a and L(b) 422b. As contemplated herein, the output of a ECDH key exchange function such as 401a or 401c can comprise a point value comprising an X coordinate or value and a Y coordinate or value, and when the output is described herein as a key or a value, the key or value can comprise either (i) the X value only for use in a key derivation function such as 402a, 402b, or 402c, or (ii) the X and Y values together for other calculations such as an ECC point addition step 424. The combination of the points L(a) 421a and L(b) for an ECC point addition step 424 can comprise the point or value L 412, as depicted and described in connection with a key derivation step 423 in FIG. 4d. Key derivation step 423 can then input the value L 412, M 410 from message 503, and N 411 from step 314b into key derivation function 402c in order output symmetric ciphering key ke 327a.

Responder 102' can then perform an encryption step 322, where encryption step 322 was depicted and described in connection with FIG. 4c above. Step 322 can also include responder 102' creating a value R-auth 404, where R-auth 404 can comprise a hash of the initiator nonce 317a from plaintext 403a in step 320, the second random number R-nonce 318b from a step 318 above, and public PKI keys. The value for R-auth 404 in a step 322 can comprise the value in point 3 of section 6.2.3 of DPP specification version 1.0. An encryption step 322 can comprise responder 102' (a) encrypting the value for R-auth 404 using the mutually derived key ke 327a from the key derivation step 423 above, where (b) the output of encryption step 322 can comprise ciphertext 324a.

Responder 102' can then conduct an encryption step 315b, where the details for an encryption step 315b are depicted and described in connection with FIG. 4b above. Ciphertext 324a from an encryption step 322 in the paragraph above can also be encrypted again for an encryption step 315b. The symmetric ciphering key for encryption step 315b can comprise symmetric key k2 314c from a key exchange step 314b. The output from an encryption step 315b can be ciphertext 315c, as depicted in FIG. 4b above.

Responder 102' can conduct a step 324 before sending a message 123. For a step 324, responder 102' can record the derived responder ephemeral public key Pr 102p and responder ephemeral private key pr 102r and initiator bootstrap public key Bi 101a in an initiator table 102u from FIG. 1f along with the identity of device 106 comprising potentially MAC.I 106n. In other words, an initiator table 102u can be updated to include information or data (i) received from network 107 (and DPP server 103) regarding devices 106 communication through network 107 via responder 102', and (ii) derived by responder 102' when performing key exchange steps 401a and 401c and key derivation steps 402a, 402b, and 402c. In other words, an initiator table 102u can include columns for the values of M 410, N 411, L 412, L(a) 421a, L(b) 422a, key k1 314a, key k2 314c, and key ke 327a for each device 106 with an identity such as MAC.I 106n. The recording of values for a device 106 or a plurality of devices 106 in an initiator table 102 can be equivalent to the values recorded for a server database 103a depicted and described in connection with FIG. 3c above. In this manner, responder 102' can track keys and values for devices 106 since responder 102' may communicate with a plurality of different devices 106 and initiators 101 over time. In exemplary embodiments, responder 102' derives a new responder ephemeral PKI key pair for each unique DPP authentication request message 122 received. Data or values stored by responder 102' pertaining to derived encryption keys (e.g. k1, k2, and ke) and ephemeral PKI keys (e.g. Pr 102p and pr 102r) are preferably erased from an initiator table 102u upon successful completion of a configuration step 106a by device 106.

Responder 102' can then send initiator 101 a DPP authentication response message 123. In exemplary embodiments, message 123 is sent as a unicast message from (i) the responder MAC address MAC.R 102n (which received message 122) to (ii) the initiator MAC address MAC.I 106n (which sent message 122), over (iii) WiFi link 192. As depicted in FIG. 5a, message 123 can include hash values of the bootstrap public keys H(Br 102a), H(Bi 101a), the responder ephemeral public key Pr 102p, and the ciphertext 315c. The ciphertext 315c can have at least encrypted values for (i) R-nonce 318b, (ii) I-nonce 317a, (iii) R-capabilities 318c, and (iv) ciphertext 324a. The ciphertext 315c can be encrypted with mutually derived symmetric encryption key k2 314c. Ciphertext 324a can be encrypted with the mutually derived symmetric key ke 327a and can include a plaintext value for R-auth 404. As described above, R-auth 404 can comprise a hash value over at least an initiator nonce 317a received and the responder nonce 318b.

Initiator 101 can receive DPP authentication response message 123 from responder 102' and conduct a series of steps in order to process the message and reply to the responder 102'. Initiator 101 can conduct a step 331, and a step 331 can comprise the series of steps 325, 319a, 320b, 327, 328, and 322b. The series of steps 331 for an initiator 101 to process a DPP authentication response 123 were depicted and described in connection with FIG. 3a above. After completing the series of steps for a step 331 in FIG. 5a, initiator 101 can send responder 102' a DPP authentication confirm message 123a. The data and steps to determine and calculate an DPP authentication confirm message 123a for a step 331 can be compatible with section 6.2.4 of DPP specification version 1.0. Note that although the DPP authentication confirm message 123a can be equivalent to the DPP authentication confirm message from section 6.2.4 of DPP specification version 1.0, an important difference can be the operation of responder 102' in FIG. 5a versus a responder as contemplated by DPP specification version 1.0. In the present disclosure as depicted in FIG. 5a, responder 102' does not record the responder bootstrap private key br 102b.

Responder 102' can listen for either (i) a broadcast message with the hash 199e values for the bootstrap public keys 102aa and 101aa, or (ii) a unicast message to MAC.R 102n from MAC.I 106n for initiator 101 operating in device 106. Responder 102' can receive the DPP authentication confirm message 123a and process the message. DPP authentication confirm message 123a can include an encrypted value for initiator authentication value 404a as a ciphertext 324b, where ciphertext 324b is encrypted with derived key ke 327a in a step 322b within step 331. Upon receipt of DPP authentication confirm message 123a from device 106, responder 102' can first conduct a decryption step 328b, where decryption step 328b can use the same steps as a decryption step 328 as depicted in FIG. 4c above, with a difference being decryption step 328b operates on the ciphertext 324b containing the encrypted initiator authentication value I-auth 404a instead of the R-auth 404 value. After a step 328b, responder 102' can read the plaintext initiator authentication value I-auth 404a.

In step 330, responder 102' can compare the decrypted value for I-auth 404a with a calculated value for I-auth 404a and if the two values match then the initiator 101 can be considered by responder 102' to be authenticated. The calculation of I-auth 404a for responder 102' in a step 330 can comprise a calculation of a secure hash value over the responder nonce 318b and bootstrap and ephemeral public keys, with an exemplary calculation for I-auth 404a shown in the sixth paragraph of page 50 of DPP specification version 1.0. Other calculations of an initiator authentication value over the responder nonce 318b are possible as well, without departing from the scope of the present disclosure.

After authentication step 330 is completed, in a step 505, responder 102' can determine the source of network credentials 109 or encrypted network credentials 109' for initiator 101. In a step 505, responder 102' can use the selected responder mode 306a as depicted and described in connection with FIG. 3c. For embodiments where a network 107, an external network 108, or DPP server 103 can be the source of network credentials 109 or encrypted network credentials 109' (as specified in a responder mode 306a), then responder 102' can use the series of steps and messages in FIG. 6 in order to (i) receive network credentials 109 or encrypted network credentials 109' from a DPP server 103 and (ii) send the credentials to initiator 101. For other embodiments where a responder 102' already records the network credentials 109 for initiator 101 and device 106 (such as responder 102' uses network credentials 109 to connect with network access point 105), then responder 102' can read the locally stored credentials 109 and send the credentials 109 to initiator 101 in a DPP configuration response message 124 in FIG. 6 below. Responder 102' can use a step 349 as depicted in FIG. 3b in order to send locally stored credentials 109 to initiator 101, where responder 102' performs the actions instead of a DPP server 103. As depicted in FIG. 5a, the collection of steps and messages beginning with responder 102' sending message 123 through step 505 can comprise a step 506. Step 506 can subsequently be used by a responder 102' for a different responder mode 306a depicted in FIG. 5b below.

FIG. 5b

FIG. 5b is a simplified message flow diagram illustrating an exemplary system with exemplary data sent and received by a device database, a DPP server, a responder proxy, and an initiator, in accordance with exemplary embodiments. System 500b can include a device database 104, DPP server 103, responder proxy 102', and initiator 101 operating in device 106. Before starting steps and message flows depicted in FIG. 5b, the initiator, DPP server, and device database depicted for system 500b in FIG. 5b may previously complete exemplary message flows and steps depicted for a step 301 in FIG. 3a above. Responder proxy 102' can communicate with DPP server 103 via IP network 113, also as depicted in FIG. 3a above.

A difference between system 500b in FIG. 5b and system 500a in FIG. 5a can be that (i) responder ephemeral PKI keys pr 102r and Pr 102p are derived and recorded by a responder 102' (instead of a DPP server 103 in FIG. 3a), (ii) responder 102' sends responder ephemeral private key pr 102r to DPP server 103, and (iii) DPP server 103 derives key L 412 instead of responder 102' in FIG. 5a. In exemplary embodiments depicted in FIG. 5b the responder bootstrap private key br 102b can remain recorded in a DPP server 103 and not exposed to responder 102'. The exemplary embodiment depicted in FIG. 5b can comprise a third mode 306a of operation for responder 102' and DPP server 103, as depicted and described in connection with FIG. 3c above.

As depicted in FIG. 5b, responder 102' and DPP server 103 can conduct a step 501, where a step 501 is depicted and described in connection with FIG. 5a above. Responder 102' can use data received from initiator 101 in a message 122 from step 301 in order to conduct step 501. In summary, a step 501 in FIG. 5b can comprise, (i) a step 502 for DPP server 103 to select a mode 306a for both responder 102' and DPP server 103, (ii) DPP server 103 conducting an ECDH key exchange to calculate the value or key M 410, (iii) responder 102' receiving the key M 410 from DPP server 103, (iv) responder 102' deriving the responder ephemeral PKI keys of pr 102r and Pr 102p, (v) responder 102' performing a key derivation step 402a with M 410 in order to calculate key k1 314a, (vi) responder 102' decrypting ciphertext in message 122 using key k1 314a, and (vii) responder 102' conducting a key exchange step 320 to calculate key k2 314c.

Note that the selected responder mode 306a in a step 501 is not normally observable to an initiator 101, since the full and complete set of DPP 191 messages between initiator 101 and responder 102' can be transmitted and received between the two nodes in FIG. 5b. In other words, the different distribution of PKI and shared secret keys in a server database 103a and responder 102' for the responder mode 306a used for FIG. 5b would not normally be observable to an initiator 101. The recording of PKI and shared secret keys in a server database is depicted in a server database 103a in FIG. 3c, where the value "–" can mean that the key is recorded and/or operated by responder 102'.

Upon completion of a step 501 in FIG. 5b, responder 102' can send DPP server 103 a message 507 via secure session 302b established during step 301 from FIG. 3a. Message 507 can include (i) an identity for device 106 and initiator 101, such as MAC.I 106n or hash value 101aa, and (ii) the derived responder ephemeral private key pr 102r. DPP server 103 can receive message 507 and use the received device identity to select the initiator bootstrap public key Bi 101a and responder bootstrap private key br 102b from a server database 103a. DPP server can use the received responder ephemeral private key pr 102r from message 507 and the selected data in order to conduct an ECDH key exchange step 401c as depicted and described in connection with FIG. 4c above. The output of a step 401c can be key L 412.

After deriving key L 412, DPP server 103 can then send responder 102' a message 508, where message 508 can include an identity for device 106 such as MAC.I 106n (or hash value 101aa), the initiator bootstrap public key Bi 101a (from a server database 103a), and the derived key L 412 from a step 402c. Responder 102' can receive message 508 and record and process the data. Responder 102' can conduct a key derivation function 402c using (i) the received key L 412, (ii) the received key M 310 from a message 503 in a step 501, and (iii) the key N 311 derived by responder 102 in a step 314b in step 501. The output of a key derivation function 402c can be key ke 327a, as depicted and described for a key exchange step 402c in FIG. 4c.

Responder 102' can then calculate a responder authentication value 404 and conduct an encryption step 322 using the plaintext 403c as depicted and described for a step 322 in FIG. 4c. The output of an encryption step 322 can comprise ciphertext 324a. Responder 102' can then assemble plaintext 403b (which includes ciphertext 324a in the plaintext values for plaintext 403b) and conduct an encryption step 315b, where encryption step 315b is depicted and described in connection with FIG. 4b above. Responder 102' can conduct a step 324 before sending a message 123. For a step 324, responder 102' can record the derived responder ephemeral public key Pr 102p and responder ephemeral private key pr 102r and initiator bootstrap public key Bi 101a in an initiator table 102u from FIG. 1f along with the identity of device 106 comprising potentially MAC.I 106n.

Responder 102' and initiator 101 can then conduct a step 506, where the series of steps and messages for a step 506 were depicted and described for a responder 102' and initiator 101 in FIG. 5a above. In summary for a step 506 depicted above in a FIG. 5a, a responder 102' can send initiator 101 a DPP authentication response message 123 via WiFi link 192. Initiator 101 can process the DPP authentication response message 123 using a step 331, which was depicted and described in connection with FIG. 3a above. Initiator 101 can then send a DPP authentication confirm message 123a and responder 102' can receive the message 123a via WiFi link 192. Responder 102' can decrypt ciphertext 324b from message 123a using a decryption step 328b in order to read plaintext initiator authentication value 404a. In step 330 of a step 506, responder 102' can compare the decrypted value for I-auth 404a with a calculated value for I-auth 404a and if the two values match then the initiator 101 can be considered by responder 102' to be authenticated.

After authentication step 330 in step 506 is completed, in a step 505 of a step 506, responder 102' can determine the source of network credentials 109 or encrypted network credentials 109' for initiator 101. For embodiments where a network 107, an external network 108, or DPP server 103 can be the source of network credentials 109 or encrypted network credentials 109' (as specified in a responder mode 306a), then responder 102' can use the series of steps and messages in FIG. 6 in order to (i) receive network credentials 109 or encrypted network credentials 109' from a DPP server 103 and (ii) send the credentials to initiator 101. For other embodiments where a responder 102' already records the network credentials 109 for initiator 101 and device 106 (such as responder 102' uses network credentials 109 to connect with network access point 105), then responder 102' can read the locally stored credentials 109 and send the credentials 109 to initiator 101 in a DPP configuration response message 124 in FIG. 6 below. Responder 102' can use a step 349 as depicted in FIG. 3b in order to send locally stored credentials 109 to initiator 101, where responder 102' performs the actions instead of a DPP server 103.

FIG. 6

FIG. 6 is a simplified message flow diagram illustrating an exemplary system with exemplary data sent and received by a DPP server, a responder proxy, and an initiator, in accordance with exemplary embodiments. System 600 can include a DPP server 103, responder proxy 102', and initiator 101 operating in device 106. Before starting steps and message flows depicted in FIG. 6, DPP server 103, responder 102', and initiator 101 can previously complete exemplary message flows and steps depicted for the nodes in either FIG. 5a or FIG. 5b. System 600 depicts the transfer of credentials 109 or 109' from responder 102' when responder 102' calculates and operates with symmetric ciphering key ke 327a. Although the source of credentials 109 or 109' is depicted as network 107 with DPP server 103 in FIG. 6, the source of credentials 109 or 109' could be either DPP server 103 or responder 102'. A difference between system 600 and system 300b in FIG. 3b is that for system 300b, DPP server 103 calculates, records, and operates with key ke 327a for use with initiator 101 in device 106.

After transmitting or sending DPP authentication confirm message 123a in a step 506 as depicted and described in connection with FIG. 5a and FIG. 5b, initiator 101 can conduct a step 332. Initiator 101 can take on a roll of enrollee, such that initiator 101 can prepare to send a configuration attribute 330a. Configuration attribute 330a can be used to specify that initiator 101 can take the roll of enrollee and is expecting a set of network credentials 109 from responder 102', with associated data for responder 102' to prepare or format a set of network credentials 109.

In step 332, initiator 101 can also generate a random number, for an enrollee nonce E-nonce 332a. E-nonce 332a and other nonce values can be processed using nonce parameters 199g. Initiator 101 can then conduct an encryption step 322c, where encryption step 322c can comprise (i) an encryption step 322 using key ke 327a, and (ii) the plaintext to be encrypted can be the E-nonce 332a and the configuration attribute 330a. The output of an encryption step 322c can be a ciphertext 324c, which is also described for a step 322c in FIG. 3b above. Initiator 101 can then send via WiFi link 192 to responder 102' a DPP Configuration Request message 123b, where the configuration request 123b can include the ciphertext 324c. The plaintext in ciphertext 324c can include E-nonce 332a and the configuration object 330. DPP Configuration Request message 123b can be processed by initiator 101 according to section 6.3.3 of DPP specification version 1.0.

Responder 102' can receive DPP Configuration Request message 123b via connection 192 and using DPP application 102g. Responder 102' can conduct a decryption step 328c using decryption step 328 depicted in FIG. 4c above. A difference between decryption step 328 and decryption step 328c is that decryption step 328c uses the ciphertext 324c as input into the symmetric decryption algorithm 405b.

Responder 102' can use the previously calculated key ke 327a in order to read the plaintext within ciphertext 324c. Responder 102' can record the plaintext E-nonce 332a and configuration attribute 330a.

Responder 102' can then conduct a step 601 in order to determine the source of credentials 109 for initiator 101 and device 106. For embodiments where responder 102' previously records a valid set of network credentials 109 for use with network access point 105 depicted in FIG. 1a, then responder 102' could select the recorded network access credentials 109 for use as a configuration object for initiator 101 and device 106. In other words, for embodiments where responder 102' previously connects with network access point 105 (or responder 102' could operate within network access point 105), then responder 102' could record a valid set of network credentials 109 in order to successfully connect with network access point 105. For these embodiments, responder 102' could select the recorded network access credentials 109 for transfer to initiator 101 and used by initiator 101 and device 106 in order to also connect with access point 105 using the same set of network credentials 109 recorded by responder 102'. Responder 102' can read the locally stored credentials 109 and send the credentials 109 to initiator 101 in a DPP configuration response message 124 in FIG. 6 below. Responder 102' can use a step 349 as depicted in FIG. 3b in order to send locally stored credentials 109 to initiator 101, where responder 102' performs the actions instead of a DPP server 103.

For other embodiments, such as responder 102' does not previously record a set of network credentials 109 for use by initiator 101 and device 106, then in a step 601 responder 102' could determine a query to DPP server 103 or network 107 is required for the network credentials 109 or encrypted network credentials 109' for initiator 101 and device 106. The determination of a source for network credentials (e.g. either responder 102' or DPP server 103 could also be specified in a responder mode 306a, such that a first responder mode 306a selects responder 102' as the source of credentials 109 and a second responder mode 306a selects DPP server 103 as the source of credentials 109 or encrypted credentials 109'). Other possibilities exist as well for a step 601 by responder 102' in FIG. 6 to determine a source of credentials 109 for device 106 without departing from the scope of the present disclosure.

For embodiments where step 601 by responder 102' determines that network 107 or DPP server 103 is the source of network credentials 109 for device 106, responder 102' can then send DPP server 103 a message 602 through secure session 302b (depicted and described in FIG. 3a), where message 602 include an identity for device 106 such as MAC.I 106n (or device identity 106i or hash value 101aa) and the plaintext configuration attribute 330a. DPP server 103 can receive message 602 and can conduct a step 337 in order to obtain network credentials 109 or asymmetrically encrypted credentials 109'. A step 337 for DPP server 103 was depicted and described in connection with FIG. 3b above, and the same step can be used by DPP server 103 for system 600 in FIG. 6 (for embodiments where step 601 by responder 102' determines that network 107 or DPP server 103 is the source of network credentials 109 for device 106).

Continuing with embodiments where step 601 by responder 102' determines that network 107 or DPP server 103 is the source of network credentials 109 for device 106, DPP server 103 can then send responder 102' a message 603, where message 603 includes (i) an identity for device 106 such as MAC.I 106n or ID.device 106i or hash value 101aa, and (ii) a set of network credentials 109 or asymmetrically encrypted network credentials 109'. Asymmetrically encrypted credentials 109' could be in message 603 if DPP server 103 obtained the credentials outside of or external to DPP server 103, such as an external network 108 (where external network 108 may prefer that only device 106 be able to read the plaintext network credentials 109 inside asymmetrically encrypted network credentials 109'). A difference between message 603 in FIG. 6 and message 341 in FIG. 3b can be (i) the message 603 is not encrypted with key ke 327a, and (ii) the message 603 may not include a digital signature 338c. Or, for other embodiments, then a system 600 could include the use of a digital signature creation step 338 as depicted and described in connection with FIG. 3b and FIG. 3d and the message 603 and subsequent message 124 can include the digital signature 338c. Responder 102' can receive message 603 and process the data. Note that message 603, step 337, and message 603 can be omitted for embodiments where step 601 determines that responder 102' is the source of credentials 109 for device 106.

For embodiments where message 603 does not include a digital signature 338c as depicted in FIG. 6, responder 102' can then record the network credentials 109 or asymmetrically encrypted network credentials 109' and conduct a signature creation step 338. Note that the source of credentials 109 can be either responder 102' or DPP server 103, depending on the source selected in step 601. In exemplary embodiments, asymmetrically encrypted network credentials 109' can be from DPP server 103 or potentially an external network 108. For a step 338 in FIG. 6, responder 102' can conduct a signature creation step 338 as depicted and described in connection with FIG. 3d above. The configuration object with network credentials 109 (or encrypted credentials 109') can be signed using the recorded responder ephemeral private key pr 102r, corresponding to public key Pr 102p sent in message 325 in FIG. 3a above. The digital signature by responder 102' in FIG. 3b can comprise a digital signature 338c. Or, in another embodiment the configuration object with network credentials 109 can be signed using the recorded responder bootstrap private key br 102b recorded by DPP server 103 and digital signature 338c included in a message 603, where initiator 101 could verify the signature 338c with the bootstrap public key Br 101a.

At step 332d, responder 102' can conduct an encryption step 332d using an encryption step 322 depicted and described in connection with FIG. 4c above. Encryption step 332d can be performed using key ke 327a for device 106 and initiator 101 from an initiator table 102u. For encryption step 332d, the plaintext values of (i) the E-nonce 332a and (ii) the configuration object comprising network credentials 109 (or asymmetrically encrypted credentials 109') can be input into a symmetric encryption algorithm 405a in order to generate a ciphertext 324d. As depicted, the collection of steps and messages from 602 through 322d can comprise a step 604. In some exemplary embodiments using a fourth responder mode as described in FIG. 3c where responder 102 operates as a responder 102* using conventional technology in FIG. 1b and FIG. 1c, then a responder 102* could use the step 604 in order to obtain the credentials 109 or 109' from a DPP server 103.

Responder 102' can then send initiator 101 a DPP configuration response message 124 via connection 192, where message 124 can include the ciphertext 324d, and the ciphertext 324d can include the E-nonce 332a, the signature 338c, and either network credentials 109 or asymmetrically encrypted network credentials 109'. If network credentials 109' are sent in ciphertext 324d, then the network credentials 109' can comprise a set of "double encrypted" network credentials of (i) asymmetrically encrypted network credentials 109' and (ii) then encrypted again in a ciphertext 324d using the key ke 327a.

Initiator 101 can receive message 124 from responder 102' with ciphertext 324d. Initiator 101 can conduct a decryption step 328d using decryption step 328 depicted in FIG. 4c above. A difference between decryption step 328 and decryption step 328d is that decryption step 328d uses the ciphertext 324d as input into the symmetric decryption algorithm 405b. Initiator 101 can use the previously calculated key ke 327a from a step 331 in order to read the plaintext within ciphertext 324d. Initiator 101 can confirm that plaintext in ciphertext 324d includes the previously sent E-nonce 332a. Initiator 101 can extract a plaintext value for (i) network credentials 109 or (ii) asymmetrically encrypted network credentials 109' using symmetric decryption algorithm 405b and key ke 327a. In other words, with credentials 109' decryption step 328d removes the first layer of "double encryption" where the first layer was encrypted with key ke 327a, and the "plaintext" after decryption step 328d for credentials 109' can comprise the asymmetrically encrypted network credentials 109' (e.g. with the first layer of encryption with key ke 327a has been removed).

Initiator 101 can conduct a signature verification step 340 as depicted and described in connection with FIG. 3d above in order to verify signature 338c received in message 124. Initiator 101 can use either (i) responder ephemeral bootstrap public key Pr 102p or (ii) responder bootstrap public key Br 102a in order to conduct a signature verification step 340 on digital signature 338c. The use of either (i) responder ephemeral bootstrap public key Pr 102p or (ii) responder bootstrap public key Br 102a can be specified in a set of parameters 199 or as part of asymmetric encryption parameters 199h or digital signature parameters 199i. Note that if responder bootstrap public key Br 102a is used to verify digital signature 338c in a step 340, then DPP server 103 would create digital signature 338c in a step 338 with responder bootstrap private key br 102b. If plaintext network credentials 109 are included in ciphertext 324f, then initiator 101 can read the plaintext values for credentials 109. If asymmetrically encrypted network credentials 109' are included in ciphertext 324d, then initiator 101 or device 106 operating initiator 101 can conduct an asymmetric decryption step 339 depicted above in FIG. 3e in order to convert credentials 109' into plaintext credentials 109.

After reading the plaintext network credentials 109 and optionally verifying a signature using a recorded public key 102p or 102a, device 106 can complete the configuration step 106a by loading the network credentials 109 and begin operating a WiFi radio 106r with the network credentials 109. In other words, the WiFi data link 192 depicted in FIG. 1a can be converted into a fully authenticated and encrypted WiFi connection using network credentials 109 and standards such as WPA2, WPA3, and also subsequent or related standards where WiFi nodes such as clients or access points use a compatible set of network credentials 109. For example, device 106 could begin scanning for SSID.network-AP 109a on a channel in Config.network-AP 109c (which can be included in credentials 109 or 109'), and then send access point 105 a probe request. In this manner, device 106 can obtain connectivity to network access point 105 through a configuration step 106a.

FIG. 7

FIG. 7 is a graphical illustration of an exemplary system, where an access point with an initiator communicates with a responder proxy using a hosted device provisioning protocol, in accordance with exemplary embodiments. The present disclosure contemplates that the systems and methods for using a responder 102' with a DPP server 103 can support a device provisioning protocol 191 in order to configure a network access point 105'. System 700 in FIG. 7 can include an unconfigured network access point 105', a mobile phone 701, and a network 107. Unconfigured network access point 105' can include an initiator 101, where initiator 101 can have the same or equivalent functionality as an initiator 101 depicted and described above in FIG. 1a, FIG. 1b, FIG. 1c, FIG. 3a, FIG. 3b, FIG. 5a, FIG. 5b, and FIG. 6.

Initiator 101 can include a responder bootstrap public key Br 102a, an initiator bootstrap private key bi 101b, and an initiator bootstrap public key Bi 101a. PKI keys could be recorded in access point 105' before access point 105' is installed at an operating location, such as during manufacturing or distribution of unconfigured access point 105'. Initiator 101 operating in unconfigured access point 105' can have responder capabilities of an enrollee. Before installation of access point 105' at an operating location, initiator 101 could record a responder public key table 101ta (depicted and described in connection with FIG. 1d and also FIG. 1e) with a plurality of responder bootstrap public keys Br 102a for a plurality of different networks 107.

In exemplary embodiments, the responder public key table 101ta could be loaded into access point 105' during manufacturing or distribution of access point 105' or a configuration step for access point 105' before conducting DPP 191. As contemplated herein, an access point 105 or access point 105' can comprise a "WiFi router", where one interface is a WiFi radio similar to 106r or 102r and the other interface is a wired connection such as Ethernet, DSL, or a coaxial cable. For some exemplary embodiments where a radio 102x uses wireless technology other than WiFi, then access point 105' could comprise a "gnodeb" for a 5G network, and "enodeb" for a 4G LTE network, and other possibilities exist as well for the wireless technology used by a radio 102x in access point 105'.

Unconfigured access point 105' can power up and conduct a step 200 from FIG. 2a and FIG. 3a in order to periodically transmit DPP authentication request messages 122 using different recorded responder bootstrap public keys (combined with possibly different initiator bootstrap PKI keys) from an initiator key database 101t in order to "search" or "scan" for a compatible responder to communicate with. When mobile phone 701 is taken to the vicinity or within WiFi range of AP 105' and activates DPP application 102g and responder 102', then responder 102' can receive the DPP authentication request message 122 and begin processing the message if mobile phone 701 records a matching hash value 102aa over at least the hash over responder bootstrap public key Br 102a recorded in memory, such as in a responder network table 102t depicted in FIG. 1f.

Mobile phone 701 can comprise a smart phone or a mobile handset, such as a mobile phone manufactured by Apple® or running an Android based operating system. Mobile phone 701 could also comprise another mobile and networked computing device, such as a laptop or a tablet. Mobile phone 701 could include a responder 102', where responder 102' could have the same or equivalent functionality as responder 102' depicted and described in connection with FIG. 1a, FIG. 1d, FIG. 1f, FIG. 3a, etc. In exemplary embodiments, responder 102' can operate as an application for mobile phone 701 downloaded from a repository of mobile phone applications, such as an "app store" or "play store", or possibly a private application. In other words, embodiments herein contemplate that a mobile phone 701 could comprise the physical entity operating or processing a responder 102' and the software or firmware instructions for operation of responder 102' could comprise a DPP application 102g. Other physical arrangements are possible as well, without departing from the scope of the present disclosure. Mobile phone 701 can have both a WiFi radio 102x and a WAN radio 102h. Mobile phone 701 can communicate with unconfigured access point 105' via the WiFi radio 102x and a network 107 and a DPP server 103 via the WAN radio 102h and an IP network 113. Responder 102' for mobile phone 701 can have capabilities of a configurator.

Network 107 can operate a DPP server 103, where a DPP server 103 in FIG. 7 can have the functionality of a DPP server 103 depicted and described in connection with FIG. 1a, FIG. 3a, FIG. 3b, FIG. 3c, FIG. 5a, FIG. 5b, and FIG. 6. Although not depicted in FIG. 7, a network 107 can also operate other supporting servers and/or running processes depicted in FIG. 1a, FIG. 2a, etc., such as a device database 104. Network 107 could be connected to mobile phone 107 via the IP network 113 depicted in FIG. 1a and using a secure session 302b from FIG. 3a.

As depicted in FIG. 7, mobile phone 107 using responder 102' could conduct the series of messages for a device provisioning protocol 191 with initiator 101 operating in unconfigured access point 105'. The series of messages for a device provisioning protocol 191 could comprise the messages 122, 123, 123a, 123b, and 124 as depicted and described in connection with FIGS. 1a, 3a, 3b, 5a, 5b, and 6 above. In order for responder 102' to send and receive the device provisioning protocol messages 191 depicted in FIG. 7, responder 102' transmits and receives a series of messages with DPP server 103 in network 107, where the series of messages could comprise a hosted device provisioning protocol 702. For a first mode 306a, representing embodiments depicted in FIG. 3a (where responder bootstrap and ephemeral secret keys remain in DPP server 103), the series of messages for a hosted device provisioning protocol 702 could comprise the messages between responder 102' and DPP server 103 that are depicted in FIG. 3a and FIG. 3b (e.g. messages 302b, 305, 309, 312b, etc.).

For a second mode 306a, representing embodiments depicted in FIG. 5a where the responder bootstrap private key br 102b can remain in DPP server 103 (but DPP server 103 does not operate on responder ephemeral private key pr 102r), the series of messages for a hosted device provisioning protocol 702 could comprise the messages between responder 102' and DPP server 103 that are depicted in FIG. 5a (e.g. messages in step 301 and then 503, 504, etc.). For a third mode 306a, representing embodiments depicted in FIG. 5b where (i) the responder bootstrap private key br 102b remains in DPP server 103 and (ii) responder 102' derives key pr 102r and sends the key to DPP server 103, the series of messages for a hosted device provisioning protocol 702 could comprise the messages between responder 102' and DPP server 103 that are depicted in FIG. 5b (e.g. messages in step 301 and then message 507, 508, etc.).

Upon completion of a device provisioning protocol 191 and a hosted device provisioning protocol 702, unconfigured network access point 105' can conduct a configuration step 106a to load a set of network credentials 109 and begin operating with the credentials 109, as depicted in FIG. 7. The configuration attribute in a message 123b can specify that access point 105' is to be configured as an access point (or with a value of "ap"). The configuration step 106a can convert the unconfigured network access point 105' into an operating network access point 105, such that WiFi clients (or "sta") can connect with network access point 105 using a compatible set of network credentials 109. As depicted in FIG. 7, (i) a mobile phone 701 could also operate as a responder 102' with a roll of a configurator and (ii) the access point 105' operating with a roll of enrollee.

As depicted in FIG. 7, mobile phone 701 could also conduct a device provisioning protocol 191 using a hosted device provisioning protocol 702 with DPP server 103 in order to transfer a set of compatible network credentials 109 to device 106, such that device 106 could connect with network access point 105. The compatible network credentials 109 for device 106 can specify that device 106 operates in a WiFi client mode with network access point 105. Other possibilities exist as well for the operation of a responder 102' to support the transfer of credentials to devices operating as initiators 106 without departing from the scope of the present disclosure.

FIG. 8

FIG. 8 is a graphical illustration of an exemplary system, where an access point operates as a responder proxy for a device with an initiator, in order transfer a set of network credentials to the device, in accordance with exemplary embodiments. The present disclosure contemplates embodiments where a network access point 105 can operate as a responder 102' for a device 106 operating as an initiator 101, in order for the network access point 105 to transfer network credentials 109 to the device 106. System 800 in FIG. 8 can include an unconfigured device 106', a network access point 105, and a network 107.

Network access point 105 in a system 800 can operate with a set of network access credentials 109 and also operate as a responder 102'. Note that network access point 105 as a WiFi router can simultaneously support other devices routing WiFi data through network access point 105 concurrently with network access point 105 operating as a WiFi router. In other words, the present disclosure contemplates that when a radio such as WiFi radio 102x operates for a responder 102' listening for incoming DPP authentication request messages 122, the radio 102x can concurrently support regular WiFi communication according to standard protocols such as WPA2, WPA3, etc. Network access point 105 can connect with a network 107 via an IP network 113 and a secure session 302b as depicted and described in connection with FIG. 3a. Network 107 can operate a DPP server 103, where the function and operation of a DPP server 103 is depicted and described above in connection with FIG. 1a, FIG. 2a, FIG. 3a, etc. Although not depicted in FIG. 8, network 107 could also operate a device database 104 and DPP server 103 could include a server database 103b. Network access point 105 could comprise a WiFi router and operate a WiFi radio and communicate with a plurality of devices 106 that have already performed a configuration step 106a or a manual configuration to connect the configured devices 106. For some exemplary embodiments where a radio 102x uses wireless technology other than WiFi, then access point 105' could comprise a "gnodeb" for a 5G network, and "enodeb" for a 4G LTE network, and other possibilities exist as well for the wireless technology used by a radio 102x in access point 105'.

Network access point 105 can have the internal electrical components equivalent to a responder 102' depicted and described above in connection with FIG. 1f, including a CPU, RAM, nonvolatile memory, and a system bus. For the embodiment depicted in FIG. 8, the responder 102' in network access point 105 could comprise software, firmware, or a running process within network access point 105. Responder 102' in network access point 105 could have the same or equivalent functionality as responder 102' depicted and described in connection with FIG. 1a, FIG. 1f, FIG. 3a, FIG. 3b, FIG. 5a, FIG. 5b, and FIG. 6. Network access point 105 could operate with capabilities as a configurator 801, as depicted in FIG. 8.

An unconfigured device 106' could be a device with a WiFi radio 106r and operate an initiator 101. The electrical components inside device 106' could be similar to the electrical components depicted for a responder 102' in FIG. 1f, such as including a CPU, RAM, nonvolatile memory, an operating system, and a system bus. Initiator 101 in unconfigured device 106' could have the same or equivalent functionality as a initiator 101 depicted and described above in FIG. 1a, FIG. 1b, FIG. 1c, FIG. 1d, FIG. 1e, FIG. 3a, etc. Unconfigured device 106' can have capabilities as an enrollee 802.

Unconfigured device 106' can power up and conduct a step 200 from FIG. 2b and FIG. 3a in order to periodically transmit DPP authentication request messages 122 using different recorded responder bootstrap public keys (combined with possibly different initiator bootstrap PKI keys) from an initiator key database 101t in FIG. 1d in order to "search" or "scan" for a compatible responder to communicate with. When unconfigured device 106' is powered on or taken to the vicinity or within WiFi range of AP 105, then responder 102' in WiFi access point 105 can receive the DPP authentication request message 122 from unconfigured device 106' and begin processing the message 122 if WiFi access point 105 records a matching hash value 102aa over the hash over responder bootstrap public key Br 102a recorded in memory, such as in a responder network table 102t depicted and described in connection with FIG. 1f.

As depicted in FIG. 8, network access point 105 with responder 102' could conduct the series of messages for a device provisioning protocol 191 with initiator 101 operating in unconfigured device 106'. The series of messages for a device provisioning protocol 191 could comprise the messages 122, 123, 123a, 123b, and 124 as depicted and described in connection with FIG. 3a, FIG. 3b, FIG. 5a, FIG. 5b, and FIG. 6. In order for responder 102' in WiFi access point 105 to send and receive the device provisioning protocol messages 191 depicted in FIG. 8, responder 102' (or AP 105 operating the responder 102') transmits and receives a series of messages with DPP server 103 in network 107, where the series of messages could comprise a hosted device provisioning protocol 702. The series of messages for a hosted device provisioning protocol 702 were depicted and described in connection with FIG. 7 above. Note that the steps and messages for conducting a hosted device provisioning protocol 702 can depend on a responder mode 306a, where the responder mode 306a can be selected by a DPP server 103 in a step 306. The present disclosure also contemplates that a responder mode 306a for a hosted device provisioning protocol 702 can be selected by a responder 102'. For these embodiments, where mode 306a is selected by a responder 102', a selected responder mode 306a by the responder 102' could be transmitted from responder 102' to DPP server 103 in a message 305 depicted and described in connection with FIG. 3a above.

The combined (i) device provision protocol 191 between network access point 105 and unconfigured device 106' and (ii) hosted device provisioning protocol 702 between network access point 105 and DPP server 103 can securely transfer a set of compatible network access credentials 109 to device 106'. Upon completion of a device provisioning protocol 191 and a hosted device provisioning protocol 702, unconfigured device 106' can conduct a configuration step 106a to (i) load a compatible set of network credentials 109 for network access point 105 and (ii) begin operating with the credentials 109, as depicted in FIG. 8. The configuration step 106a can convert the unconfigured device 106' into a configured and operating device 106, such that device 106 can conduct a WiFi connection setup step 803 using the received set of compatible network credentials 109. The WiFi connection setup step 803 could use the series of steps and messages as specified by standards such as WPA2 and WPA3 with credentials 109, and other possibilities exist as well for a WiFi connection setup step 803 without departing from the scope of the present disclosure.

CONCLUSION

Various exemplary embodiments have been described above. Those skilled in the art will understand, however, that changes and modifications may be made to those examples without departing from the scope of the claims.

The invention claimed is:

1. A method for conducting a device provisioning protocol (DPP), the method performed by a responder, the method comprising:
recording a set of cryptographic parameters and a responder network table;
receiving a DPP authentication request from an initiator, wherein the DPP authentication request includes at least an initiator ephemeral public key and a hash value for a responder bootstrap public key;
using the hash value and the responder network table to select a DPP server;
sending at least the initiator ephemeral public key and the hash value to the selected DPP server;
deriving (i) a responder ephemeral private key, (ii) a corresponding responder ephemeral public key, and (iii) a responder nonce using the set of cryptographic parameters;
receiving an initiator bootstrap public key and a secret key from the DPP server;
conducting an elliptic curve Diffie-Hellman (ECDH) key exchange using the derived responder ephemeral private key and the received initiator bootstrap public key in order to derive a first shared secret key;
conducting an elliptic curve point addition with the secret key and the derived first shared secret key in order to derive a second shared secret key; and
encrypting at least the responder nonce using the derived second shared secret key.

2. The method of claim 1, wherein the responder comprises a responder proxy, and wherein the responder establishes a secure session with the DPP server using at least a certificate for the responder.

3. The method of claim 1, further comprising transmitting the encrypted responder nonce to the initiator in a DPP authentication response message, and receiving from the initiator a DPP authentication confirm message.

4. The method of claim 1, wherein the responder conducts the ECDH key exchange and the elliptic curve point addition using the set of cryptographic parameters.

5. The method of claim 1, wherein the responder network table includes at least (i) a plurality of hash values for a plurality of responder bootstrap public keys and (ii) a list of DPP servers.

6. The method of claim 1, wherein the derived second shared secret key comprises a key "L", and wherein the responder derives a symmetric ciphering key using a key derivation function and at least the key "L".

7. The method of claim 1, wherein the DPP authentication request includes a first ciphertext of at least an initiator nonce, and wherein the first ciphertext is encrypted with a symmetric ciphering key, and wherein the symmetric ciphering key is derived by the initiator using the responder bootstrap public key and an initiator ephemeral private key corresponding to the received initiator ephemeral public key.

8. A method for conducting a device provisioning protocol (DPP), the method performed by a responder, the method comprising:
recording a set of cryptographic parameters and a responder network table, wherein the responder network table includes at least (i) a plurality of hash values for a plurality of responder bootstrap public keys and (ii) a list of DPP servers;
receiving a DPP authentication request from an initiator wherein the DPP authentication request includes at least an initiator ephemeral public key, a hash value for a responder bootstrap public key, and a first ciphertext;
using the hash value and the responder network table to select a DPP server;
sending the DPP authentication request to the selected DPP server;
receiving a responder ephemeral public key and a second ciphertext from the DPP server, wherein the second ciphertext is encrypted using at least a responder ephemeral private key, and wherein the second ciphertext includes at least a responder nonce and a responder authentication value;
sending a DPP authentication response to the initiator, wherein the DPP authentication response includes at least the received responder ephemeral public key and the second ciphertext; and
receiving a third ciphertext from the DPP server, wherein the third ciphertext includes network credentials for the initiator, and wherein the third ciphertext is encrypted using at least the responder ephemeral private key.

9. The method of claim 8, wherein the responder comprises a responder proxy, and wherein the responder establishes a secure session with the DPP server using at least a certificate for the DPP server.

10. The method of claim 8, further comprising receiving a responder mode from the DPP server, wherein the responder mode signals the DPP server to derive the responder ephemeral private key.

11. The method of claim 8, wherein the first ciphertext is encrypted with a symmetric ciphering key, and wherein the symmetric ciphering key is derived by the initiator using the responder bootstrap public key and an initiator ephemeral private key corresponding to the received initiator ephemeral public key.

12. The method of claim 8, wherein the DPP server derives the responder ephemeral private key, and wherein the DPP server conducts an elliptic curve Diffie-Hellman key exchange with the responder ephemeral private key and the initiator ephemeral public key in order to derive a symmetric ciphering key for the second ciphertext.

13. The method of claim 8, wherein the DPP server conducts an elliptic curve Diffie-Hellman key exchange with the responder ephemeral private key, a responder bootstrap private key, and an initiator bootstrap public key in order to derive a symmetric ciphering key for the third ciphertext.

14. The method of claim 13, wherein the DPP authentication request includes a second hash value for an initiator bootstrap public key, and the DPP server selects the initiator bootstrap public key for the initiator using the second hash value.

15. A method for conducting a device provisioning protocol (DPP), the method performed by a responder, the method comprising:
- establishing a secure session with a DPP server using at least a certificate for the DPP server;
- receiving a responder mode from the DPP server, wherein the responder mode signals the DPP server derives a responder ephemeral private key;
- receiving a DPP authentication request from an initiator wherein the DPP authentication request includes at least an initiator ephemeral public key, a hash value for a responder bootstrap public key, and a first ciphertext;
- sending the DPP authentication request to the DPP server;
- receiving a responder ephemeral public key and a second ciphertext from the DPP server, wherein the second ciphertext is encrypted using at least the responder ephemeral private key, and wherein the second ciphertext includes at least a responder nonce and a responder authentication value;
- sending a DPP authentication response to the initiator, wherein the DPP authentication response includes at least the received responder ephemeral public key and the second ciphertext; and
- receiving a third ciphertext from the DPP server, wherein the third ciphertext includes network credentials for the initiator, and wherein the third ciphertext is encrypted using at least the responder ephemeral private key.

16. The method of claim 15, wherein the first ciphertext is encrypted with a symmetric ciphering key, and wherein the symmetric ciphering key is derived by the initiator using a responder bootstrap public key and an initiator ephemeral private key corresponding to the received initiator ephemeral public key.

17. The method of claim 15, wherein the DPP server conducts an elliptic curve Diffie-Hellman key exchange with the responder ephemeral private key and the initiator ephemeral public key in order to derive a symmetric ciphering key for the second ciphertext.

18. The method of claim 15, wherein the DPP server conducts an elliptic curve Diffie-Hellman key exchange with the responder ephemeral private key, a responder bootstrap private key, and an initiator bootstrap public key in order to derive a symmetric ciphering key for the third ciphertext.

19. The method of claim 18, wherein the DPP authentication request includes a second hash value for an initiator bootstrap public key, and the DPP server selects the initiator bootstrap public key for the initiator using the second hash value.

20. The method of claim 15, wherein the responder comprises a responder proxy, and wherein the responder uses a WiFi radio with a responder configuration in order to receive the DPP authentication request message from the initiator.

* * * * *